United States Patent [19]
Fujinaga et al.

[11] Patent Number: 5,302,802
[45] Date of Patent: Apr. 12, 1994

[54] LASER ROBOT AND METHOD OF CONTROLLING SAME, AND LIGHT BEAM DEFLECTOR AND CONTROL SIGNAL GENERATOR THEREFOR

[75] Inventors: Shigeki Fujinaga; Kiyoshi Takeuchi; Masakazu Kobayashi; Shigeki Ochi; Junko Momosaki, all of Nishinomiya; Eizo Tsuda, Takarazuka; Shinsuke Inoue, Takarazuka; Kazumasa Yoshima, Takarazuka, all of Japan

[73] Assignee: Shin Meiwa Industry Co., Ltd., Nishinomiya, Japan

[21] Appl. No.: 807,828
[22] PCT Filed: May 20, 1991
[86] PCT No.: PCT/JP91/00700
§ 371 Date: Feb. 5, 1992
§ 102(e) Date: Feb. 5, 1992
[87] PCT Pub. No.: WO91/17857
PCT Pub. Date: Nov. 28, 1991

[30] Foreign Application Priority Data

May 23, 1990 [JP] Japan .................. 2-133473
Feb. 6, 1991 [JP] Japan .................. 3-37954
Feb. 18, 1991 [JP] Japan .................. 3-45970

[51] Int. Cl.⁵ .................................. B23K 26/08
[52] U.S. Cl. .................. 219/121.78; 219/121.74; 219/121.8
[58] Field of Search .......... 219/121.8, 121.76, 121.78, 219/121.74

[56] References Cited
U.S. PATENT DOCUMENTS
4,049,945 9/1977 Ehlscheid et al. .
4,797,532 1/1989 Maiorov .................. 219/121.74
5,178,725 1/1993 Takeno et al. ............ 219/121.66 X FOREIGN PATENT DOCUMENTS
0437676 7/1991 European Pat. Off. .
2236666 2/1975 France .
60-68185 4/1985 Japan .
61-292122 12/1986 Japan .
1-130894 5/1989 Japan .

Primary Examiner—C. L. Albritton
Attorney, Agent, or Firm—Oblon, Spivak, McClelland, Maier & Neustadt

[57] ABSTRACT

The present invention belongs to the field of techniques related to a laser robot and a method of controlling the same, particularly for performing weaving of a laser beam easily with high accuracy without the provision of a vibrating condenser lens at the leading edge of an arm.

To solve the problems, in the laser robot (RB) of the present invention, a first inclined mirror (41a) is mounted on a motor (42a) inclined at a predetermined angle from a plane perpendicular to the direction of the rotation axis of a rotor shaft. Similarly, a second inclined mirror (41b) is mounted on a motor (42b) inclined at a predetermined angle. The laser beam (LB) emitted from a laser oscillator (8) is reflected in series by the first and second inclined mirrors (41a, 41b) and is subsequently propagated in the laser robot (RB) to be directed toward workpieces from the tip of a torch (7). By controlling the numbers of rotations, rotation directions and rotation phases of the first and second inclined mirrors (41a, 41b), weaving modes of the laser beam (LB) are selected.

16 Claims, 37 Drawing Sheets 40a, 40b: INCLINED MIRROR ROTATION MECHANISMS
4a, 41b: INCLINED MIRROR
LB: LASER BEAM $$\vec{k_1 b} = \vec{a} - \vec{F_1} \qquad \vec{k_1 k_2 c} = -\vec{k_1 b} + \vec{F_2}$$

ROTATION IN SAME DIRECTION
$N_1 = N_2$
$\Delta \phi = 0$

ROTATION IN
SAME DIRECTION
$N_1 = N_2$
$\Delta\phi \neq 0$

ROTATION IN
OPPOSITE DIRECTIONS
$N_1 = N_2$
$\Delta\phi = 0$ $N_1 = N_2$
ROTATION IN
OPPOSITE DIRECTIONS

FIG. 17

| MODE | MIRROR ROTATION CONDITIONS | CHANGE IN OSCILLATION FORM OF BEAM | LOCUS OF BEAM |
|---|---|---|---|
| SPIN | ROTATION IN SAME DIRECTION $N_1 = N_2$ | CHANGE IN BEAM DIAMETER | |

FIG. 18

| MODE | MIRROR ROTATION CONDITIONS | CHANGE IN OSCILLATION FORM OF BEAM | LOCUS OF BEAM |
|---|---|---|---|
| SCAN | ROTATION IN OPPOSITE DIRECTIONS $N_1 = N_2$ | CHANGE IN BEAM DIRECTION ↔ | (wave pattern) $P_2$, $W_2$ → D |
| | | ↙↗ | (wave pattern) $P_2$, $W_2$ → D |

LASER ROBOT AND METHOD OF CONTROLLING SAME, AND LIGHT BEAM DEFLECTOR AND CONTROL SIGNAL GENERATOR THEREFOR

FIELD OF THE INVENTION

The present invention relates to a laser robot and a method of controlling the same, and a light beam deflector applicable to the laser robot and the like, and a device for controlling the light beam deflector. More particularly, it relates to a technique for periodically changing the direction in which a laser beam is emitted from a torch.

BACKGROUND ART

Laser robots have found various applications, and their use as welding robots has attracted much attention recently. In butt welding and the like, however, there are found a large number of non uniform gaps between workpieces, and a laser beam has a considerably small spot diameter. There arises a problem that sufficient welding results cannot be achieved without performing weaving weld in which the illuminating direction of the laser beam is changed. For the use of the laser robots as the welding robots, it is necessary to improve the weaving performances thereof.

It has been known that a system for imparting weaving function to the laser robots can be roughly divided into two types.

One of the types is a system conventionally used for arc welding robots and the like, in which a laser torch LT is moved in the direction of a beveled edge while the laser torch LT itself is periodically fluctuated in the direction perpendicular to the direction of the beveled edge, as shown in FIG. 43(a) (arrow A1).

The other is a system in which the laser torch LT is moved in the direction of the arrow A2 of FIG. 43(b) along the beveled edge while the deflection angle of the laser beam emitted from the laser torch LT is periodically changed as indicated by the arrow A3. For achievement of the system of the second type, there are two known methods:

(1) a method of periodically vibrating or fluctuating a condenser lens for the laser beam, and (2) a method of deflecting the laser beam by the combination of a pair of galvano mirrors.

The first system however, has a problem that welding speed is low because an arm for fluctuating the torch cannot be moved at a very high speed.

In the method (1) of the second system, it is necessary to equip the leading edge portion of the arm with a lens drive mechanism since the condenser lens is mounted adjacent to the leading edge of the arm. This structure increases the size and inertia of the leading edge portion of the arm, resulting in increased interference between the leading edge portion of the arm and obstructions and deterioration in controllability.

In the method (2) of the second system, there arises a problem that drive control for the galvano mirrors is not easy. That is, since a laser used for welding is a high power laser (e.g., a carbon dioxide laser of CW oscillation type), the material and thickness of the galvano mirrors are required to resist the high power, and the inertia of the galvano mirrors necessarily increases. Since the galvano mirrors must be vibrated at high frequencies, a torque load on a vibrating mechanism for the galvano mirrors changes violently. As a result, the vibrations of the respective galvano mirrors are difficult to be in synchronism with each other.

These problems are not limited to the welding robots but are common to the laser robots in which the laser beam is required to be deflected periodically.

DISCLOSURE OF THE INVENTION

The present invention is directed toward overcoming the above-noted problems. It is a primary object of the present invention to provide a laser robot for periodically deflecting a laser beam, which is capable of preventing interference between a leading edge portion of an arm and obstructions, which is capable of controlling the periodical deflection of the laser beam without difficulty and which is excellent in control accuracy, and which is capable of sufficiently increasing a deflection speed and, therefore, a welding speed.

It is another object of the present invention to provide a method of controlling the laser robot exactly.

It is still another object of the present invention to generalize a new structure for use in the laser robot as a light beam deflector.

It is a further object of the present invention to provide a control signal generator for the light beam deflector.

The present invention provides the new structure in the aforesaid second system, a method of controlling the same, and a control signal generator therefor.

A laser robot in a first constitution of the present invention is adapted such that a plurality of inclined mirror rotation mechanisms for rotating a plurality of inclined mirrors inclined from planes perpendicular to directions of predetermined rotation axes on the rotation axes respectively are arranged in series along an optical path of the laser beam, such that the laser beam is reflected serially by the plurality of inclined mirrors while the plurality of inclined mirrors rotate on the rotation axes by means of the plurality of inclined mirror rotation mechanisms respectively, and such that the reflected laser beam is emitted from a torch, whereby the direction in which the laser beam is emitted from the torch is periodically deflected.

According to the laser robot of the present invention, each of the inclined mirrors has a function of periodically deflecting the laser beam by its rotation. By the combination of the plurality of inclined mirrors and an appropriate setting of relative rotation directions thereof and rotation phase difference therebetween, the deflection mode, deflection cycle, amplitude of the laser beam and so on can be changed.

Therefor, the designation of the travelling speed of the torch, the travelling distance of the torch during one cycle of deflection, the amplitude of the deflection mode and so on permits calculations of the desired numbers of rotations of respective inclined mirrors and the desired rotation phase difference between adjacent inclined mirrors.

Since there is no need to mount the inclined mirrors and the rotation mechanisms on the leading edge of the arm, interference between the leading edge of the arm and obstructions due to increased size of the leading edge of the arm can be effectively prevented.

Since the mirrors do not vibrate such as galvano mirrors but only rotate, there is generated no violent change in acceleration in the rotation directions of the mirrors. This provides for improvement in periodical deflection speed, easy synchronization control between the mirrors, and high controllability of the laser beam.

The laser robot in a second constitution of the present invention is adapted such that the plurality of inclined mirrors are equal in the number of rotations and in rotation direction in the laser robot of the first constitution.

The laser robot in a third constitution of the present invention is adapted such that the plurality of inclined mirrors are equal in the number of rotations and adjacent ones of the plurality of inclined mirrors are mutually opposite in rotation direction.

According to the present invention, a method of controlling a laser robot which propagates a laser beam along an arm and performs a predetermined processing while directing the laser beam from a torch mounted on a leading edge of the arm to workpieces and travelling the torch along a processing line on the workpieces, comprises a first step of arranging a plurality of inclined mirrors and a plurality of inclined mirror rotation mechanisms in series along an optical path of the laser beam, the plurality of inclined mirrors having reflecting surfaces inclined from planes perpendicular to directions of predetermined rotation axes respectively and serially reflecting the laser beam by their reflecting surfaces to introduce the laser beam to the torch, the plurality of inclined mirror rotation mechanisms rotating the plurality of inclined mirrors on the rotation axes, respectively, a second step of specifying speeds at which the torch travels along the processing line while performing the predetermined processing and a distance the torch travels along the processing line within a cycle of deflection of the laser beam, a third step of specifying a spin diameter of the laser beam emitted from the torch, a fourth step of determining the numbers of rotations of the plurality of inclined mirrors as a function of the speeds and the distance, a fifth step of determining a rotation phase difference between two of the inclined mirrors which are adjacent to each other as a function of the spin diameter, and a sixth step of producing drive outputs as a function of the numbers of rotations and rotation phase difference which are determined in the fourth and fifth steps and applying the drive outputs to the plurality of inclined mirror rotation mechanisms to rotate the plurality of inclined mirrors in the same direction with the same number of rotations held.

In the method, the numbers of rotations of the plurality of inclined mirrors rotating in the same direction with the same number of rotations held are determined by the travelling speed of the torch and the spin pitch, and the rotation phase difference therebetween is determined uniquely by the spin diameter. As a result, the plurality of inclined mirrors can be effectively controlled such that weaving of the laser beam can be exactly performed in the spin mode without difficulty.

In another constitution of the present invention, a method of controlling a laser robot which propagates a laser beam along an arm and performs a predetermined processing while directing the laser beam from a torch mounted on a leading edge of the arm to workpieces and travelling the torch along a processing line on the workpieces, comprises a first step of arranging a plurality of inclined mirrors and a plurality of inclined mirror rotation mechanisms in series along an optical path of the laser beam, the plurality of inclined mirrors having reflecting surfaces inclined from planes perpendicular to directions of predetermined rotation axes respectively and serially reflecting the laser beam by their reflecting surfaces to introduce the laser beam to the torch, the plurality of inclined mirror rotation mechanisms rotating the plurality of inclined mirrors on the rotation axes, respectively, a second step of specifying speeds at which the torch travels along the processing line while performing the predetermined processing and a distance the torch travels along the processing line within a cycle of deflection of the laser beam, a third step of specifying Cartesian position coordinates of a tip of the torch at processing points on which the predetermined processing is to be performed in the processing line and drive amounts of the arm for travelling the torch onto the processing points, a fourth step of determining the numbers of rotations of the plurality of inclined mirrors as a function of the speeds and the distance, a fifth step of determining a rotation phase difference between two of the inclined mirrors which are adjacent to each other for each of the processing points as a function of the position coordinates and the drive amounts, and a sixth step of producing drive outputs as a function of the numbers of rotations and rotation phase difference which are determined in the fourth and fifth steps and applying the drive outputs to the plurality of inclined mirror rotation mechanisms to rotate adjacent ones of the plurality of inclined mirrors in opposite directions with the same number of rotations held.

In the method, the numbers of rotations of the plurality of inclined mirrors which are equal in the number of rotations and adjacent ones of which rotate in the opposite directions are determined by the travelling speed of the torch and the spin pitch, and the rotation phase difference therebetween is determined by information of the position of the torch and the drive amounts of the arm for each processing point. This provides compensation for the influence of the drive of the arm on the deflection of the laser beam. The plurality of inclined mirrors can be effectively controlled such that weaving of the laser beam is performed in the scan mode with the oscillation direction of the laser beam constantly maintained perpendicularly to the direction tangential to the processing line and the center axis of the torch.

According to the present invention, a light beam deflector for periodically deflecting a light beam comprises first and second inclined mirrors having reflecting surfaces inclined from planes perpendicular to directions of predetermined rotation axes respectively and arranged in series along an optical path of the light beam for serially reflecting the light beam by their reflecting surfaces to introduce the light beam to a predetermined space, first and second inclined mirror rotation mechanisms for rotating the first and second inclined mirrors on the rotation axes, respectively, and control means for controlling rotations of the first and second inclined mirror rotation mechanisms, wherein the light beam is reflected in series by the first and second inclined mirrors while the first and second inclined mirrors rotate in response to a control signal applied to the inclined mirror rotation mechanisms by the control means, to thereby periodically deflect the light beam in the predetermined space.

Therefore, according to the light beam deflector of the present invention, there is provided a module capable of periodically deflecting the light beam.

The light beam deflector is applicable to the laser robot of the present invention, and has an effect of improving the deflection accuracy and deflection speed of the light beam.

Different deflection modes are obtained between the case where the rotation directions of the first and second inclined mirrors are the same and the case where they are opposite When the rotation directions of the first and second inclined mirrors are the same, the spin mode can be selected for the deflection locus of the light beam. When the rotation directions of the first and second inclined mirrors are opposite, the scan mode can be selected for the deflection locus of the light beam.

According to the present invention, a control signal generator for use in the light beam deflector as control means for generating control signals to be applied to the first and second rotation mechanisms, comprises a controller for calculating the numbers of rotations of the first and second rotation mechanisms and a rotation phase difference between the first and second rotation mechanisms as a function of a predetermined algorithm, a processor connected to an output portion of the controller for calculating the numbers of pulses to be applied to the first and second rotation mechanisms respectively per predetermined time from a calculation result of the controller in response to a first timing pulse signal to output calculation results with respect to the numbers of pulses as first and second calculation results respectively, a first pulse train formation circuit connected to one output portion of the processor for converting the first calculation result into a pulse train to form a first pulse train signal in response to a second timing pulse signal, to apply the first pulse train signal to the first rotation mechanism, a second pulse train formation circuit connected to the other output portion of the processor for converting the second calculation result into a pulse train to form a second pulse train signal in response to the second timing pulse signal, to apply the second pulse train signal to the second rotation mechanism, and a timing pulse generation circuit for generating the first and second timing pulse signals.

The processor in the control signal generator for the light beam deflector according to the present invention, receiving the first timing pulse for each predetermined time, receives from the controller the calculation results with respect to the numbers of rotations and rotation phase difference calculated by the controller and to be applied to the first and second rotation mechanisms, calculates the numbers of pulses to be applied to the first and second rotation mechanisms per predetermined time in accordance with the calculation results, and outputs the calculation results with respect to the numbers of pulses as the first and second calculation results. The processor controls the respective numbers of pulses to be applied to the first and second rotation mechanisms for each predetermined time.

Subsequently, the first pulse train formation circuit converts the first calculation result into a pulse train in response to the second timing pulse signal.

Similarly, the second pulse train formation circuit converts the second calculation result into a pulse train in response to the second timing pulse signal.

This provides the first pulse train signal having pulses the number of which corresponds to the first calculation result per predetermined time and the second pulse train signal having pulses the number of which corresponds to the second calculation result per predetermined time.

In the control signal generator for the light beam deflector, continuous high speed rotations of the inclined mirrors are effectively performed with the predetermined numbers of rotations and predetermined rotation phase difference held for each predetermined time, while the two rotation mechanisms in the light beam deflector are accelerated and decelerated for each predetermined time for the purpose of periodically deflecting the light beam in the predetermined mode.

The control signal generator for the light beam deflector, composed of a simple electrical structure, controls the rotations of the two rotation mechanisms by replacing with the two pulse train signals the informations for rotating the two rotation mechanisms with the predetermined numbers of rotations and predetermined rotation phase difference held for each predetermined time, so that the two rotation mechanisms can be exactly controlled with ease without an error of a single pulse.

BRIEF DESCRIPTION OF THE DRAWINGS

FIG. 17 illustrates properties of a spin mode according to the preferred embodiment;

FIG. 18 illustrates properties of a scan mode according to the preferred embodiment;

FIG. 43(a and b) illustrate conventional methods in an arc welding robot and the like.

BEST MODES FOR CARRYING OUT THE INVENTION

Laser Robot and Light Beam Deflector

(A) Mechanical Structure

Figure 2:
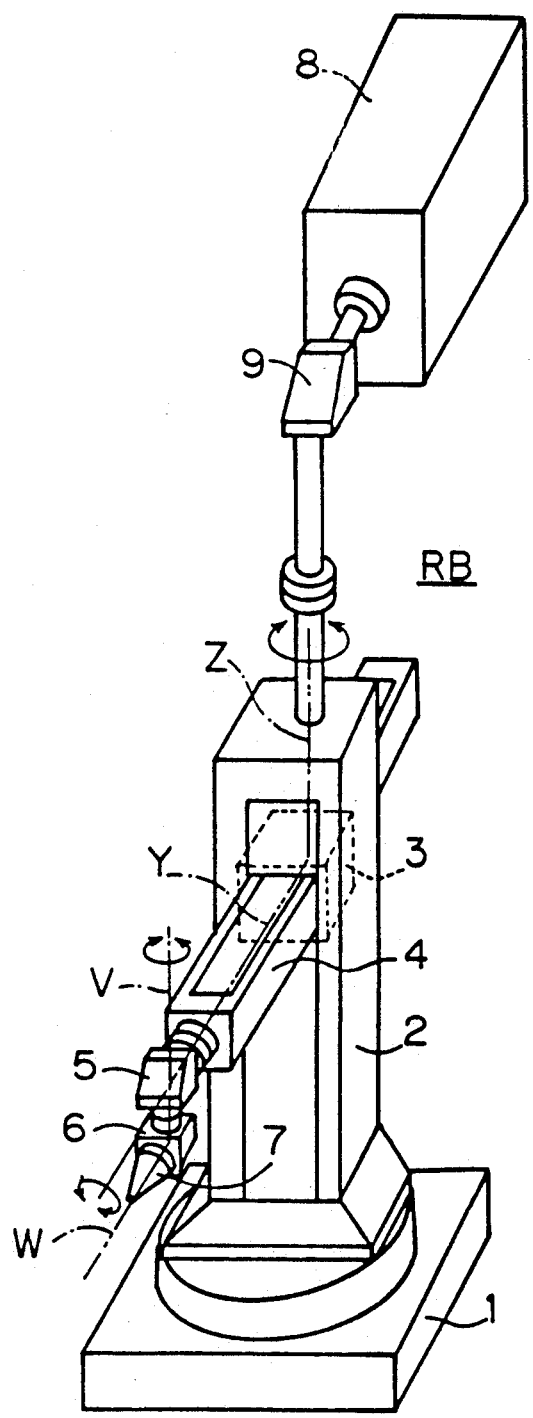
FIG. 2 is an external perspective view showing a mechanical structure of the laser welding robot according to the preferred embodiment of the present invention.

FIG. 2 is an external perspective view showing a mechanical structure of a laser welding robot RB according to a first preferred embodiment of the present invention. In the robot RB, a hollow revolving column 2 revolvable on a revolution axis Z is supported on a base 1. The revolving column 2 supports a hollow lift body 3 vertically movable on the revolution axis Z. The lift body 3 supports a hollow horizontal arm 4 expandable on a horizontal axis Y which is perpendicular to the revoltion axis Z.

A first hollow pivotal body 5 pivotable on the horizontal axis Y is supported at the leading edge to the horizontal arm 4. The first pivotal body 5 supports a second hollow pivotal body 6 pivotably on an axis V which is perpendicular to the pivot axis of the first pivotal body 5 (corresponding to the horizontal axis Y). A laser torch (nozzle) 7 is mounted on the second pivotal body 6 in the direction of an axis W which is perpendicular to the pivot axis V.

A laser beam oscillated by a carbon dioxide laser oscillator 8 is reflected downwardly by a reflector 9. The optical axis of the reflected light coincides with the revolution axis Z. The laser beam passes through the respective members 3 to 6 while reflected in series by mirror systems described below to be emitted from the tip of the laser torch 7. The laser beam is periodically deflected relative to the center axis W of the laser torch 7 by the function of a pair of inclined mirror rotation mechanisms described later.

Figure 3:
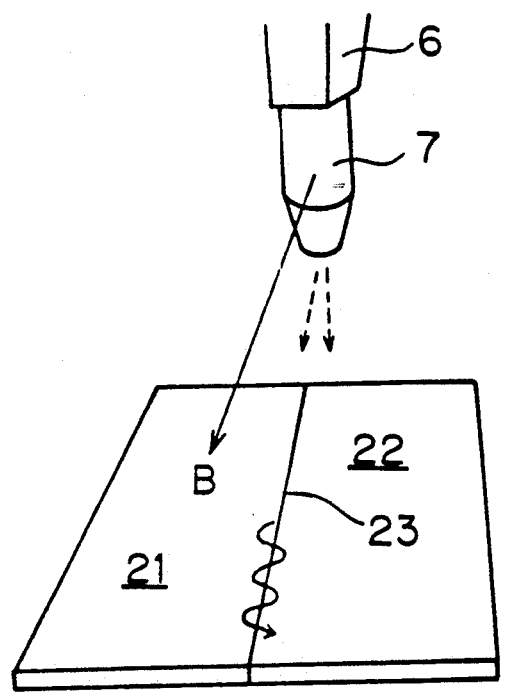
FIG. 3 illustrates weaving weld by the laser welding robot according to the preferred embodiment of the present invention.

By travelling the laser torch 7 in the B direction of FIG. 3 along a butted portion 23 of workpieces 21 and 22 in butt welding as shown in FIG. 3, the butted portion 23 can be welded by weaving. In this welding, no welding rod is used, but the workpieces 21 and 22 are joined by the melting thereof.

(B) Optical Structure

Figure 1:
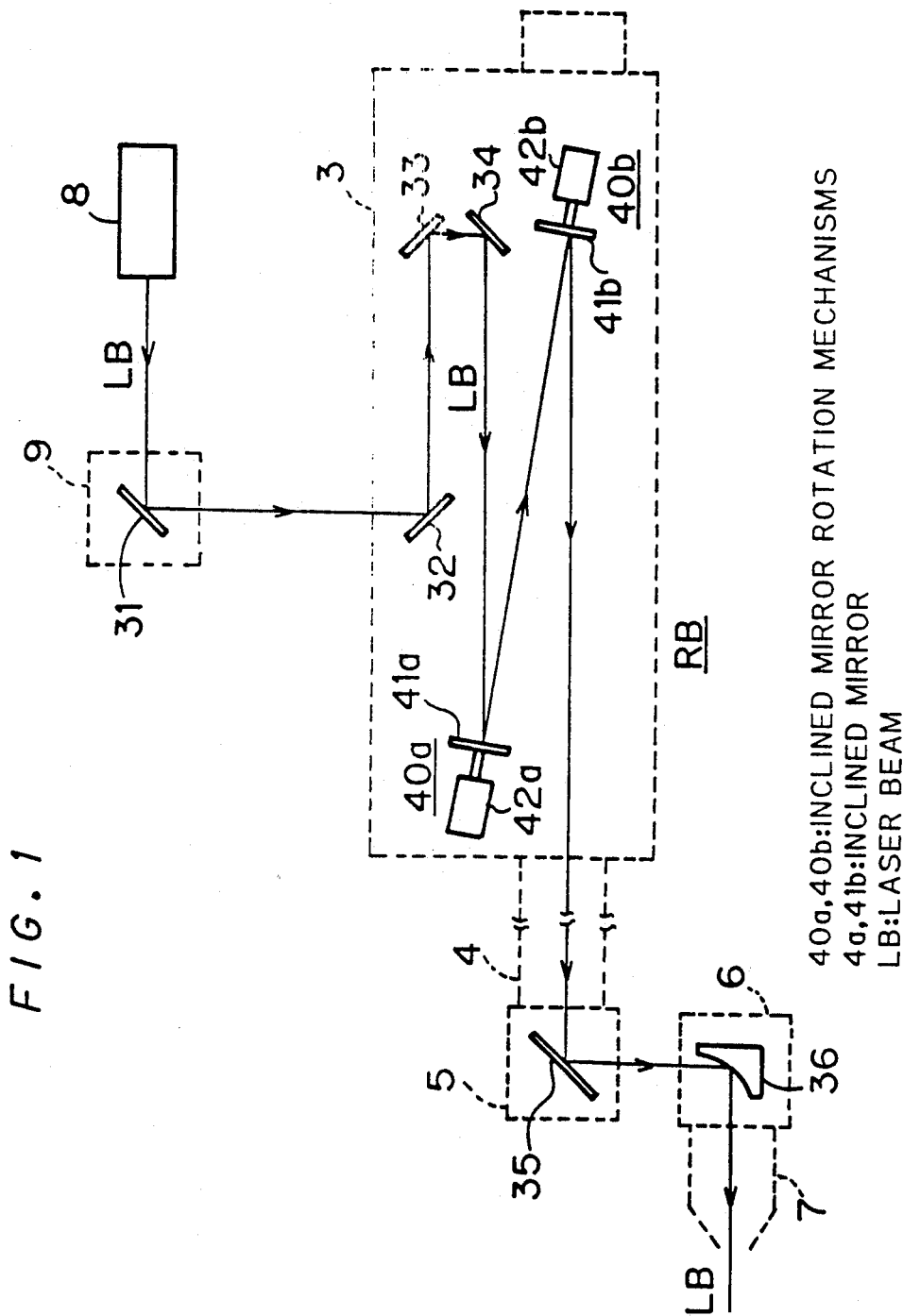
FIG. 1 schematically shows an optical structure of a laser welding robot according to a preferred embodiment of the present invention.

FIG. 1 schematically shows an optical structure of the laser welding robot RB shown in FIG. 2. The laser beam LB oscillated by the laser oscillator 8 is reflected by a mirror 31 in the reflector 9, and is directed through the revolving column 2 into the lift body 3.

An optical system in the lift body 3 includes fixed mirrors 32 to 34, a first inclined mirror 41a mounted to a first inclined mirror rotation mechanism 40a and a second inclined mirror 41b mounted to a second inclined mirror rotation mechanism 40b. The laser beam LB which enters the lift body 3 is reflected in series by the mirrors 32, 33, 34 to be incident on the first inclined mirror 41a.

Figure 4:
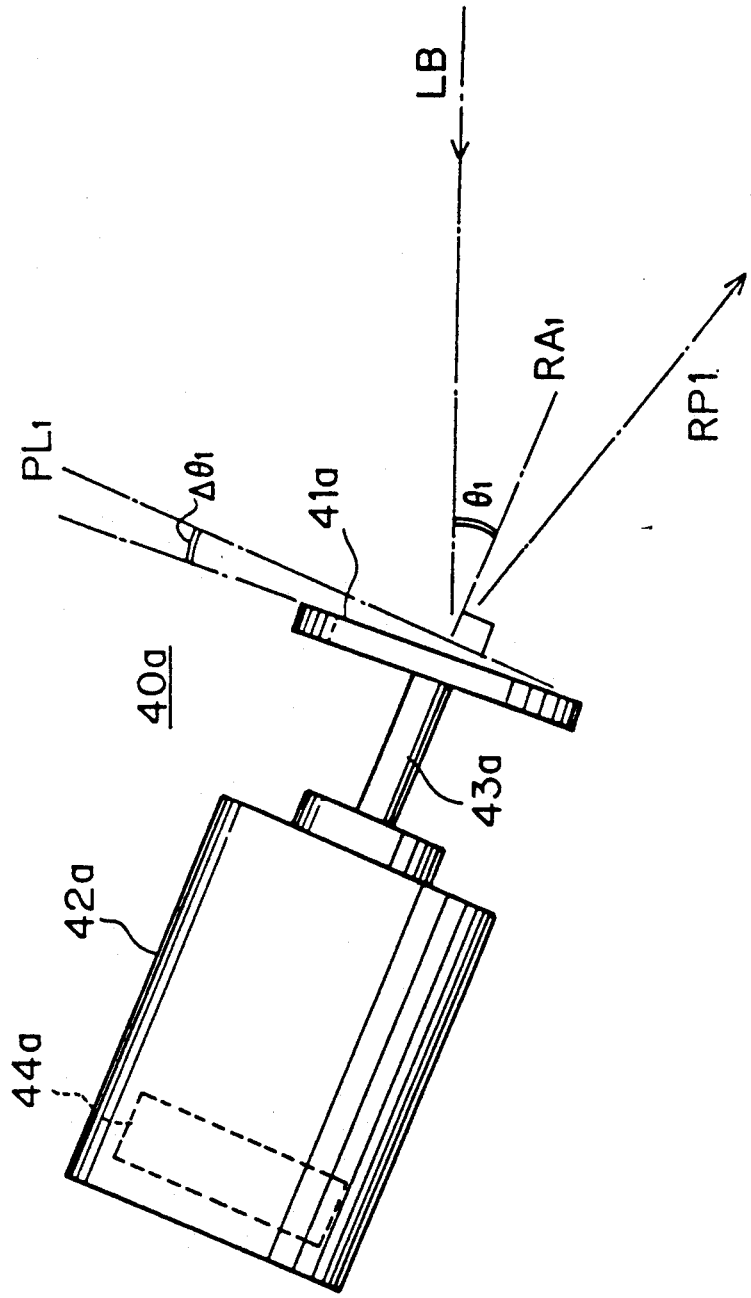
FIG. 4 is a cross-sectional view showing the structure of a first inclined mirror rotation mechanism in detail.

FIG. 4 is a cross section showing the structure of the first inclined mirror rotation mechanism 40a in detail. The first inclined mirror 41a is mounted to a rotor shaft 43a of a motor 42a such that its mirror surface is inclined at an angle $\Delta\theta_1$ from a plane $PL_1$ perpendicular to a rotation axis direction $RA_1$ of the rotor shaft 43a. The rotation axis direction $RA_1$ is inclined at an angle $\theta_1$ from an incident axis of the laser beam LB. This permits periodical change in the direction in which the laser beam LB is reflected from the first inclined mirror 41a when the first inclined mirror 41a is rotated by the motor 42a. Assuming a virtual state in which the first inclined mirror 41a is disposed in the plane $PL_1$ and referring to a travelling path RP1 of the laser beam LB reflected in this state as a "reference optical path", the actual optical path of the reflected laser beam LB periodically changes on a conical surface whose center axis is the reference optical path RP1. The details of the periodical change will be described later. The laser beam LB reflected by the first inclined mirror 41a is further reflected by the second inclined mirror 41b (see FIG. 4) provided on the extension line of the reference optical path RP1.

A rotary encoder 44a for detecting the rotation angle of the rotor shaft 43a is housed in the motor 42a, which is preferably a direct drive servomotor.

The first inclined mirror 41a is arranged such that its center (the point of attachment to the rotor shaft 43a) is on the reference optical path RP1.

Figure 5:
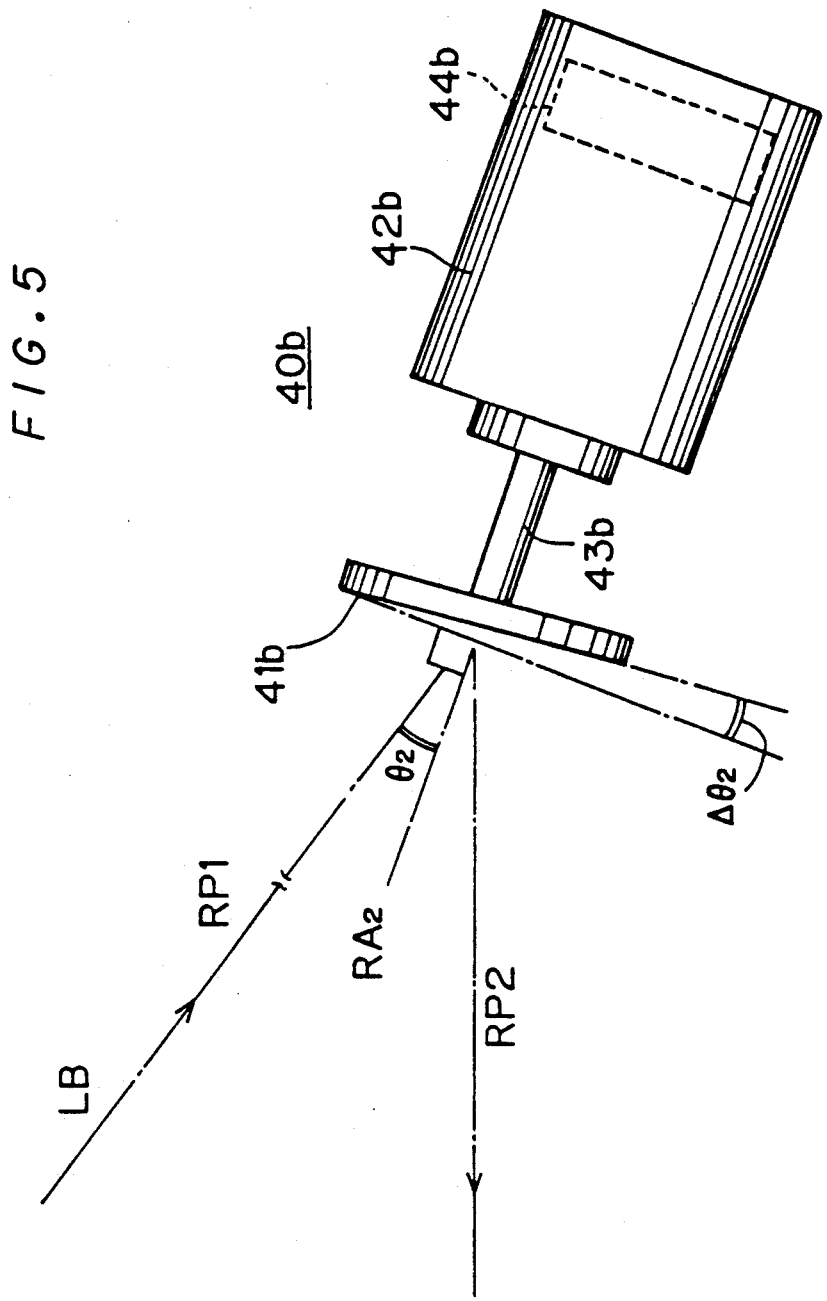
FIG. 5 is a cross-sectional view showing the structure of a second inclined mirror rotation mechanism in detail.

FIG. 5 is a cross section showing the structure of the second inclined mirror rotation mechanism 40b in detail. The second inclined mirror 41b is mounted to a rotor shaft 43b of a motor 42b such that its mirror surface is inclined at an angle $\Delta\theta_2$ from a plane PL2 perpendicular to a rotation axis direction RA2 of the rotor shaft 43b. The rotation axis direction RA2 is inclined at an angle $\theta_2$ to the reference optical path RP1 shown in FIG. 4. The angle $\theta_1$ shown in FIG. 4 may be, in general, different from the angle $\theta_2$, however, it is supposed that $\theta_1 = \theta_2$ for convenience in the preferred embodiment. That is, it is supposed that the rotation axis direction RA1 in the first inclined mirror rotation mechanism 40a is parallel to the rotation axis direction RA2 in the second inclined mirror rotation mechanism 40b. The inclination angles $\Delta\theta_1$ and $\Delta\theta_2$ may be equal to or different from each other, however, it is supposed that $\Delta\theta_1 = \Delta\theta_2$ in the preferred embodiment.

In the second inclined mirror rotation mechanism 40b, when the second inclined mirror 41b is rotated by the motor 42b, the direction in which the laser beam LB is reflected from its mirror surface periodically changes. The rule of the change described later in detail is determined by the numbers of rotations of the first and second inclined mirrors 41a and 41b, the rotation phase difference therebetween, and the angles $\Delta\theta_1$ and $\Delta\theta_2$. Assuming a virtual state in which the mirror surface of the second inclined mirror 41b is in the plane PL2 and the laser beam LB is incident along the reference optical path RP1, the optical path of the reflected laser beam LB is a reference optical path RP2.

A rotary encoder 44b for detecting the rotation angle of the rotor shaft 43b is housed in the motor 42b, which is preferably the direct drive servomotor.

The second inclined mirror 41b is arranged such that its center (the point of attachment to the rotor shaft 43b) is on the reference optical path RP2.

The combination of the pair of inclined mirror rotation mechanisms 40a and 40b shown in FIGS. 4 and 5 may be formed into a single module as a light beam deflector.

With reference again to FIG. 1, the laser beam LB which is reflected in series by the first and second inclined mirrors 41a and 41b and is emitted from the optical system 30 of the lift body 3 passes through the horizontal arm 4 and is reflected by a fixed mirror 35 in the first pivotal body 5. The reflected laser beam LB is converted into a focused beam by a parabolic mirror 36 mounted in the second pivotal body 6 to be directed from the torch 7 toward the workpiece. In practice, the travelling direction of the laser beam LB after reflection from the first inclined mirror 41a periodically changes by the rotations of the first and second inclined mirrors 4a and 41b. The travelling direction is shown in FIG. 1 represented by the reference optical paths RP1 and RP2.

(C) Electrical Structure

Figure 6:
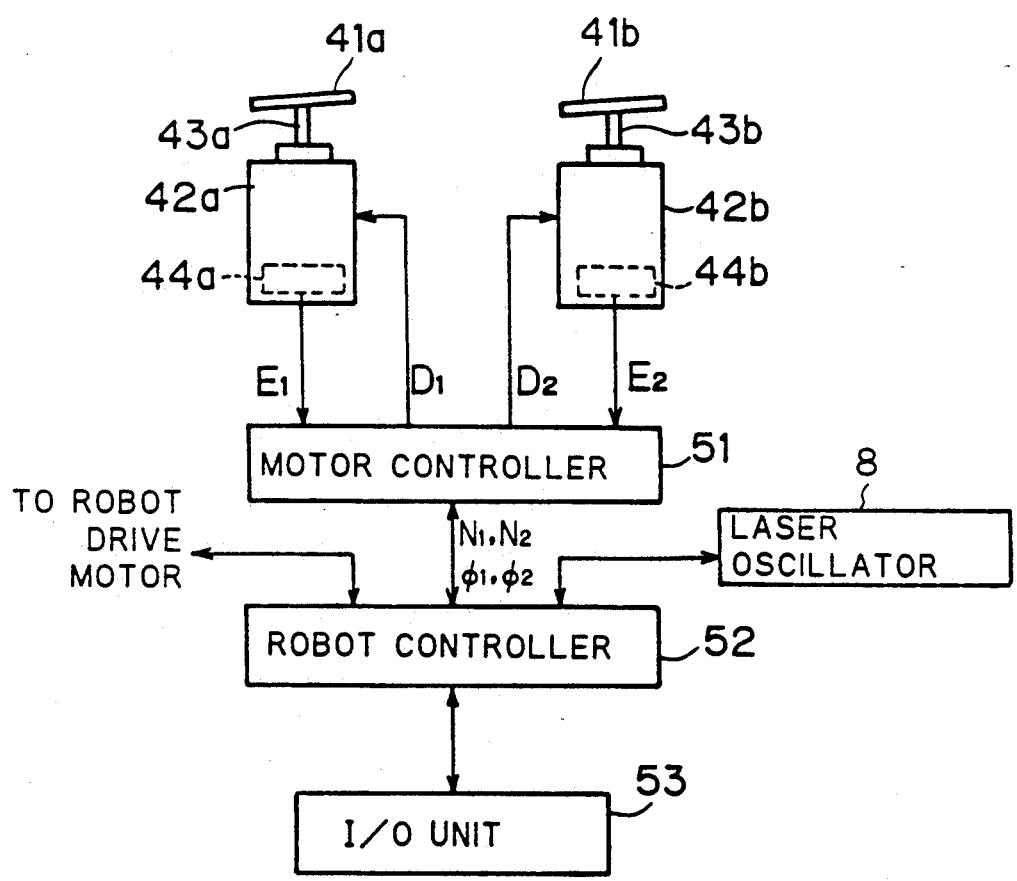
FIG. 6 is a block diagram of a control system of the first and second inclined mirror rotation mechanisms.

FIG. 6 is a block diagram of a control system of the first and second inclined mirror rotation mechanisms 40a and 40b shown in FIGS. 4 and 5. An input/output unit 53 provides the information of the operations of respective arms of the robot RB shown in FIGS. 1 and 2 and the information of welding conditions. The informations are inputted to a robot controller 52. The robot controller 52 produces command values to be outputted to respective arm drive motors of the robot RB and laser ON/OFF command values to be given to the laser oscillator 8. The robot controller 52 gives a motor controller 51 command values of the numbers of rotations $N_1$, $N_2$, initial phase command values $\phi_1$, $\phi_2$ and rotation direction command values (not shown) for the motors 42a and 42b.

The motor controller 51 outputs motor drive powers $D_1$ and $D_2$ to the motors 42a and 42b respectively as a function of the command values. Rotation angle detection signals $E_1$ and $E_2$ from the rotary encoders 44a and 44b are fed back to the motor controller 51. The mutual relation between the numbers of rotations $N_1$, $N_2$, rotation directions and initial phases $\phi_1$, $\phi_2$ of the motors 42a, 42b, which is described in the next section, is a factor for determining the mode and width of the weaving, etc.

(D) Details of Beam Deflection by Rotation Of Mirrors

Figure 7:
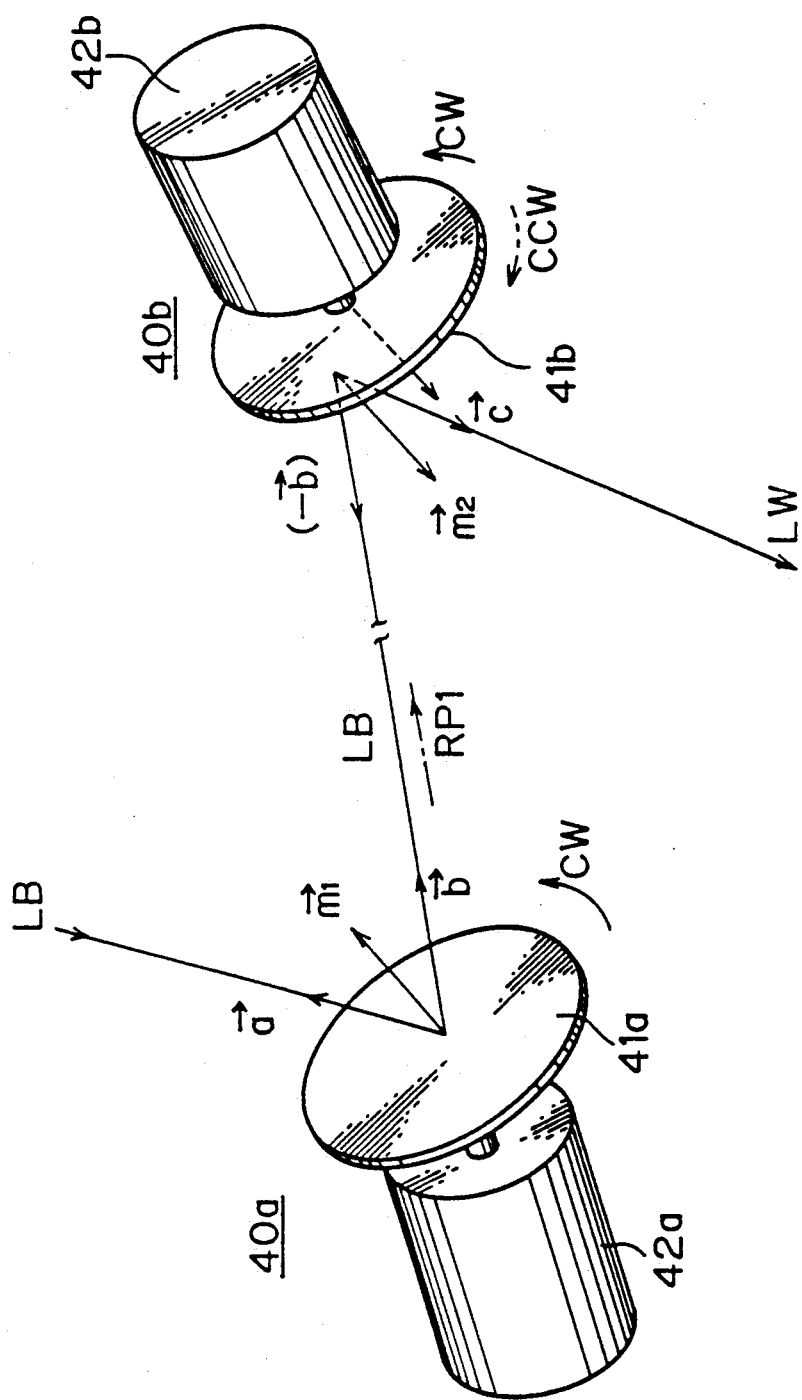
FIG. 7 illustrates periodical deflection of a laser beam by first and second inclined mirrors for geometrical analysis.
Figure 8:
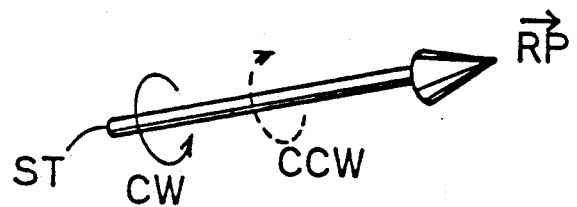
FIG. 8 illustrates the definitions of a clockwise direction CW and a counterclockwise direction CCW.

FIG. 7 illustrates the periodical deflection of the laser beam LB by the first and second inclined mirrors 41a and 41b for geometrical analysis thereof. For the rotation directions of the first and second inclined mirrors 41a and 41b, a "clockwise direction CW" and a "counterclockwise direction CCW" are defined as viewed from the initial point ST of a vector $\vec{RP}$ (of FIG. 8) which connects the first and second inclined mirrors 41a and 41b and is parallel to the reference optical path RP1.

Vectors in FIG. 7 are defined as follows:

(1) Vector $\vec{a}$ is a unit vector which is parallel to the direction in which the laser beam LB is incident on the first inclined mirror 41a and has the direction opposite thereto.

(2) Vector $\vec{b}$ indicates the direction in which the laser beam LB is reflected from the first inclined mirror 41a. Vector $(-\vec{b})$ which has the direction opposite to the vector $\vec{b}$ is parallel to the direction in which the laser beam LB is incident on the second inclined mirror 41b and has the direction opposite thereto.

(3) Vector $\vec{c}$ indicates the direction in which the laser beam LB is reflected from the second inclined mirror 41b.

(4) Vector $\vec{m}_1$ is a unit vector normal to the mirror surface of the first inclined mirror 41a.

(5) Vector $\vec{m}_2$ is a unit vector normal to the mirror surface of the second inclined mirror 41b.

From the rule of light reflection by the first and second inclined mirrors 41a and 41b, the following formulas (1) and (2) hold:

$$\vec{m}_1 \times \vec{a} = (k_1 \vec{b}) \times \vec{m}_1 \tag{1}$$

$$\vec{m}_2 \times (-\vec{b}) = (k_2 \vec{c}) \times \vec{m}_2 \tag{2}$$

where "x" indicates a vector product, and $k_1$, $k_2$ are normalization coefficients for setting the lengths of the vectors $\vec{a}$ and $\vec{b}$ to "1".

From the formulas (1) and (2), the following formulas are obtained:

$$k_1 \vec{b} = \vec{a} - (\vec{m}_1 \cdot \vec{a}) \vec{m}_1 \tag{3}$$

$$k_2 \vec{c} = -\vec{b} + (\vec{m}_2 \cdot \vec{b}) \vec{m}_2 \tag{4}$$

where "·" indicates a scalar product.

Substitution of the formula (3) into the formula (4) gives $$k_1k_2\vec{c} = -\vec{a} + (\vec{m_1}\cdot\vec{a})\vec{m_1} + (\vec{m_2}\cdot\vec{a})\vec{m_2} - (\vec{m_1}\cdot\vec{b})(\vec{m_1}\cdot\vec{m_2})\vec{m_2} \quad (5)$$

The vectors $\vec{b}$ and $\vec{c}$ are given by the vectors $\vec{a}$, $\vec{m_1}$ and $\vec{m_2}$.

The vectors $\vec{m_1}$ and $\vec{m_2}$ rotate around the direction $RA_1$ and $RA_2$ inclined at the angles $\Delta\theta_1$ and $\Delta\theta_2$ from the rotation axis directions $RA_1$ (FIG. 4) and $RA_2$ (FIG. 5) of the rotor shafts 43a and 43b, respectively. The influence of changes of the vectors $\vec{m_1}$ and $\vec{m_2}$ with time by the rotational drives of the motor 42a and 42b on the vector $\vec{c}$ can be known on the basis of the formula (5). This analysis can be performed by simulation. However, for clarifying its basic properties, a qualitative analysis will be performed below.

Figure 9:
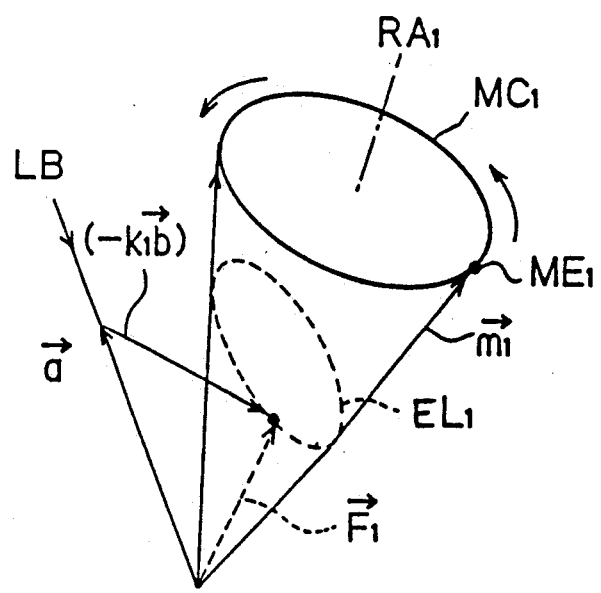
FIGS. 9 and 10 illustrate direction vectors of the laser beam for analysis, respectively.

With reference to FIG. 9, the terminal point $ME_1$ of the vector $\vec{m_1}$ travels on a circle $MC_1$ by the rotational drive of the motor 42a. It is assumed that the second term on the right-handed side of the formula (3) is a vector $\vec{F_1}$.

$$\vec{F_1} = (\vec{m_1}\cdot\vec{a})\vec{m_1} \quad (6)$$

The vector $\vec{F_1}$ extends in the same direction as the vector $\vec{m_1}$, and its length (vector $\vec{a}$·vector $\vec{m_1}$) changes according to the relative angle between the vector $\vec{m_1}$ and the vector $\vec{a}$. Since the vector $\vec{a}$ is fixed, the terminal point of the vector $\vec{F_1}$ periodically rotates on an ellipse $EL_1$. Since the first term on the right-handed side of the formula (30 is a fixed vector as described above, the terminal point of the vector $(-k_1\vec{b})$ which is obtained by introducing a minus sign to a difference between the first and second terms also travels on the ellipse $EL_1$.

Assuming that the second term on the right-handed side of the formula (7) which is obtained by changing the formula (4) is a vector $\vec{F_2}$, the vector $\vec{F_2}$ has similar dependence on the vectors $\vec{m_2}$ and $\vec{b}$.

$$\vec{k_1k_2c} = -k_1\vec{b} + (\vec{m_2}\cdot\vec{k_1b})\vec{m_2} \quad (7)$$

$$\vec{F_2} = (\vec{m_2}\cdot\vec{k_1b})\vec{m_2} \quad (8)$$

When the vector $\vec{b}$ is fixed, the terminal point of the vector $(k_1k_2\vec{c})$ travels on another ellipse $EL_2$ (not shown in FIG. 9).

Figure 10:
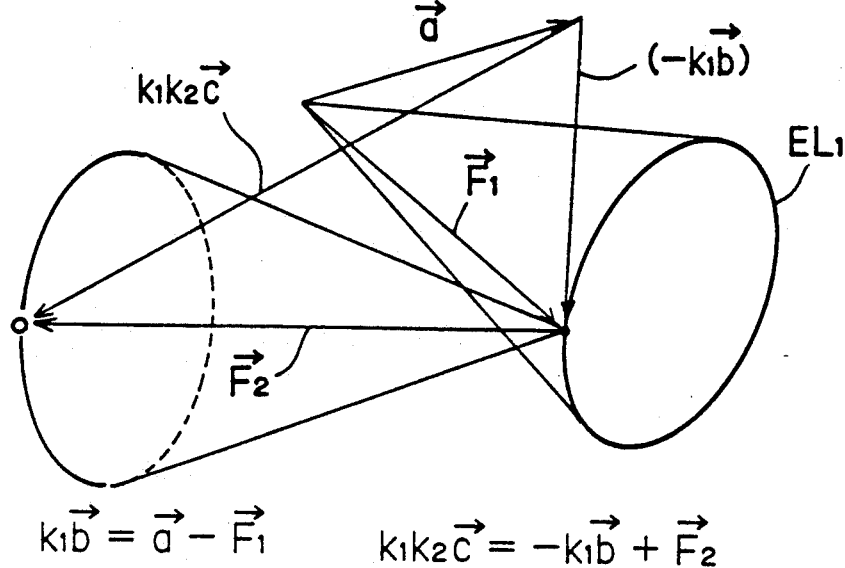

These situations are schematically shown in FIG. 10. The vector $\vec{a}$ is converted into the vector $(k_1\vec{b})$ by the reflection from the first inclined mirror 41a, and the vector $(k_1\vec{b})$ is converted into the vector $(k_1k_2\vec{c})$ by the reflection from the second inclined mirror 41b. The respective conversions are indicated by points on the ellipses $EL_1$ and $EL_2$. The analysis described below relates to the vector $(k_1k_2\vec{c})$, which is different in length from the vector $\vec{c}$. Since what is to be determined is not the length of the vector $\vec{c}$ but the direction thereof, no problem occurs by the difference.

After the above-mentioned preparation, reference is made to FIGS. 11 to 14, which illustrates a relation between the ellipses $EL_1$ and $EL_2$ of FIG. 10 two-dimensionally, schematically and conceptually. The closed circles of FIGS. 11 to 14 indicate the terminal points of the vector $(-k_1\vec{b})$, and the open circles indicate the terminal points of the vector $(d_1k_2\vec{c})$. The ellipses $EL_2$ are drawn in plurality around the ellipse $EL_1$ because the center of the ellipse $EL_2$ changes according to the position of the terminal point of the vector $(-k_1\vec{b})$.

Figure 11:
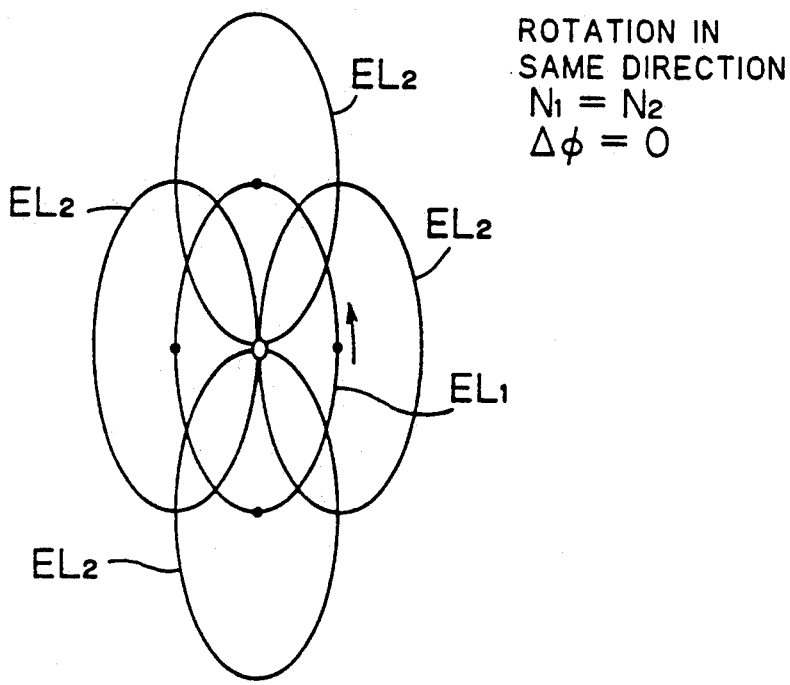
FIG. 11 is a two dimensional schematic view for determining a reflection direction of the laser beam where the first and second inclined mirrors are equal in rotation direction, in the number of rotations and in rotation phase.

FIG. 11 shows the case where the first and second inclined mirrors 41a and 41b rotate in the same direction (counterclockwise in FIG. 11) and have the same number of rotations $N_1$ and $N_2$, and the phase difference $\Delta\phi$ given by the formula (9) is zero. The phase $\phi_1$ is defined as zero when the closed circle is at the top of the ellipse $EL_1$, and the phase $\phi_2$ is defined as zero when the open circle is at the bottom of the ellipse $EL_2$. When the first and second inclined mirrors 41a and 41b rotate, changes in reflecting angle due to the rotations are cancelled and the terminal point (indicated by the open circle) of the vector $(k_1k_2\vec{c})$ remains at the same point.

$$\Delta\phi = \phi_1 - \phi_2 \quad (9)$$

Figure 12:
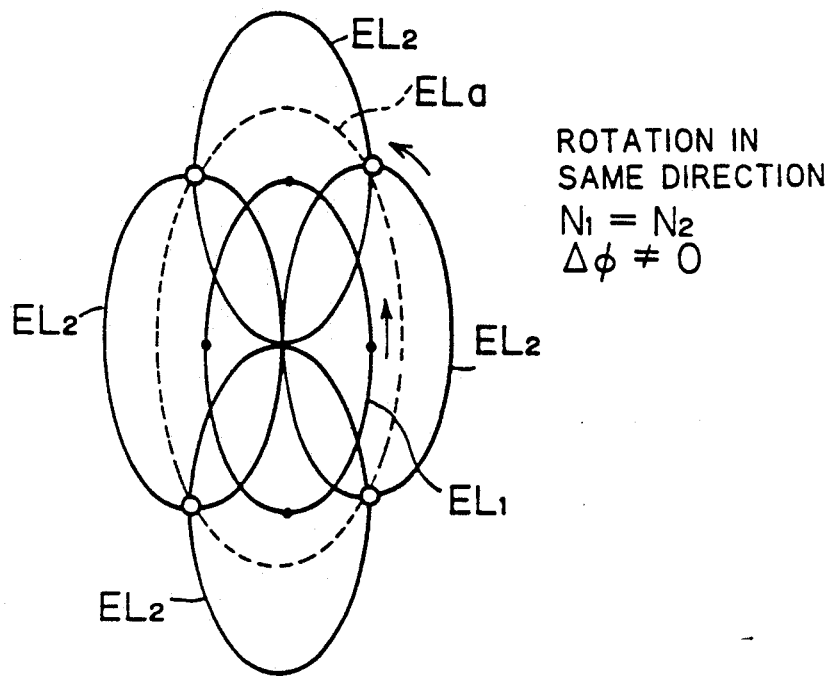
FIG. 12 is a two dimensional schematic view for determining the reflection direction of the laser beam where the first and second inclined mirrors are equal in rotation direction and in the number of rotations and are different in rotation phase.

FIG. 12 shows the case where the phase difference $\Delta\phi$ is a finite value (and other conditions are the same as in the case of FIG. 11). The locus of the terminal point of the vector $(k_1k_2\vec{c})$ draws an ellipse $EL_1$. Various changes in phase difference $\Delta\phi$ change the size of the ellipse $EL_a$ as the locus of the open circle.

Figure 13:
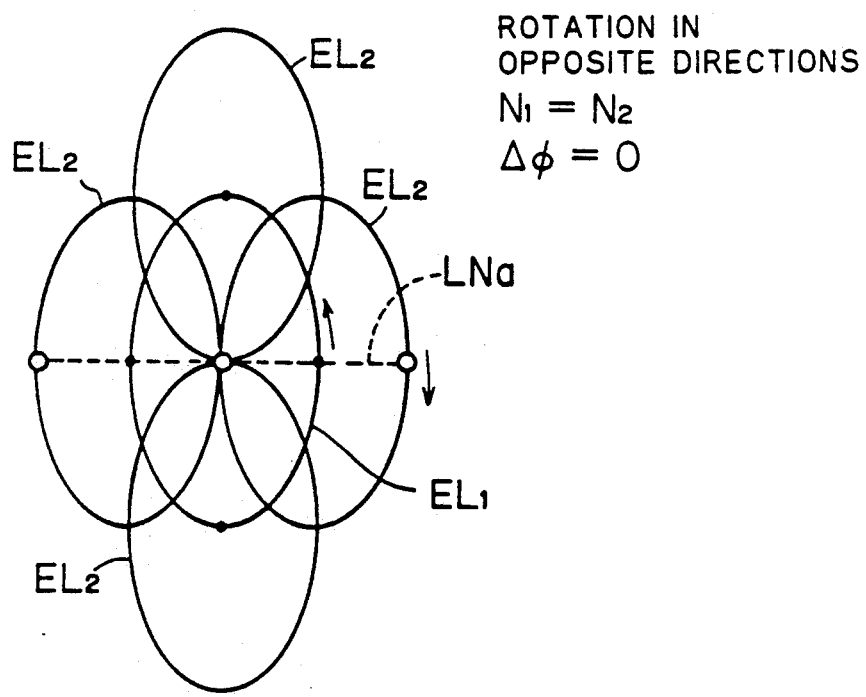
FIG. 13 is a two-dimensional schematic view for determining the reflection direction of the laser beam where the first and second inclined mirrors are opposite in rotation direction, and are equal in the number of rotations and in rotation phase.

FIG. 13 shows the case where the first and second inclined mirrors 41a and 41b rotate in the opposite directions (clockwise and counterclockwise) and have the same number of rotations $N_1$ and $N_2$, and the phase difference $\Delta\phi$ is zero. The terminal point of the vector $(k_1k_2\vec{c})$ reciprocates on a line segment $LN_a$.

Figure 14:
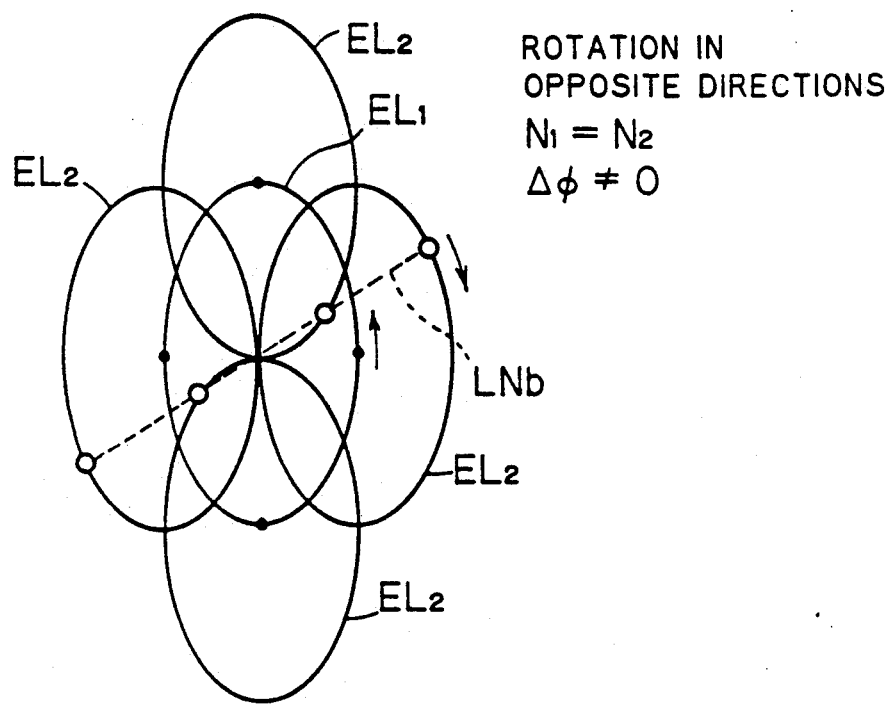
FIG. 14 is a two-dimensional schematic view for determining the reflection direction of the laser beam where the first and second inclined mirrors are opposite in rotation direction, are equal in the number of rotations, and are different in rotation phase.

FIG. 14 shows the case where the phase difference $\Delta\phi$ is a finite value (and other conditions are the same as in the case of FIG. 11). The terminal point of the vector $(k_1k_2\vec{c})$ reciprocates on a line segment $LN_b$. The line segments $LN_a$ and $LN_b$ are different in direction and length.

In FIGS. 11 to 14, the ellipses $EL_1$ and $EL_2$ are shown in the same size and direction. The sizes and directions of the ellipses $EL_1$ and $EL_2$ change variously according to the values of the angles $\theta_1$, $\theta_2$, $\Delta\theta_1$, $\Delta\theta_2$ shown in FIGS. 4 and 5. However, the properties shown in FIGS. 11 to 14 are maintained in such general cases. As described above, since the direction of the vector $\vec{c}$ is the same as that of the vector $(k_1k_2\vec{c})$, the properties in the preferred embodiment can be generalized as follows:

(1) When the first and second inclined mirrors 41a and 41b rotate with the same number of rotations in the same direction, the terminal point of the vector $\vec{c}$ travels on an ellipse, and the size of the ellipse changes according to the phase difference $\Delta\phi$.

(2) When the first and second inclined mirrors 41a and 41b rotate with the same number of rotations in the opposite directions, the terminal point of the vector $\vec{c}$ reciprocates on a line segment, and the length and direction of the line segment change according to the phase difference $\Delta\phi$.

The aforesaid results by the qualitative consideration have been also confirmed by computer simulations which use the formulas (3) and (4).

Figure 15:
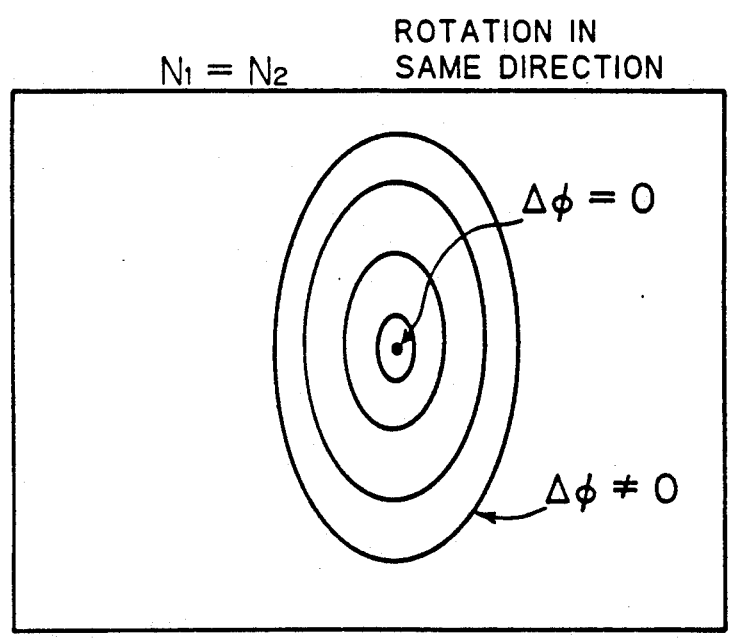
FIG. 15 illustrates an example of simulation results of rotations in the same direction.

FIG. 15 shows an example of the simulation results of the rotations in the same direction. The terminal point of the vector $\vec{c}$ travels on an ellipse, and the size of the ellipse changes according to the phase difference $\Delta\phi$.

Figure 16:
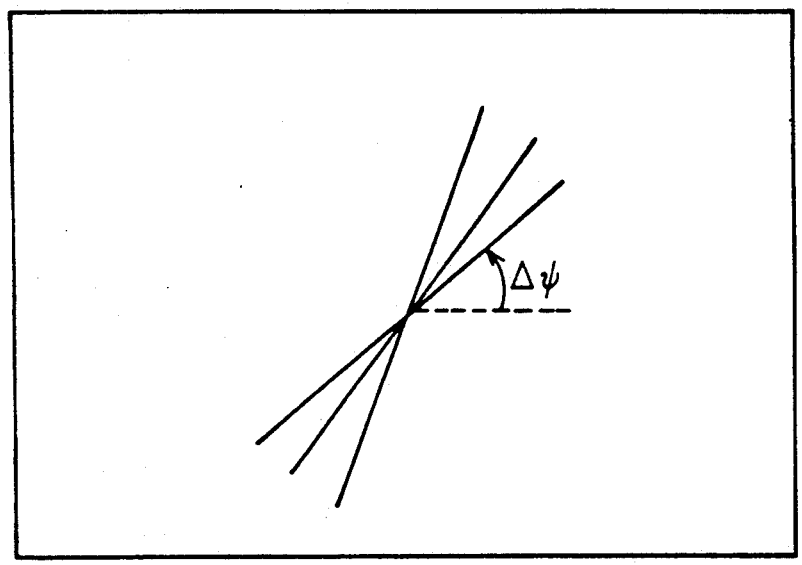
FIG. 16 illustrates an example of simulation results of rotations in opposite directions.

FIG. 16 shows an example of the simulation results of the rotations in the opposite directions. The locus of the terminal point of the vector $\vec{c}$ draws a line segment, and the length and inclination angle $\Delta\phi$ of the line segment change according to the phase difference $\Delta\phi$.

After reflected by the parabolic mirror 36 (FIG. 1), the laser beam LB illuminates on the workpiece. The change after the reflection also has the similar properties. When the first and second inclined mirrors 41a and 41b rotate while the laser torch 7 travels in the B direction along the butted portion 23 of FIG. 3, two modes can be selectively used as the locus of the laser beam LB on the butted portion 23.

One of the modes is a spin mode shown in FIG. 17. The spin mode is achieved by the rotations of the first and second inclined mirrors 41a and 41b in the same direction. The laser beam LB spins on the ellipse relative to the torch 7. When the torch 7 travels in the B direction (in FIG. 3) along the butted portion 23, the locus of the laser beam LB is spiraled. A pitch $p_1$ of the spiral locus (hereinafter referred to as a spin pitch) is determined by the ratio of the number of rotations $N_1$ ($=N_2$) to the travelling speed of the torch 7. A width $W_1$ of the spiral locus (hereinafter referred to as a spin diameter) changes depending on the rotation phase difference $\Delta\phi$.

The other is a scan mode shown in FIG. 18. The scan mode is achieved by the rotations of the first and second inclined mirrors 41a and 41b in the opposite directions. The laser beam LB scans on the line segment relative to the torch 7. The locus of the laser beam LB when the torch 7 travels in the B direction is wavelike. A pitch $p_2$ of the wavelike locus (hereinafter referred to as a scan pitch) is determined by the ratio of the number of rotations $N_1(=N_2)$ to the travelling speed of the torch 7. A width $W_2$ of the wavelike locus (hereinafter referred to as a scan width) changes depending on the rotation phase difference $\Delta\phi$.

The welding of the workpieces 21 and 22 by weaving can be performed in the desired mode by selecting the weaving mode from the two modes and providing the command values of the rotation direction, the numbers of rotations $N_1$, $N_2$ and the rotation phase difference $\Delta\phi$ corresponding to the selected mode. When the numbers of rotations $N_1$, $N_2$ and the rotation phase difference $\Delta\phi$ are not fixed but are changed according to the travelling direction of the torch 7, the spin diameter $W_1$ and the scan width $W_2$ can be made approximately constant independently on the change in the travelling direction of the torch 7.

Since it is unnecessary to fluctuate the torch 7 itself, the weaving in the two modes can be performed at high speed. Since the parabolic mirror 36 is neither rotated nor fluctuated, the weaving does not cause the increased size of the portion adjacent to the torch 7 and complicated mechanisms.

(E) Another Structure of Robot

Figure 19:
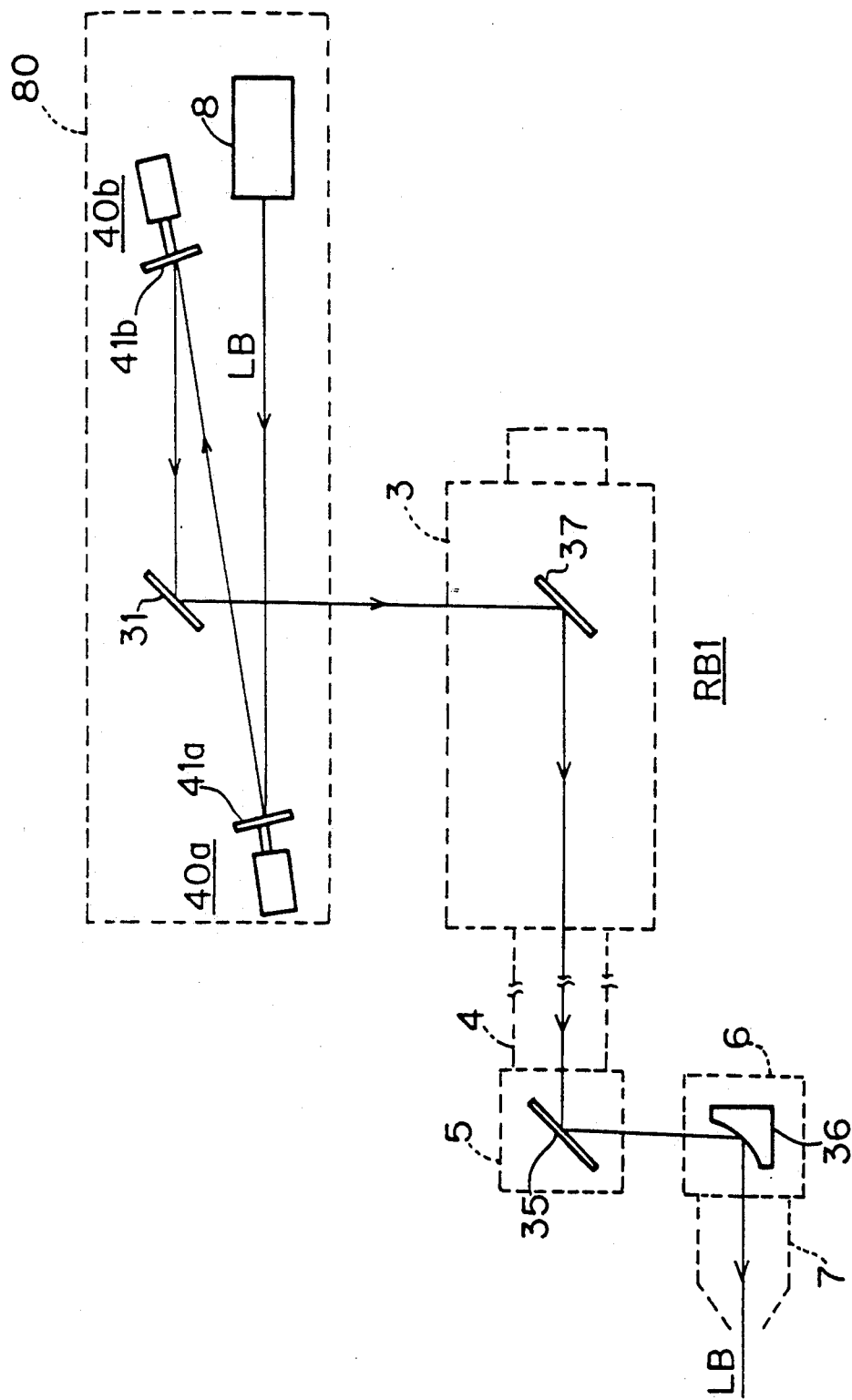
FIG. 19 schematically shows an optical structure of the laser welding robot according to another preferred embodiment of the present invention.

FIG. 19 shows another structure for the optical arrangement. In this example, the first and second inclined mirrors 41a and 41b are mounted in a laser oscillating unit 80. Before the laser beam LB enters the arm of a robot RB1, the laser beam LB is periodically deflected. As a result, only a fixed mirror 37 should be disposed in the lift body 3, so that the weight of a movable portion of the robot RB can be prevented from increasing.

(F) Method of Controlling Mirrors

It has been described above that the weaving of the laser beam LB in the spin or scan mode can be achieved by the combinations of the number of rotations $N_1$, $N_2$ and rotation directions of the first and second inclined mirrors 41a and 41b and the rotation phase difference $\Delta\phi$ therebetween. Description will be given hereinafter on a method of controlling the first and second inclined mirrors 41a and 41b for the weaving of the laser beam LB in the predetermined mode along a predetermined weld line on the workpiece.

Figure 20:
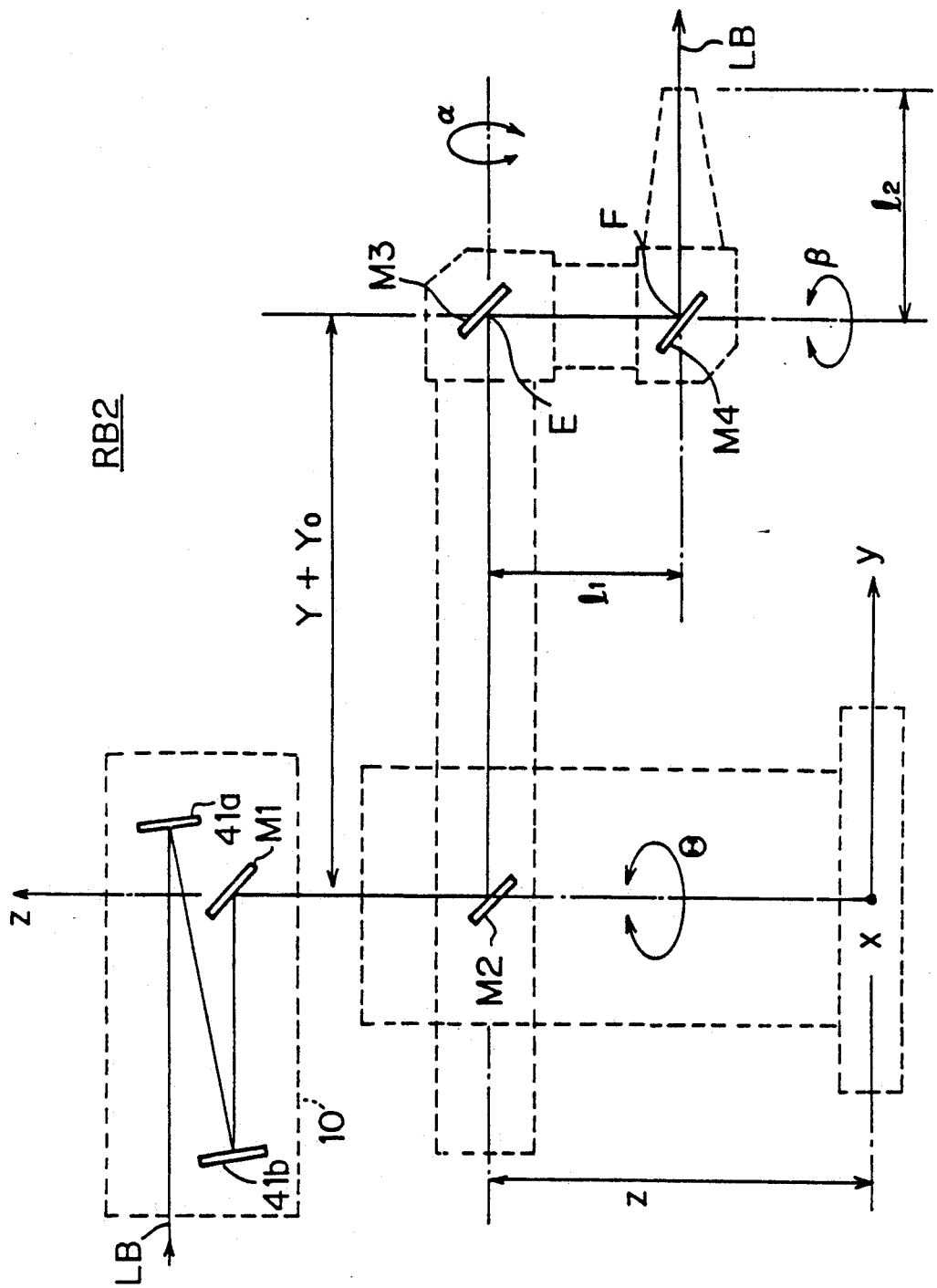
FIG. 20 schematically illustrates an optical system of a laser robot which has an optical arrangement similar to the laser robot shown in FIG. 19, and degrees of freedom of respective drive portions of the robot.

FIG. 20 schematically illustrates an optical system of a laser robot RB2 which has the optical arrangement similar to the laser robot RB1 of FIG. 19 and the degrees of freedom of respective drive portions of the robot RB2. A beam weaver 10 is a unit corresponding to the optical system excluding the laser oscillator 8 from the laser oscillating unit 80 of FIG. 19 and constitutes the nucleus of the light beam deflector. The laser beam LB which enters the beam weaver is reflected in series by the first and second inclined mirrors 41a and 41b and a fixed mirror M1 to be introduced to the body of the laser robot RB2. The optical path of the laser beam LB is shown in FIG. 20 on the assumption that the first and second inclined mirrors 41a and 41b are not rotating. The laser beam LB is further reflected in series by fixed mirrors M2 to M4 mounted in the body of the robot RB2 to be introduced to the tip of the torch 7, as described above.

In FIG. 20, similarly to FIG. 2, a Cartesian coordinate system xyz is defined on the base 1. The revolution angle of the revolving column 2 on the revolution axis z is represented by an angle $\Theta$. The pivot angle of the first pivotal body 5 supported at the leading edge of the horizontal arm 4 on the axis Y is represented by an angle $\alpha$. The pivot angle of the second pivotal body 6 on the axis V is represented by an angle $\beta$.

It is apparent from FIG. 20 that the mirror M2 to M4 themselves are fixed and do not rotate. However, by the revolution of the revolving column 2, the mirror M2 is made to revolve at the angle $\Theta$. Assuming that the laser beam LB emitted from the beam weaver 10 is not periodically deflected, the planes of incidence of the laser beam LB reflected by the mirror M1 on the mirror M2 are different depending on processing points. The directions in which the laser beam LB is reflected from the mirror M2 are accordingly different depending on the processing points. The same is true for the mirrors M3 and M4. For determining the direction in which the laser beam LB is emitted from the tip of the torch 7, consideration must be given to not only the periodical deflection that the laser beam LB is subjected to when passing through the beam weaver 10 but also the influences of the revolution of the mirror M2 and the pivots of the mirrors M3 and M4 with the travel of the torch 7 along the weld line. This means that, for accurate control of the motors 42a and 42b (not shown in FIG. 20) of the first and second inclined mirrors 41a and 41b in the beam weaver 10, the command values to be applied to the motors 42a and 42b must be determined by the informations of the weld line and welding conditions including the influences of the revolution of the mirror M2 and the pivots of the mirrors M3 and M4. However, since the handlings of the influences are different depending on the weaving mode of the laser beam LB, the methods of controlling the mirrors in the spin and scan modes will be discussed separately

(i) Method of Controlling Mirrors in Spin Mode

In the spin mode shown in FIG. 17, there is no need to consider the influences of the mirrors M2 to M4 because the laser beam LB scan while drawing the spiral locus along the weld line (corresponding to the butted portion 23 of FIG. 3) on the workpiece. The command values for controlling the motors 42a and 42b are uniquely determined by the informations (the spin diameter and the like) of the locus and the travelling speed of the torch 7.

Figure 21:
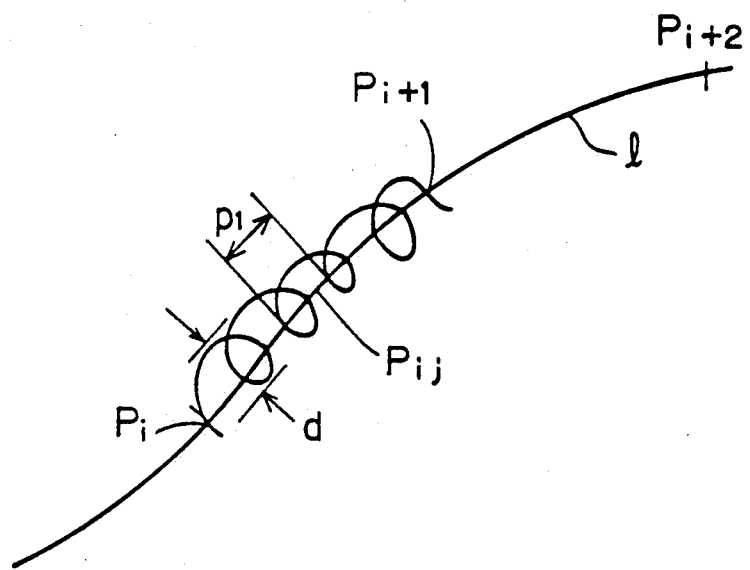
FIG. 21 schematically illustrates scanning of the laser beam along a weld line drawing a spiral locus on workpieces.

FIG. 21 schematically illustrates the scanning of the laser beam LB along the weld line 1 while drawings the spiral locus on the workpiece. Points $P_i$, $P_{i+1}$, $P_{i+2}$ are processing points which are subjected to teaching, and a point $P_{ij}$ is an interpolated processing point. In FIG. 21, the torch 7 is moving from the point $P_i$ to the next point $P_{i+1}$.

The welding speed of the laser robot RB2 is represented by a speed v, the spin diameter is represented by the reference character d, and the spin pitch is represented by the reference character $p_1$. The first and second inclined mirrors 41a and 41b are equal in rotation direction and in the number of rotations in the spin mode. The spin pitch $p_1$ is the distance the laser beam LB is scanned on the workpiece during one rotation of the first inclined mirror 41a. Accordingly, the numbers of rotations $N_1$ and $N_2$ of the mirrors 41a and 41b are expressed by:

$$N_1 = N_2 = V/p_1 \tag{10}$$

The rotation phase difference $\Delta\phi$ is approximately expressed by:

$$\Delta\phi = 2\sin^{-1}\left(\frac{d}{4(\Delta\theta_1 + \Delta\theta_2)f_0}\right) \tag{11}$$

where $\Delta\phi_1$ and $\Delta\phi_2$ are the inclination angles (see FIG. 5) of the first and second inclined mirrors 41a and 41b, respectively, and $f_0$ is the focal length of the mirror M4 (corresponding to the parabolic mirror 36 of FIG. 19). The angles $\Delta\theta_1$, $\Delta\theta_2$ and the length $f_0$ are constant. Hence, the rotation phase difference $\Delta\phi$ can be uniquely determined by the designation of the spin diameter d.

The derivation of the formula (11) will be described below. For this purpose, it is assumed that the first and second inclined mirrors 41a and 41b are ideally, sufficiently spaced apart from each other to the extent that the angles $\theta_1$ and $\theta_2$ of the mirrors are approximately equal to zero. On this assumption, it is considered that both loci of the laser beam LB reflected by the first and second inclined mirrors 41a and 41b draw circles.

Figure 22:
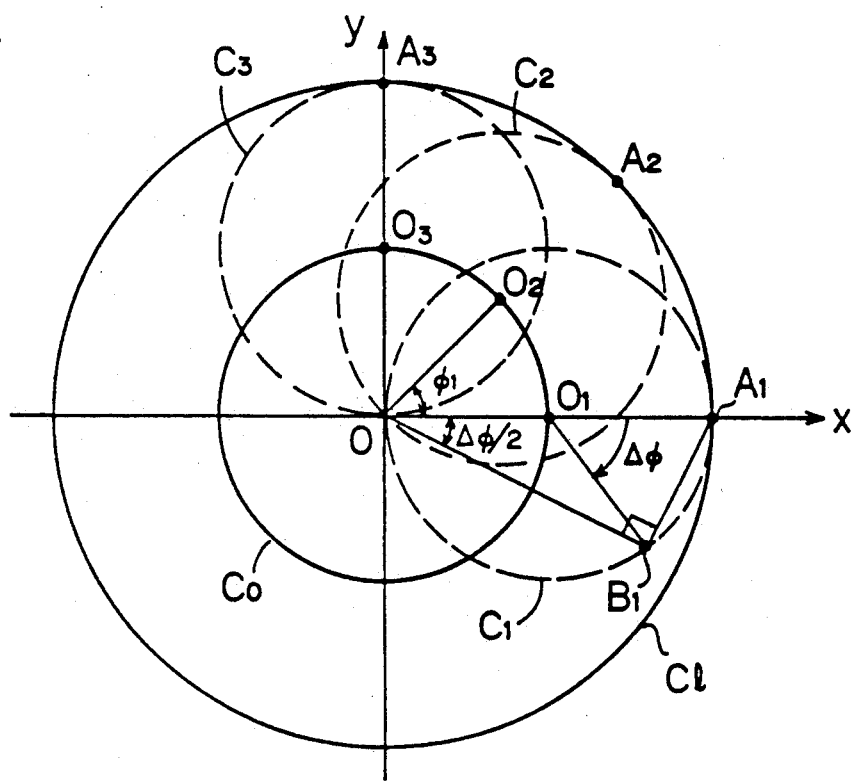
FIG. 22 illustrates loci of the laser beam where the first and second inclined mirrors are in an ideal state.

FIG. 22 shows the loci of the laser beam LB under these conditions. For simplification, it is assumed in FIG. 22 that the inclination angles $\Delta\theta_1$ and $\Delta\theta_2$ of the mirrors 41a and 41b are equal as mentioned above.

In FIG. 22, a circle $C_0$ indicates the locus of the laser beam LB reflected by the first inclined mirror 41a, and corresponds to the locus of the terminal point of the vector $(-k_1b)$ shown in FIG. 9. The locus of the laser beam LB reflected by the second inclined mirror 41b draws a circle $C_1$ where the position of the laser beam LB reflected by the first inclined mirror 41a on the locus is a point $O_1$ when the rotation phase of the first inclined mirror 41a is zero. When the rotation phase of the second inclined mirror 41b is also zero, the position of the laser beam Lb reflected by the second inclined mirror 41b on the locus is a point $A_1$. The position of the laser beam Lb reflected by the second inclined mirror 41b on the locus travels on the circle $C_1$ depending on degree of the lag or lead of the rotation phase of the second inclined mirror 41b.

A circle $C_2$ indicates the locus of the laser beam LB reflected by the second inclined mirror 41b where the rotation phase of the first inclined mirror 41a is $\phi_1$ (where a center $O_2$ is the position of the laser beam Lb reflected by the first inclined mirror 41 a on the locus). The position of the laser beam LB on the locus where the rotation phase of the second inclined mirror 41b is zero is a point $A_2$. Similarly, the position of the laser beam LB on the locus travels on the circle $C_2$ depending on degree of the lag or lead of the rotation phase of the second inclined mirror 41b. A circle $C_3$ indicates the locus of the laser beam LB reflected by the second inclined mirror 41b where the rotation phase of the first inclined mirror 41a is larger than the phase $\phi_1$. A point $A_3$ is the position of the laser beam LB on the locus when the rotation phase of the second inclined mirror 41b is zero.

When the rotation phase difference $\Delta\phi$ between the first and second inclined mirrors 41a and 41b is zero, the locus of the laser beam LB reflected by the second inclined mirror 41b is the circle $C_1$ having a center O and a radius $OA_1$. The laser beam LB which is deflected so that its locus draws the circle $C_1$ is condensed by the mirror M4 and, subsequently, is scanned on the workpiece to draw the spiral locus. That is, the radius $OA_1$ of the circle $C_1$ corresponds to the spin diameter d. Thus a spin diameter $d_0$ where the rotation phase difference $\Delta\phi$ is zero is expressed by:

$$d_0/2 = 2(\Delta\theta_1 + \Delta\theta_2)f_0 \tag{12}$$

Based on the foregoing description, the case where the rotation phase difference $\Delta\phi$ between the first and second inclined mirrors 41a and 41b is not zero will be considered. Assuming that the rotation phase of the first inclined mirror 41a is zero and the rotation phase of the second inclined mirror 41b lags behind by the phase $\Delta\phi$ relative to the rotation phase of the first inclined mirror 41a, the position of the laser beam LB reflected by the second inclined mirror 41b on the locus is a point $B_1$ shown in FIG. 22. The locus of the laser beam LB reflected by the second inclined mirror 41b draws a circle having a center O and a radius $OB_1$. The spin diameter d is expressed by:

$$d/2 = 2(\Delta\theta_1 + \Delta\theta_2)f_0\cos(\Delta\phi/2) \tag{13}$$

In the practical robot, for convenience, the rotation phase difference $\Delta\phi$ is treated as:

$$\Delta\phi = \pi - \Delta\phi \tag{14}$$

When the formula (13) is expressed by the use of the formula (14), the formula (15) for the spin diameter d is obtained.

$$d/2 = 2(\Delta\theta_1 + \Delta\theta_2)f_0\sin(\Delta\phi/2) \tag{15}$$

When the formula (15) is solved for the rotation phase difference $\Delta\phi$, the formula (11) is obtained.

Hereinabove described are the relationships and principle, which are the basis of the method of controlling the first and second inclined mirrors 41a and 41b for weaving of the laser beam LB in the spin mode. Next discussed are steps for controlling the first and second inclined mirrors 41a and 41b in the practical robot on the basis of the principle.

Figure 23:
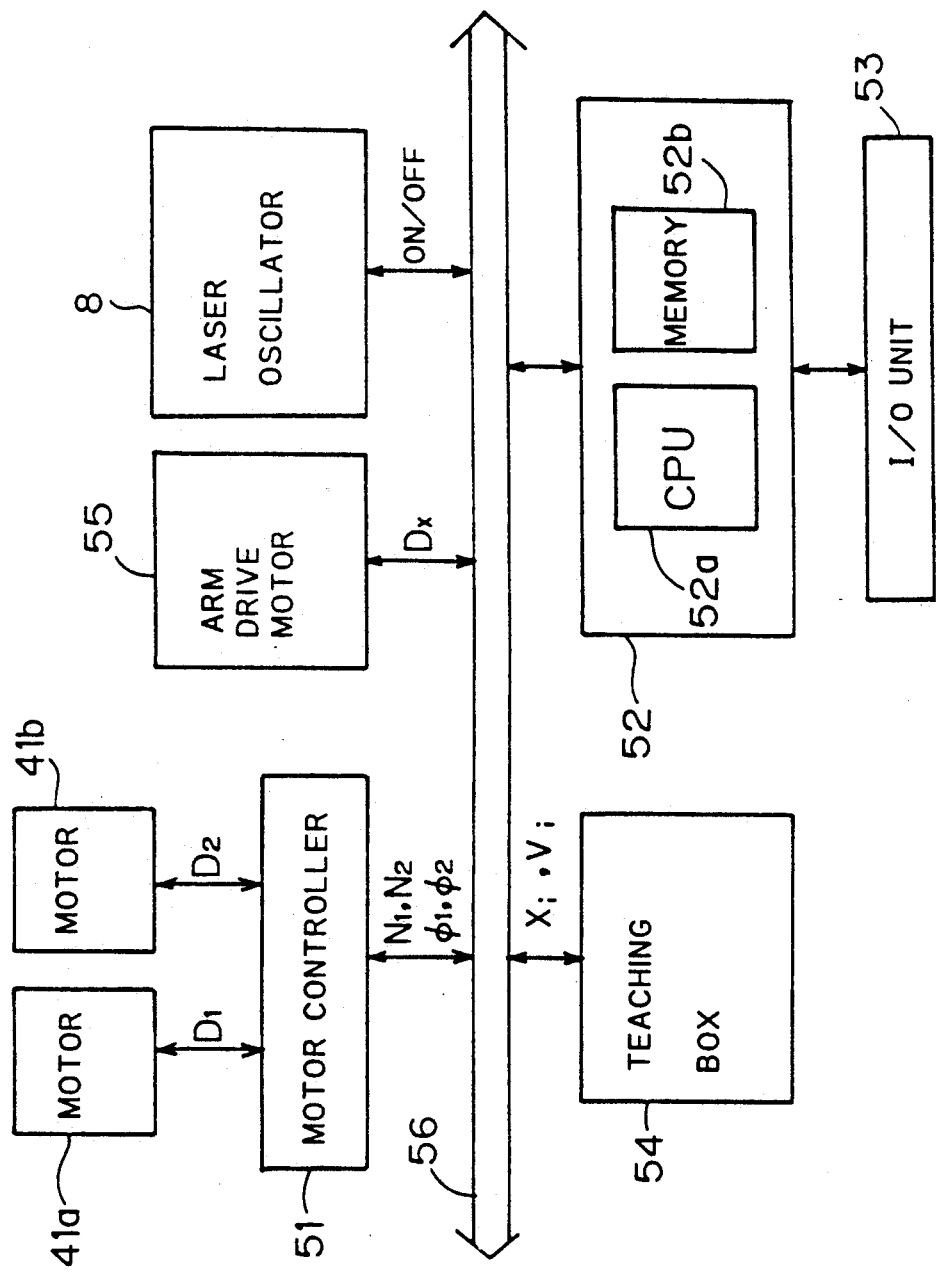
FIG. 23 is a block diagram of a control system of the laser robot.

In advance, the structure of the control system of the laser robot RB2 is again considered with reference to FIG. 23. FIG. 23 is a block diagram of the control system. All of the units but a teaching box 54 are controlled by the command values of the robot controller 52 through a bus 56. The teaching box 54 is an input unit for inputting teaching data and the specified values of various welding conditions such as the spin diameter d to the robot controller 52. The robot control 52 includes a CPU 52a and a memory 52b. The memory 52b stores the specified values transmitted from the teaching box 54 and the results of the playback calculated in the CPU 52a, etc.

Based on the above-mentioned preparation, the control procedure of the laser robot RB2 for weaving in the spin mode will be described later.

Figure 24:
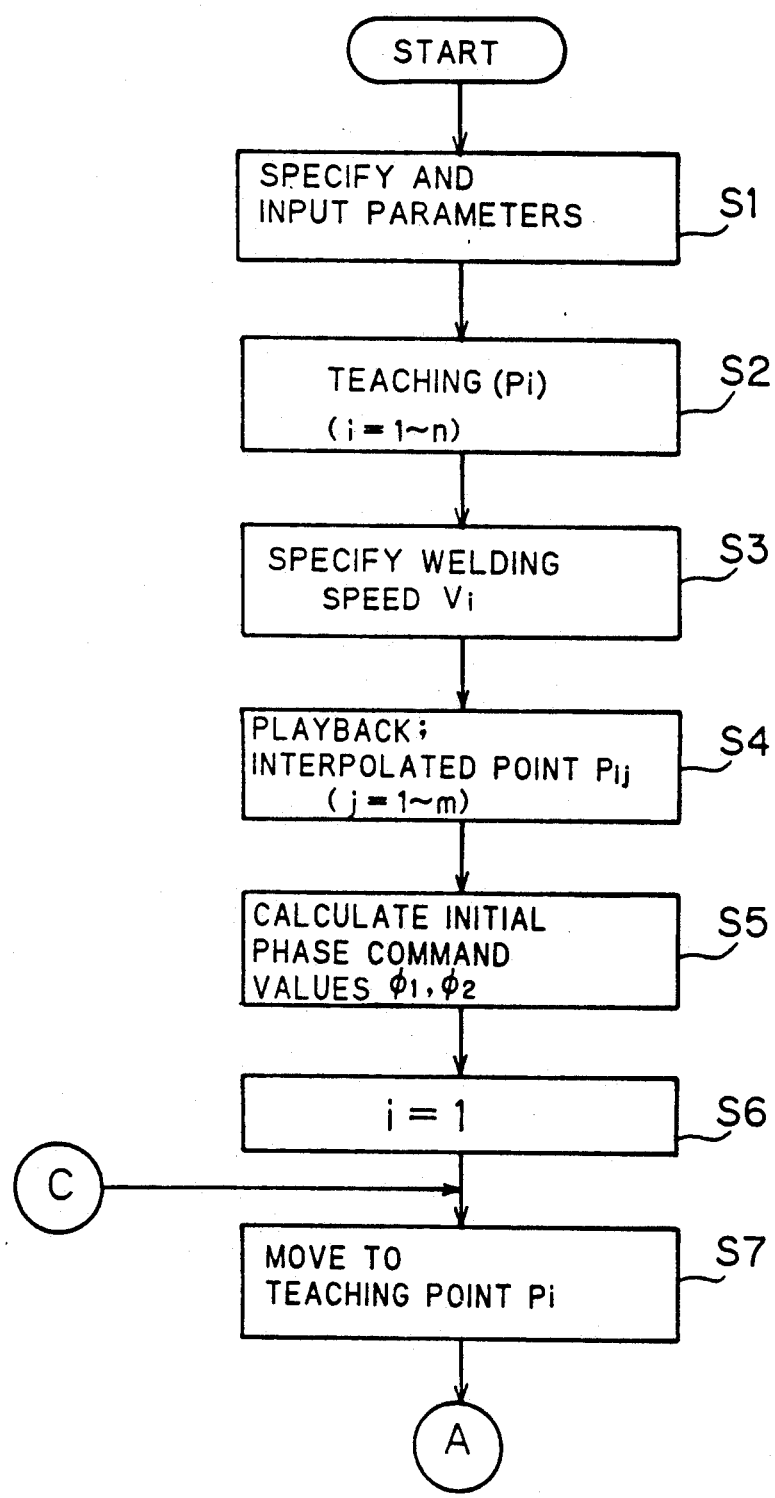
FIGS. 24 to 26 are a flow chart of a control procedure of the laser robot in the spin mode.
Figure 25:
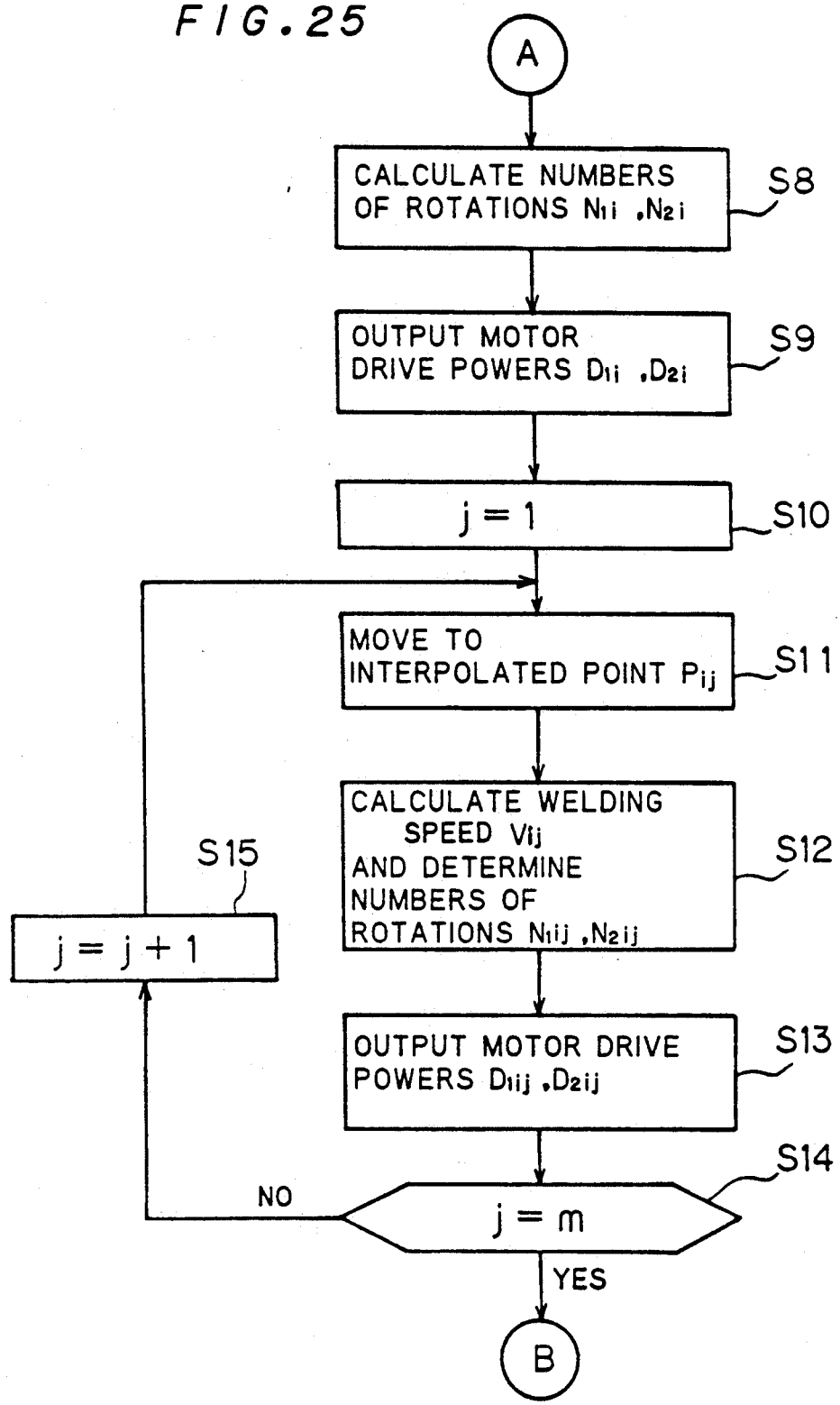
Figure 26:
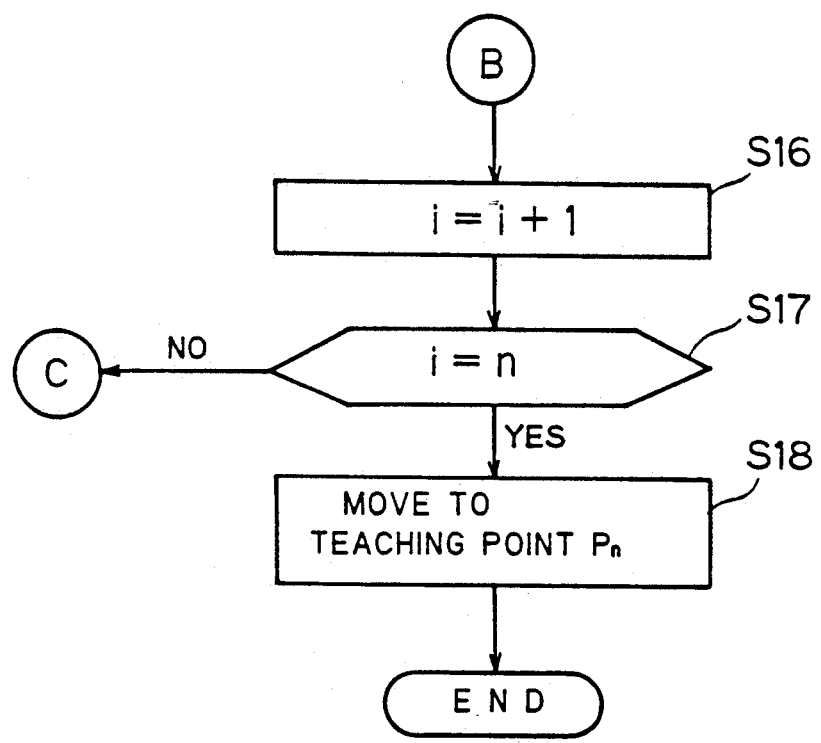

FIGS. 24 to 26 are a flow chart of the control procedure of the laser robot RB2.

In the step S1, various parameter for weaving in the spin mode are specified and inputted. The specified values of the spin pitch $p_1$, spin diameter d and initial phase command values $\phi_1$ of the first inclined mirror 41a are inputted by the teaching box 54. These data are stored in the memory 52b through the bus 56.

In the step S2, teaching is performed. As a result, the teaching data (Cartesian coordinates $X_i$ and joint coordinates $\alpha_i$ of the teaching points $P_i$) given from the teaching box 54 are stored in the memory 52b. It is assumed that the number of teaching points $P_i$ is n (i=1 to n).

In the step S3, welding speeds $v_i$ at the respective teaching points $P_i$ are specified and inputted by the teaching box 54 together with the teaching, and are stored in the memory 52b.

In the step S4, the playback (interpolation calculation) is performed as a function of the teaching data of the step S2. The Cartesian coordinates $X_{ij}$ of the interpolated points $P_{ij}$ (the j-th interpolated points from the point $P_i$ between the teaching points $P_i$ and $P_{i+1}$) are determined by interpolation. The interpolated values are inversely converted so that the joint coordinates $\alpha_{ij}$ of the points $P_{ij}$ are calculated by the CPU 52a to be stored in the memory 52b. For convenience, it is assumed that the number of interpolated points $P_{ij}$ is m (j=1 to m).

In the step S5, the initial phase command values $\phi_1$ and $\phi_2$ of the first and second inclined mirrors 41a and 41b are calculated, respectively. (The initial phase command value $\phi_1$ has already been given in the step S1.) That is, the CPU 52a reads out the specified value of the spin diameter d from the memory 52b to calculate the rotation phase difference $\Delta\phi$ between the mirrors 41a and 41b from the formula (11). From the calculated rotation phase difference $\Delta\phi$ and the initial phase command value $\phi_1$ of the first inclined mirror 41a which is read out from the memory 52b, the initial phase command value $\phi_2$ of the second inclined mirror 41b is determined by:

$$\phi_2 = \phi_1 - \Delta\phi \qquad (16)$$

to be stored in the memory 52b.

On completion of the above-mentioned preparation, the procedure of practically driving the laser robot RB2 is carried out. In the steps S6 and S7, the tip of the torch 7 of the laser robot RB2 is moved to the first teaching point $P_1$. This is achieved by applying a command signal $D_{x1}$ of the joint coordinate $\alpha_1$ of the first teaching point $P_1$ stored in the memory 52b to an arm drive motor 55 by the robot controller 52 to resultingly revolve and pivot the arms. For generalization of the following description, the first teaching point $P_1$ is replaced with the teaching point $P_i$ in the step S6.

In the step S8, the numbers of rotations $N_{1i}$, $N_{2i}$ of the first and second inclined mirrors 41a and 41b at the teaching point $P_i$ are calculated. Since the welding speed $V_i$ for the teaching point $P_i$ has been already specified in the step S3, the CPU 52a reads out necessary data from the memory 52b to determine the numbers of rotations $N_{1i}$, $N_{2i}$ from the formula (17).

$$N_{1i} = N_{2i} = V_i/p_1 \qquad (17)$$

In the step S9, the numbers of rotations $N_{1i}$, $N_{2i}$ of the first and second inclined mirrors 41a and 41b at the teaching point $P_i$, the initial phase command values $\phi_1$, $\phi_2$ and a rotation direction command value DS (a signal indicative of the same direction) are transmitted from the robot controller 52 to the motor controller 51. The motor controller 51 converts the transmitted command values into motor drive powers $D_{1i}$, $D_{2i}$ and outputs them to the motors 42a, 42b, respectively. At this time, the robot controller 52 outputs an ON signal to the laser oscillator 8, so that the laser beam LB oscillates. As a result, the laser beam LB is periodically deflected so that its locus draws an ellipse by the first and second inclined mirrors 41a and 41b which are subjected to the powers $D_{1i}$, $D_{2i}$ to make predetermined rotations.

In this state, the tip of the torch 7 is moved to the first interpolated point $P_{i1}$ (in the steps S10 to S11). A command value $D_{xi1}$ of the joint coordinate $\alpha_{i1}$ of the interpolated point $P_{i1}$ is transmitted from the robot controller 52 to the arm drive motor 55, so that the torch 7 travels along the weld line 1 to the interpolated point $P_{i1}$. This accomplishes the weaving of the laser beam LB in the spin mode between the teaching point $P_i$ and the interpolated point $P_{i1}$. For convenience, the interpolated point $P_{i1}$ is replaced with the interpolated point $P_{ij}$ in the step S10 to generalize the following description.

Figure 27:
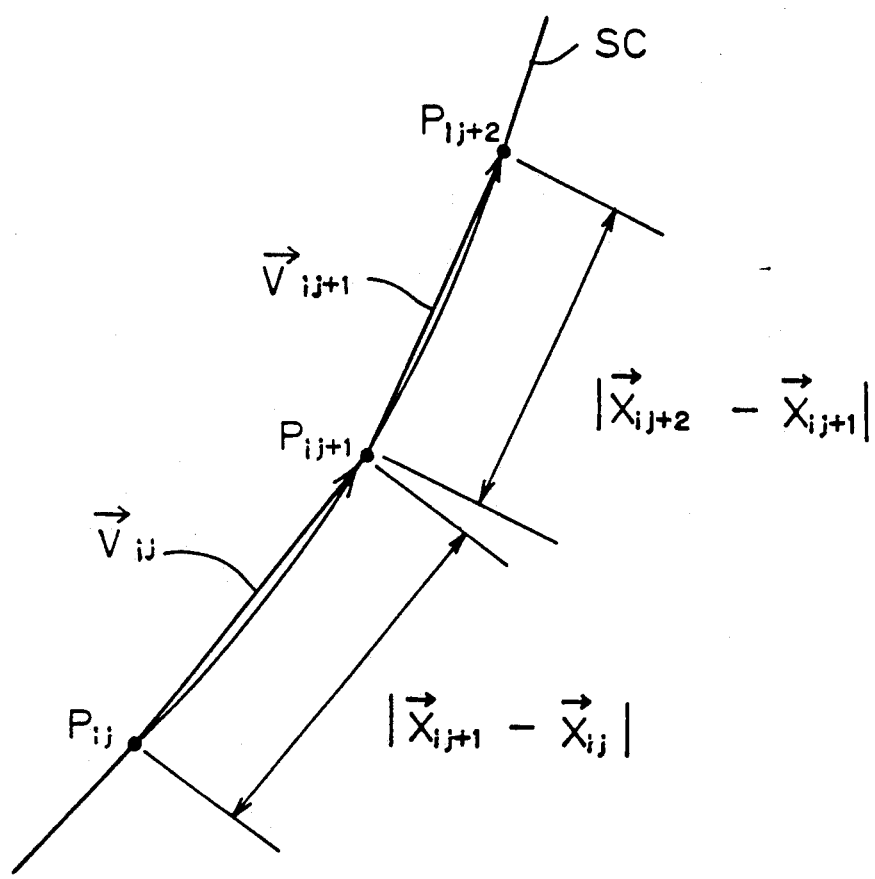
FIG. 27 illustrates interpolation by a curve SC.

In the steps S12, a welding speed $V_{ij}$ and the numbers of rotations $N_{1ij}$, $N_{2ij}$ of the first and second inclined mirrors 41a, 41b at the interpolated point $P_{ij}$ to which the torch 7 is moved are calculated. Various methods of calculating the welding speed $V_{ij}$ at the interpolated point $P_{ij}$ are employable depending on the type of interpolation for example, linear interpolation between the respective teaching points $P_i$ and interpolation by a curve like a parabola. As an example, interpolation between two teaching points $P_i$ and $P_{i+1}$ by a curve SC shown in FIG. 27 is considered in this preferred embodiment. To avoid complicated description, it is supposed that the welding speed $V_{ij}$ at each interpolated point $P_{ij}$ is determined by the travelling distance of the torch 7 between two adjacent interpolated points. Assuming that the laser robot RB2 is set so that the travelling time of the tip of the torch 7 between the interpolated points $P_{ij}$ and $P_{ij+1}$ is a constant value $\Delta t$, the welding speed $V_{ij}$ at the single interpolated point $P_{ij}$ is given by the formula (18) by the use of the position vectors $\overline{X}_{ij}$ and $\overline{X}_{ij+1}$ in the Cartesian coordinate system at the interpolated points $P_{ij}$ and $P_{ij+1}$.

$$V_{ij} = \frac{|\vec{X}_{ij+1} - \vec{X}_{ij}|}{\Delta t} \quad (18)$$

Similarly, the welding speed $V_{ij+1}$ at the next interpolated point $P_{hd\ ij+1}$ is given by:

$$V_{ij+1} = \frac{|\vec{X}_{ij+2} - \vec{X}_{ij+1}|}{\Delta t} \quad (19)$$

The welding speeds $V_{ij}$ at all of the interpolated points between the two points $P_i$ and $P_{i+1}$ can be determined by the aforesaid procedure. A welding speed $V_{im}$ at the last interpolated point $P_{im}$ is determined by the formula (20) by the use of the position vectors $X_{im}$ and $X_{i+1}$ in the Cartesian coordinate system at the interpolated point $P_{im}$ and the next teaching point $P_{i+1}$.

$$V_{im} = \frac{|\vec{X}_{i+1} - \vec{X}_{im}|}{\Delta t} \quad (20)$$

Description is given again on the step S12 based on the aforesaid description. The CPU 52a reads out the position data $X_{ij}$ and $X_{ij+1}$ of the interpolated points $P_{ij}$ and $P_{ij+1}$ from the memory 52b to calculate the welding speed $V_{ij}$ at the interpolated point $P_{ij}$ by the formula (18). The CPU 52a further reads out the specified value of the spin pitch p from the memory 52b to calculate the numbers of rotations $N_{1ij}$, $N_{2ij}$ at the interpolated point $P_{ij}$ by the following formula:

$$N_{1ij} = N_{2ij} = V_{ij}/p_1 \quad (21)$$

On determination of the numbers of rotations $N_{1ij}$ and $N_{2ij}$ at the interpolated point $P_{ij}$, the motor drive powers $D_{1ij}$ and $D_{2ij}$ are applied to the motors 42a and 42b respectively in the same procedure as the step S9 (in the step S13). When the interpolated point $P_{ij}$ is not the last interpolated point $P_{im}$ (in the step S14), the tip of the torch 7 is moved to the next interpolated point $P_{ij+1}$ (in the steps S15 and S11), so that the weaving of the laser beam LB is performed in the spin mode between the interpolated points $P_{ij}$ and $P_{ij+1}$. Until the tip of the torch 7 reaches the last interpolated point $P_{im}$, the procedure of the steps S11 to S13 is repeated (in the step S14). As a result, this accomplishes the weaving of the laser beam LB between all of the interpolated points (points $P_{i1}$ to $P_{im}$) along the weld line with the predetermined spin pitch $p_1$ and spin diameter d maintained.

In the steps S16 and S17, it is judged whether or not the next teaching point $P_{i+1}$ is the last teaching point $P_n$ to which the tip of the torch 7 is to be moved. When it is not judged that the teaching point $P_{i+1}$ is the teaching point $P_n$, the tip of the torch 7 is moved to the next teaching point $P_{i+1}$ (in the step S7). Thus the welding by weaving between the teaching points $P_i$ and $P_{i+1}$ is carried out by the laser beam LB.

A series of steps are executed until the tip of the torch 7 reaches the last teaching point $P_n$ in the step S17). When the tip of the torch 7 reaches the point $P_n$ (in the step S18), the weaving in the spin mode along the weld line 1 is completed.

In the foregoing description, the numbers of rotations $N_{1i}$, $N_{2i}$ and $N_{1ij}$, $N_{2ij}$ are determined after the determination of the welding speeds $V_i$ and $V_{ij}$ for each processing point, i.e., for each teaching point Pi and interpolated point $P_{ij}$, however, the present invention is not limited to this. The numbers of rotations $N_1$ and $N_2$ may be calculated on the assumption that the welding speeds $V_i$ at all of the processing points are approximately equal, depending on the welding conditions, for example, in the linear interpolation between the respective teaching points $P_i$. It is also practical to calculate the numbers of rotations $N_{1ij}$ and $N_{2ij}$ on the assumption that the welding speeds $V_{ij}$ at the respective interpolated points $P_{ij}$ are approximately equal to the welding speed $V_i$ at the preceding teaching point $P_i$.

(ii) Method of Controlling Mirrors in Scan Mode

Figure 28:
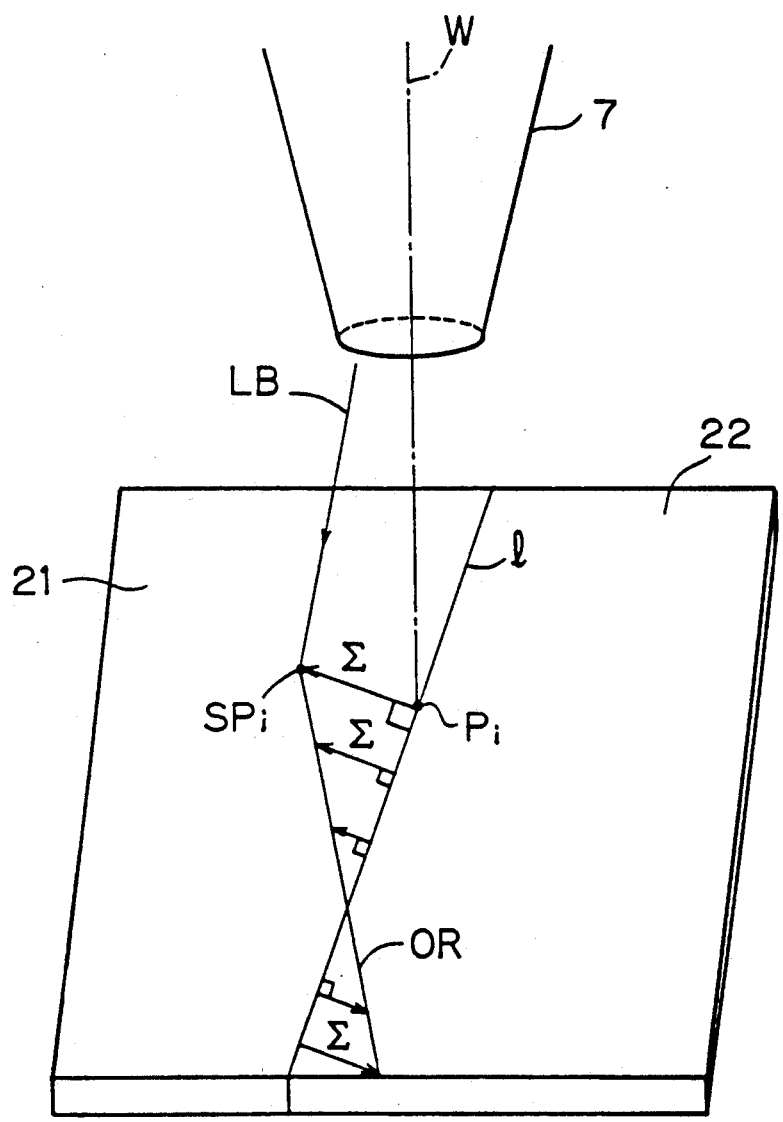
FIG. 28 schematically illustrates a relation between a beam spot of the laser beam on the workpiece and the weld line.
Figure 29:
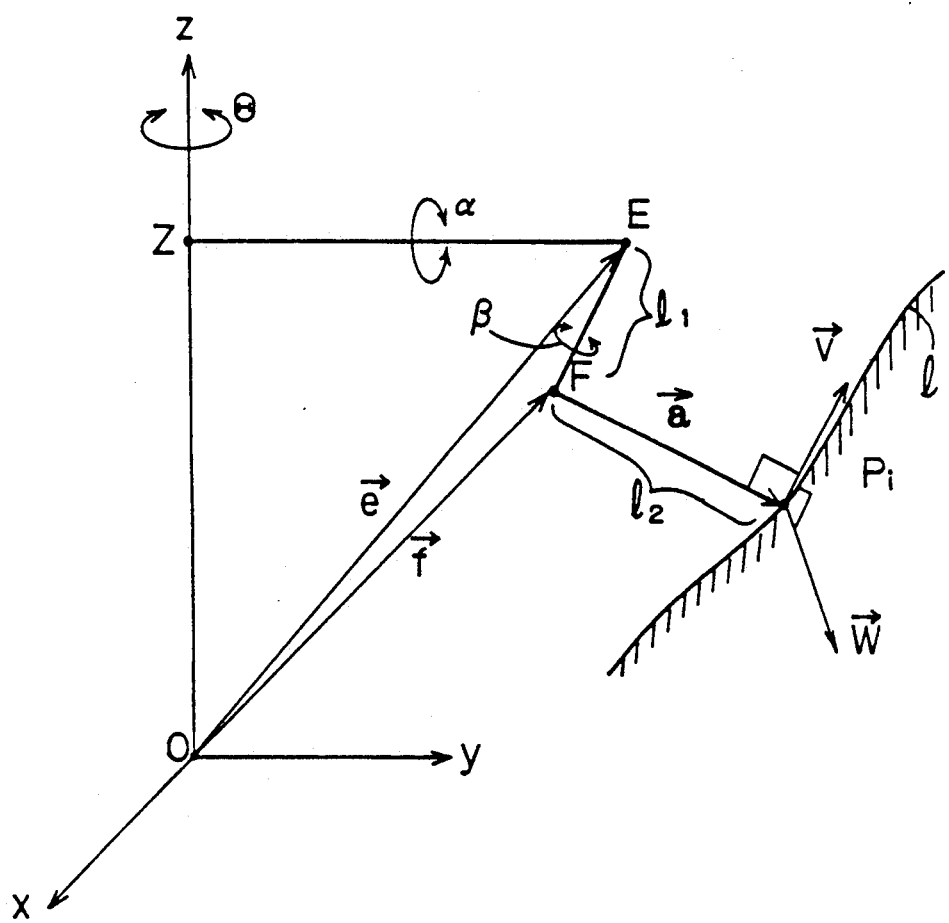
FIG. 29 schematically illustrates a positional relation between a torch vector and a processing point.

In the scan mode shown in FIG. 18, it is preferable that a beam spot $SP_i$ of the laser beam LB on the workpiece is constantly in the direction perpendicular to the weld line 1 as shown in FIG. 28. (The direction of the beam spot $SP_i$ on the workpiece as viewed from the processing point $P_i$ on the weld line 1 corresponds to an oscillation direction $\Sigma$ of the laser beam LB.) It is a normal practice in the laser welding to teach that the torch 7 should be positioned in the direction perpendicular to the surface of the workpiece in the teaching step before the laser welding step. A welding speed vector $\vec{v}$ of the torch 7 is tangential to the weld line 1. It is considered that the oscillation direction $\Sigma$ is suitably in the direction perpendicular to the vector $\vec{v}$ and a torch vector $\vec{a}_0$ which is parallel to the axis W of the torch 7. (A vector $\vec{w}$ is also defined in the same direction.) Such situations are schematically, conceptually illustrated in FIG. 29, which shows the joint coordinates $\Theta$, $\alpha$, $\beta$ of the laser robot RB2 and positional relation between the torch vector $\vec{a}_0$ and the processing point $P_i$.

To constantly maintain the torch vector $\vec{a}_0$ perpendicularly to the vectors $\vec{v}$ and $\vec{w}$, it is necessary to compensate for the influences of the revolution of the mirror M2 and the pivots of the mirrors M3 and M4. That is, it is necessary to determine the control command values of the motors 42a and 42b by the welding conditions (welding speed and the like), information (the vector $\vec{w}$) of the weld line 1 and the drive amounts (angles $\Theta$, $\alpha$, $\beta$) of the arms of the robot RB2.

The numbers of rotations $N_1$ and $N_2$ of the first and second inclined mirrors 41a and 41b at the predetermined time can be treated in the similar manner as in the spin mode. By the use of the welding speed vector $\vec{v}$ and scan pitch $p_2$ of the torch 7 at the predetermined time, the numbers of rotations $N_1$ and $N_2$ are expressed as:

$$N_1 = N_2 = V/p_2 \quad (22)$$

On the basis of the aforesaid respects, consideration is given to how the oscillation direction $\Sigma$ of the laser beam LB is adapted to be constantly in the direction of the vector $\vec{w}$ at the processing point $P_i$. This consideration corresponds to the discussion of the method of controlling the rotation phase difference $\Delta\phi$ between the mirrors 41a and 41b. For this purpose, it is essential to determine the direction in which the laser beam LB should be deflected (oscillated) at the outlet of the beam weaver 10. Accordingly, it is necessary to trace back changes in the oscillation direction of the laser beam LB from the processing point $P_i$ toward the outlet of the beam weaver 10.

Figure 30:
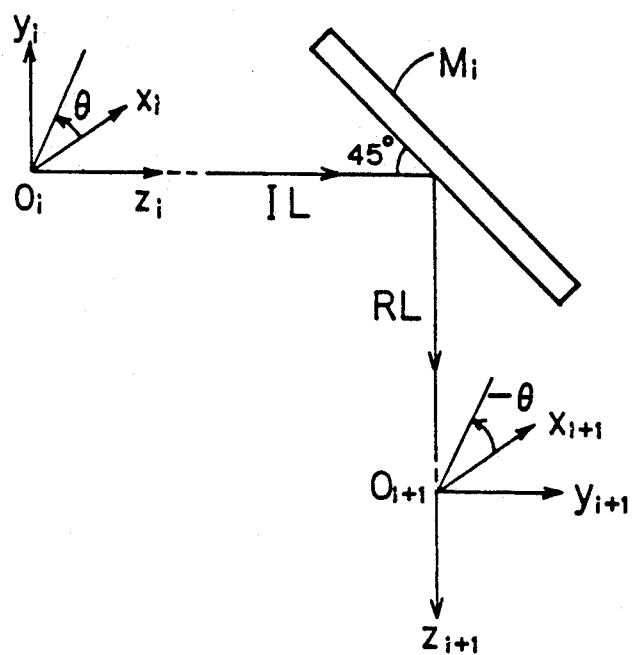
FIG. 30 schematically illustrates a change in oscillation direction where the laser beam which oscillates on a line having an inclination $\theta$ is reflected by a fixed mirror.
Figure 31:
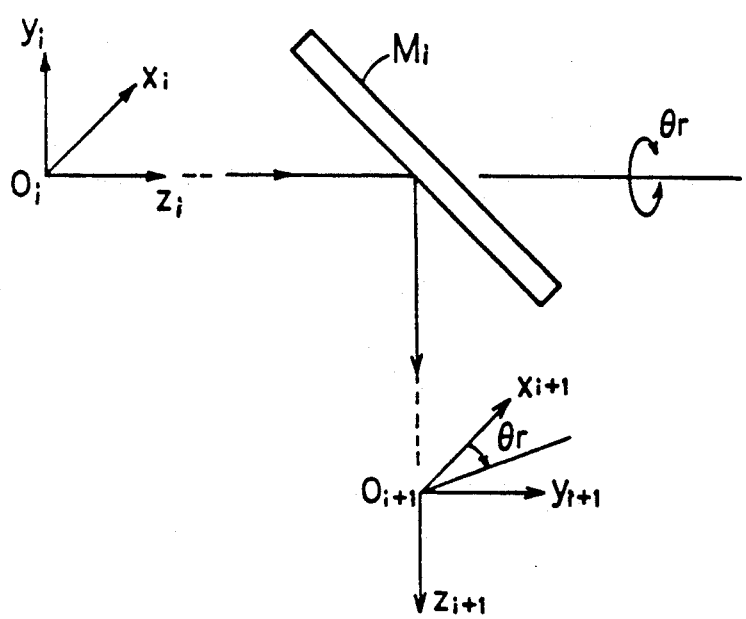
FIG. 31 schematically illustrates change in oscillation direction where the laser beam which oscillates on an $x_i$ axis is reflected by a mirror which revolves or pivots.

As a simple case, considered is the change in the oscillation direction of the laser beam LB after reflection where the laser beam LB oscillating in a direction is incident at 45° on a revolving or pivoting arbitrary mirror $M_i$, with reference to FIGS. 30 and 31 separately.

Referring to FIG. 30, a laser beam IL oscillating on a straight line which is in the $x_i Y_i$ plane and is inclined at an angle $\theta$ from the $xl$ axis is incident on the fixed mirror $M_i$. A coordinate system expressive of the incident beam IL is defined such that the $z_i$ axis is in the direction in which the incident beam IL travels, the $x_i$ axis is perpendicular to the incident beam IL and a reflected beam RL, and the $Y_i$ axis is perpendicular to the $x_i$ and $z_i$ axes. A coordinate system expressive of the reflected beam RL, which has $x_{i+1}$, $Y_{i+1}$, $z_{i+1}$ axes, is obtained by rotating the coordinate system expressive of the incident beam IL by 90° on the $x_i$ axis so that the $z_{i+1}$ axis is in the direction in which the reflected beam RL travels. In the definition of the two coordinate systems, the reflected beam RL oscillates on a straight line which is in the $x_{i+1} y_{i+1}$ plane and is inclined at an angle $-\theta$ from the $x_{i+1}$ axis Referring to FIG. 31, the incident beam IL oscillating on the xi axis is incident on the mirror $M_i$ revolving or pivoting on the $z_i$ axis at an angle $\theta_r$. The coordinate systems expressive of the incident beam IL and reflected beam RL are the same as those of FIG. 29. The reflected beam RL oscillates on a straight line which is in the $x_{i+1} Y_{i+1}$ plane and is inclined at the angle $\theta_r$.

In the combination of the cases of FIGS. 30 and 31, that is, in the case wherein the laser beam LB oscillating at the angle $\theta$ is reflected by the mirror Mi revolving or pivoting at an angle $\theta_{ri}$, an oscillation direction $\theta_i$ (an angle of inclination from the $x_{i+1}$ axis, which represents the oscillation direction of the laser beam LB hereinafter) is given by:

$$\theta_i = -\theta \cdot \theta_{ri} \quad (23)$$

When the laser beam LB reflected by the mirror $M_i$ is further reflected by the next mirror $M_{i+1}$ (revolving or pivoting at an angle $\theta_{ri+1}$), it is apparent that an oscillation direction $\theta_{i+1}$ after reflection is:

$$\begin{aligned}\theta_{i+1} &= -\theta_i + \theta_{ri+1} \\ &= (-1)^2 \theta + (-1)\theta_{ri} + \theta_{ri+1}\end{aligned} \quad (24)$$

In general, when the laser beam LB oscillating in an oscillation direction $\Psi_W$ is incident on an optical system including m-number of mirrors $M_i$ revolving or pivoting at the angle $\theta_{ri}$, it is found that the oscillation direction $\Psi$ of the laser beam LB reflected by the m-th (last) mirror $M_m$, is expressed by:

$$\Psi = (-1)^m \Psi_W + (-1)^{m-1}\theta_{ri} + \ldots + (-1)^0 \theta_{rm} \quad (25)$$

Figure 32:
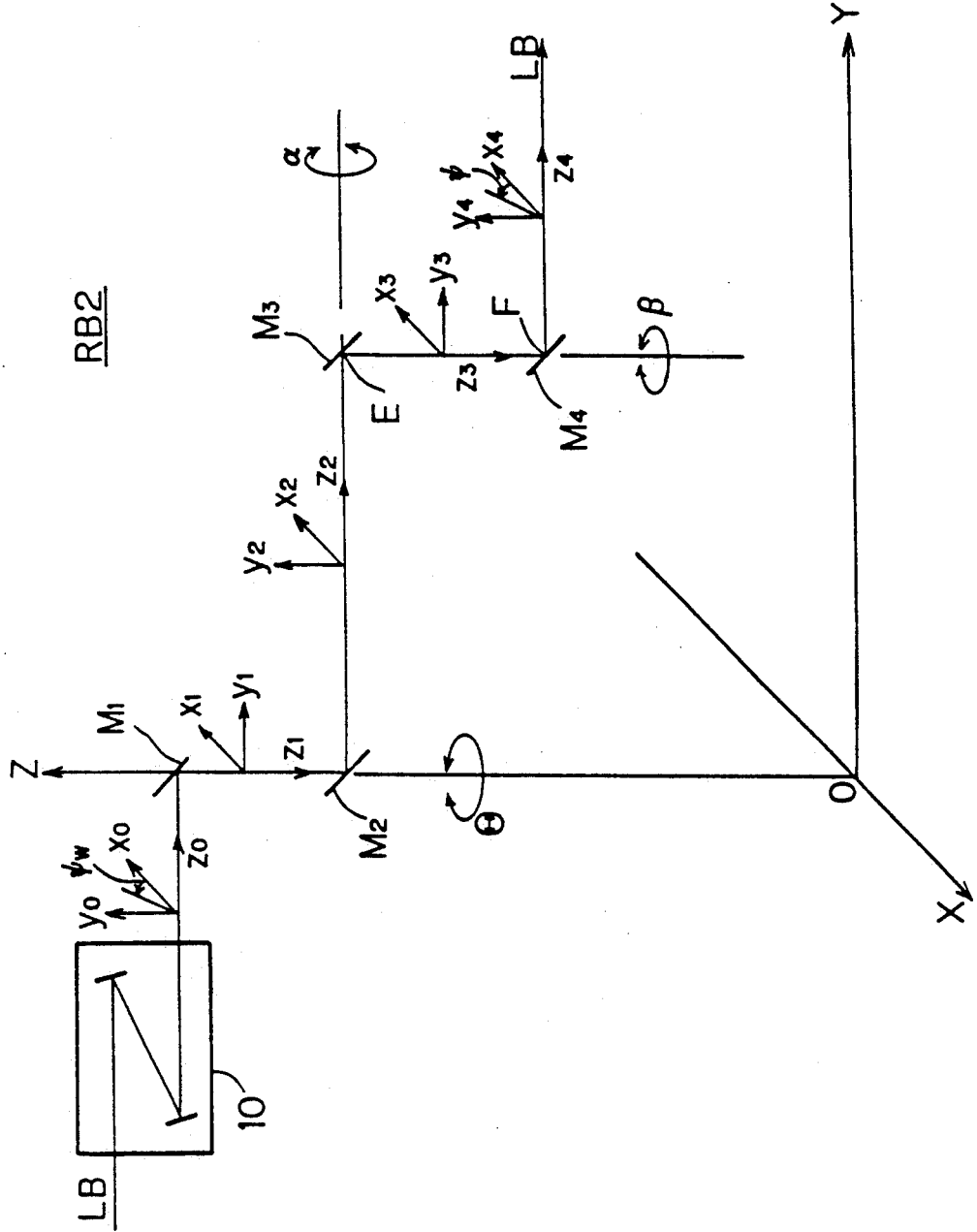
FIG. 32 illustrates coordinate systems determined for expression of the oscillation direction of the laser beam which is propagated while oscillating in the scan mode in the optical system of the laser robot.

The consideration results are applied to the laser robot RB2. FIG. 32 illustrates coordinate systems for the laser beam LB which is propagated while oscillating in the scan mode in the optical system of the laser robot RB2. The coordinate systems are arranged in accordance with the method of defining the coordinate system of FIG. 28. In the laser robot RB2, since the mirror M1 neither revolves nor pivots, the oscillation direction can be obtained by substituting $m=4$ and $\theta_{r1}=0$ in the formula (25). When the angles $\theta_{r2}$, $\theta_{r3}$, $\theta_{r4}$ are replaced with angles $\Theta$, $\alpha$, $\beta$, respectively, the oscillation direction $\Psi$ can be given by:

$$\Psi = \Psi_W + \Theta - \alpha + \beta \quad (26)$$

By using the torch vector $\vec{a}_0$ and the welding speed vector $\vec{v}$ at the predetermined time, the vector $\vec{w}$ can be expressed as:

$$\vec{w} = \frac{\vec{a}_0 \times \vec{v}}{|\vec{a}_0 \times \vec{v}|} \quad (27)$$

Since the torch vector $\vec{a}_0$ has a magnitude corresponding to the length $l_2$ of the torch 7 and a direction perpendicular to the direction of the welding speed vector $\vec{v}$, the vector $\vec{w}$ can be determined from the formula (27) by the determination of the magnitude and direction of the welding speed vector $\vec{v}$.

In FIG. 32, a coordinate system expressive of the laser beam LB reflected by the mirror M4 is defined such that the $z_4$ axis is parallel to the torch vector $-\vec{a} + \vec{a}_0$ the $y_4$ axis is parallel to a vector $\vec{EF}$ which connects the center E of the mirror M3 and the center F of the mirror M4.

The Cartesian coordinates of the points E and F, that is, the components of the vector $\vec{e}$ ($x_e$, $y_e$, $z_e$) and the components of the vector $\vec{f}$ ($x_f$, $y_f$, $z_f$) (see FIG. 29) are expressed in the joint coordinates ($\Theta$, Y, Z, $\alpha$, $\beta$) as described below.

The components of the vector $\vec{e}$ are respectively given by:

$$x_e = (Y + Y_0)\cos\Theta \quad (28)$$

$$y_e = (Y + Y_0)\sin\Theta \quad (29)$$

$$z_e = Z \quad (30)$$

where the constant $Y_0$ is an offset value.

Since the magnitude of the vector $\vec{EF}$ is $l_1$, the components of the vector $\vec{f}$ are in the following relation to those of the vector $\vec{f}$.

$$x_f = l_1 \sin\alpha \cdot \sin\Theta + x_e \quad (31)$$

$$y_f = l_1 \sin\alpha \cdot \cos\Theta + y_e \quad (32)$$

$$z_f = -l_1 \cos\alpha + z_e \quad (33)$$

Accordingly, a unit vector $\vec{e}_0$ in the direction of the $y_4$ axis is:

$$\vec{e}_0 = (\vec{e} - \vec{f})/|\vec{e} - \vec{f}| \quad (34)$$

Figure 33:
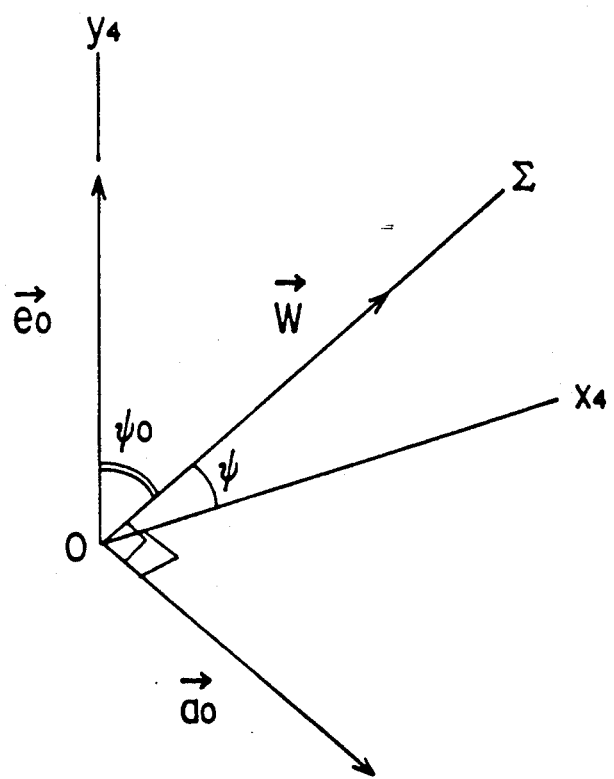
FIG. 33 schematically illustrates a positional relation between a unit vector $\bar{e}_0$ and a vector $\bar{w}$.

The angle $\Psi_0$ formed by the unit vector $\vec{e}_0$ and the vector $\vec{w}$ is (see FIG. 33):

$$\vec{e}_0 \cdot \vec{w} = |\vec{e}_0||\vec{w}|\cos\Psi_0 \quad (35)$$

The change of the formula (35) by using the formula (36) provides the formula (37).

$$\cos^2\Psi_0 + \sin^2\Psi_0 = 1 \quad (36)$$

$$\tan^2\Psi_0 = \left(\frac{|\vec{e}_0||\vec{w}|}{\vec{e}_0 \cdot \vec{w}}\right)^2 - 1 \quad (37)$$

The formula (37) is solved for the angle $\Psi_0$ as follows:

$$\psi_0 = \tan^{-1}\left\{\sqrt{\left(\frac{|\vec{e_0}|\,|\vec{W}|}{e_0 \cdot W}\right)^2 - 1}\right\} \quad (38)$$

The oscillation direction $\Psi$ to be found is:

$$\Psi = \pi/2 - \Psi_0 \quad (39)$$

From the formulas (26) and (39), the oscillation direction $\Psi_W$ of the laser beam LB emitted from the beam weaver 10 is:

$$\begin{aligned}\psi_W &= \psi - \theta + \alpha - \beta \\ &= \pi/2 - \psi_0 - \theta + \alpha - \beta\end{aligned} \quad (40)$$

The changes in the oscillation direction of the laser beam LB are traced back from the processing point $P_i$ toward the outlet of the beam weaver 10. As a result, it is found that the oscillation direction $\Psi_W$ of the laser beam LB at the outlet of the beam weaver 10 is uniquely determined by the arm joint coordinates of the processing point $P_i$ and the welding speed v which is calculated from the Cartesian coordinates of the processing point $P_i$. Below considered is a relation between the oscillation direction $\Psi_W$ of the laser beam LB and the rotation phase difference $\Delta\phi$ between the first and second inclined mirrors 41a and 41b.

Figure 34:
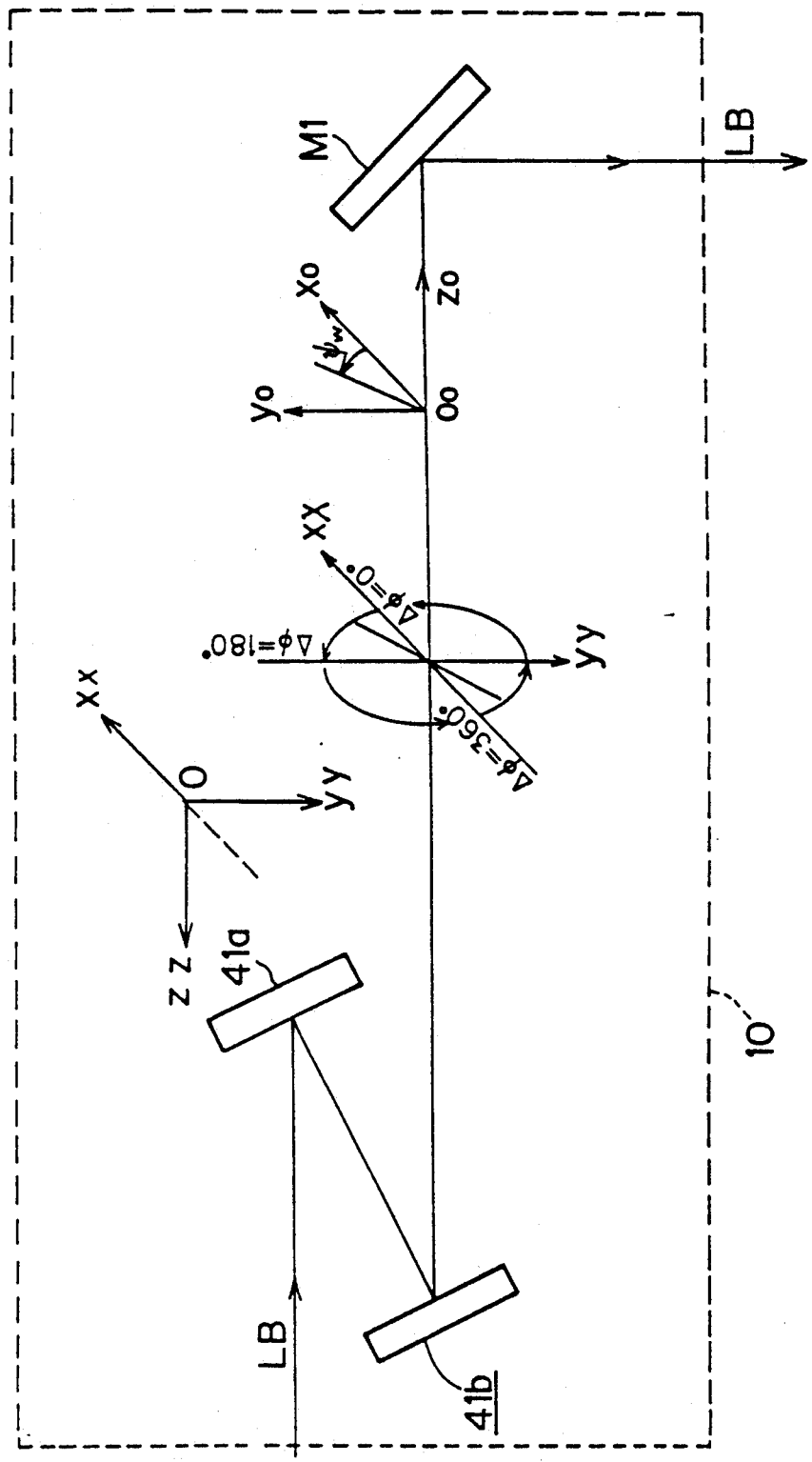
FIG. 34 illustrates coordinate systems determined for expression of the oscillation direction of the laser beam which is propagated in a beam weaver.

There is shown in FIG. 34 a relation between a coordinate system (xx, yy, zz) expressive of the laser beam LB propagated in the beam weaver and the oscillation direction $\Psi_W$ of the laser beam LB. The first and second inclined mirrors 41a and 41b rotate in the CCW and CW directions respectively (see FIGS. 7 and 8) with the rotation phase difference $\Delta\phi$. When the rotation phase difference is at zero degree, the laser beam LB oscillates on the xx axis in the xxyy plane. As the rotation phase difference $\Delta\phi$ increases, the oscillation direction $\Psi_W$ of the laser beam LB changes by an angle $\Delta\phi/2$ in the CW direction.

The rotation phase difference $\Delta\phi$ to be finally found is:

$$\begin{aligned}\Delta\phi &= 2\psi_W \\ &= 2(\pi/2 - \psi_0 - \theta + \alpha - \beta)\end{aligned} \quad (41)$$

Figure 35:
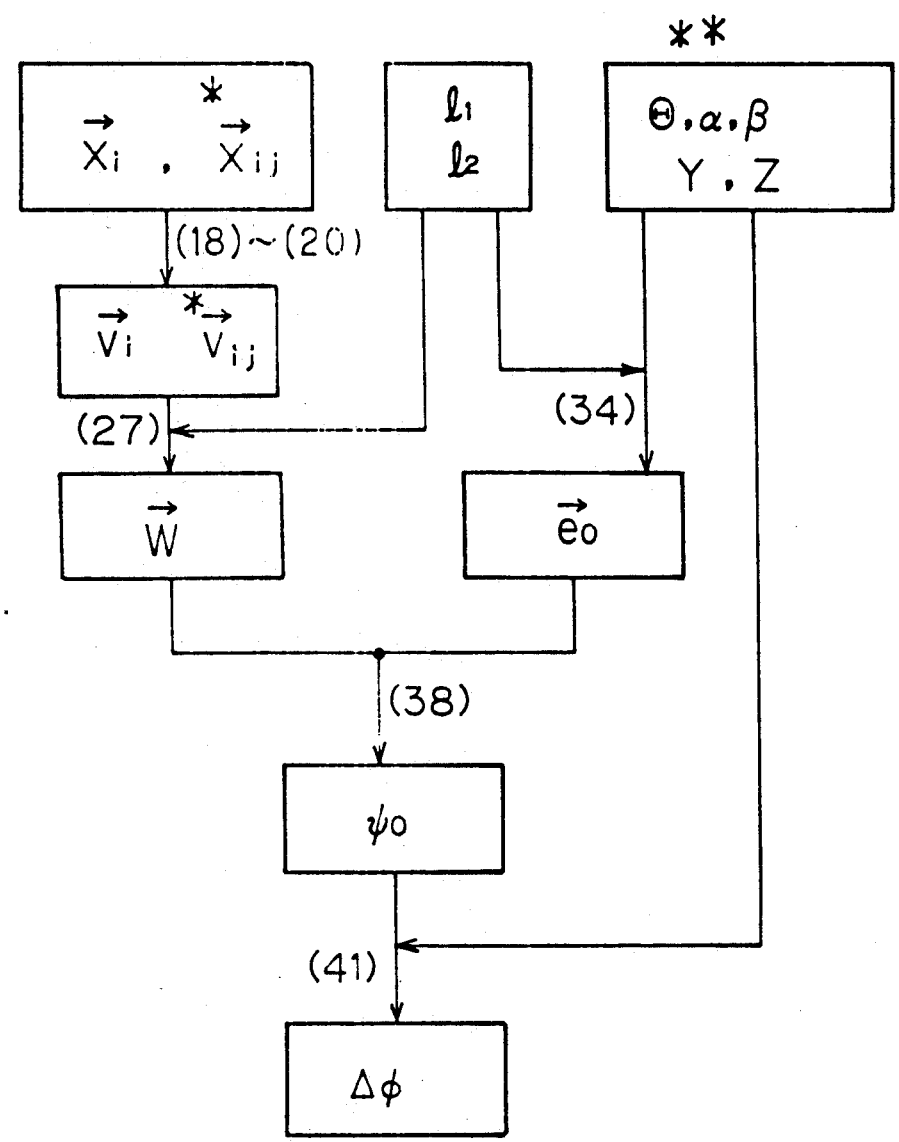
FIG. 35 illustrates a flow for determining a rotation phase difference for the scan mode.

The flow for determining the rotation phase difference $\Delta\phi$ by using the aforesaid formulas in the scan mode is shown in FIG. 35. In FIG. 35, * mark indicates the Cartesian coordinates obtained from the teaching data, ** mark indicates the joint coordinates obtained from the playback, and numerals in parentheses designate formula numbers.

Hereinabove described is the principle of the control method for weaving with the predetermined welding conditions satisfied in the scan mode.

Figure 36:
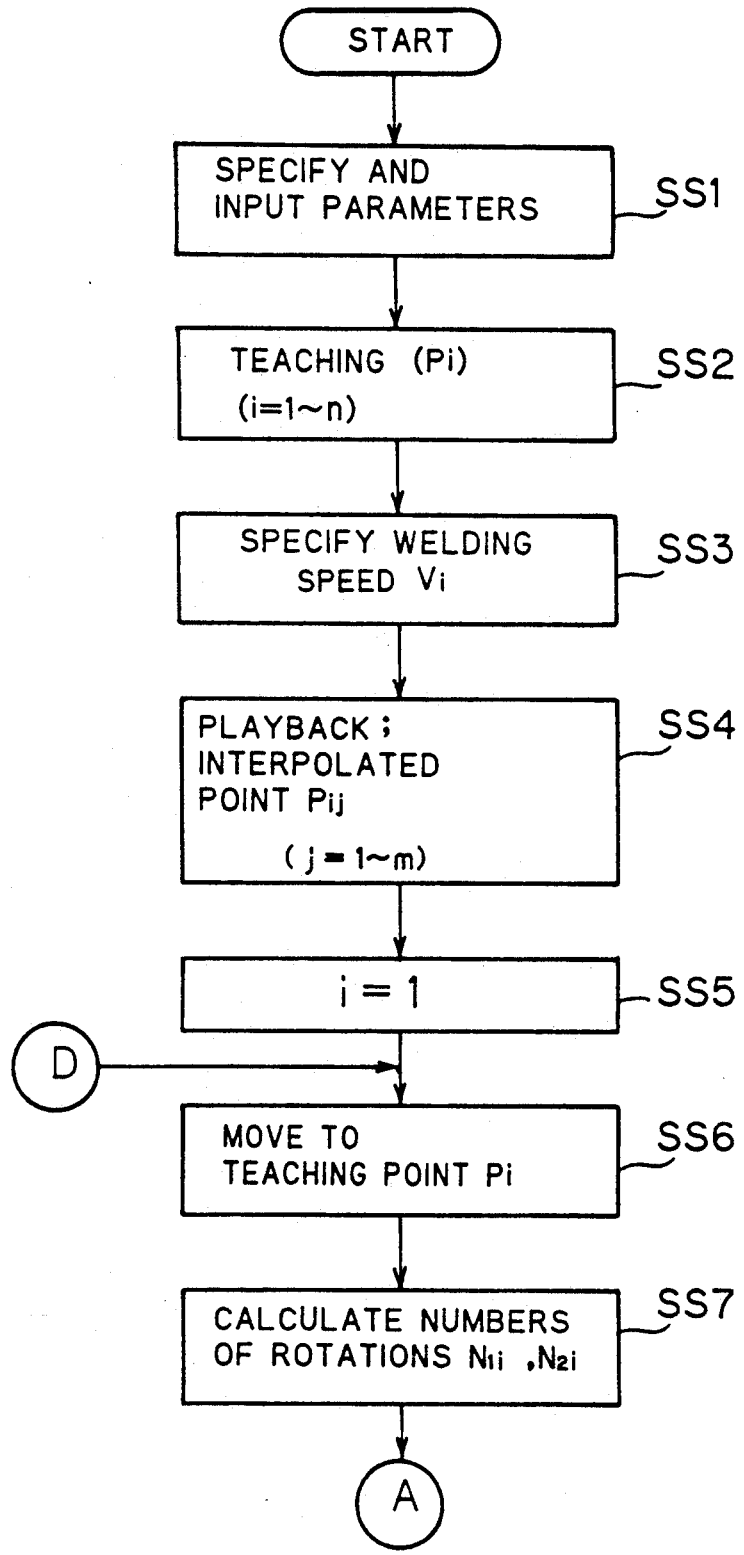
FIGS. 36 to 38 are a flow chart of a control procedure of the laser robot in the scan mode.
Figure 37:
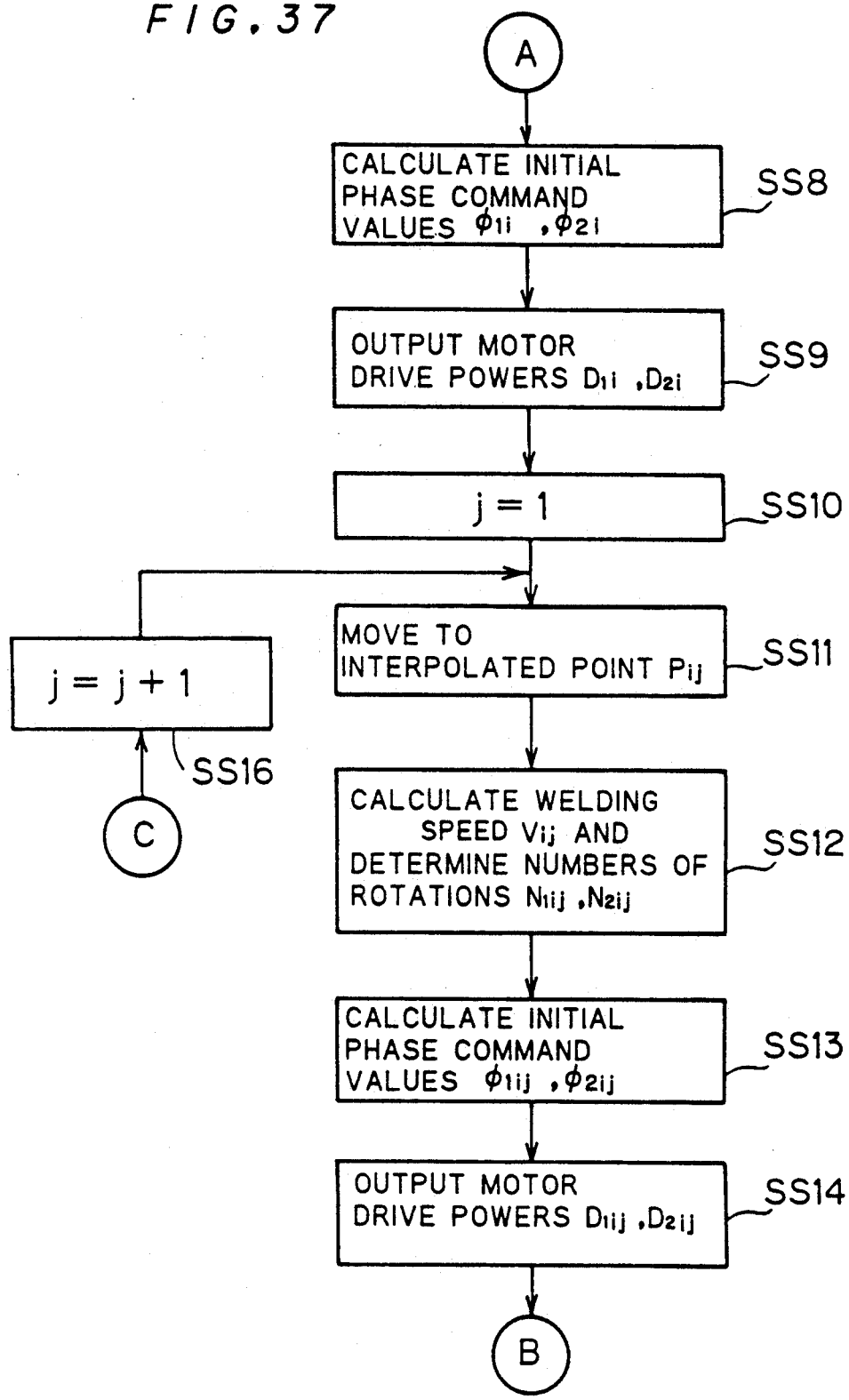
Figure 38:
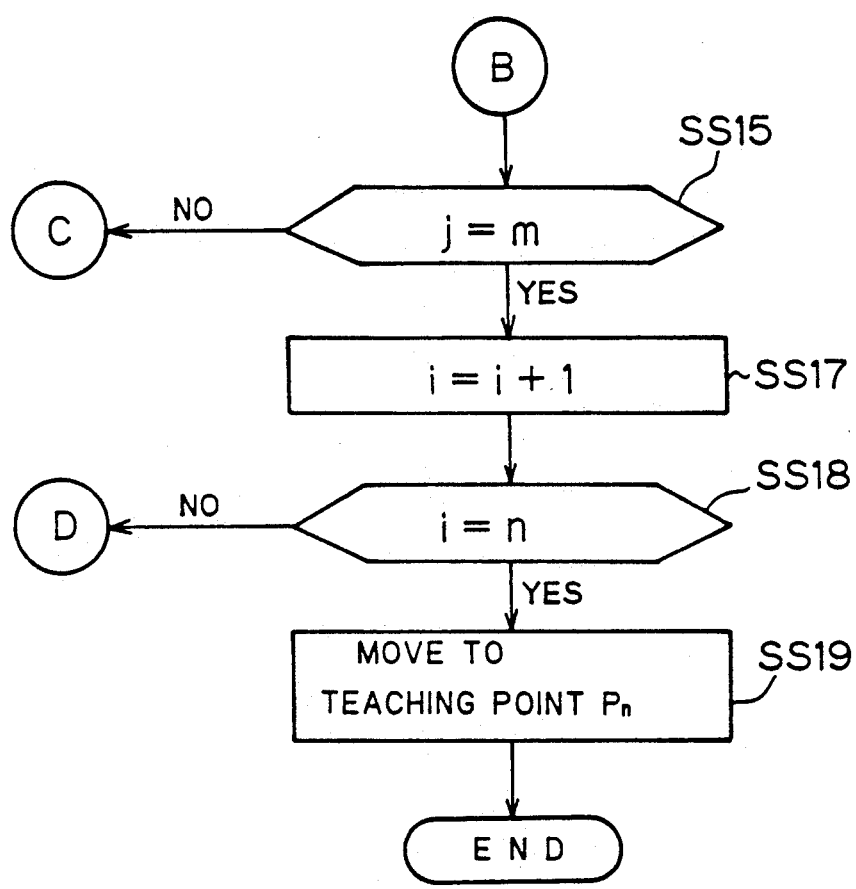

FIGS. 36 to 38 are a flow chart of the procedure for controlling the laser robot RB2 on the basis of the principle. The procedure for controlling the laser robot RB2 in the scan mode is basically similar to that for controlling the laser robot RB2 in the spin mode, except that the rotation phase difference $\Delta\phi$ is uniquely determined by the spin diameter d in the spin mode while the numbers of rotations $N_1$, $N_2$ and the rotation phase difference $\Delta\phi$ are required to be determined for each processing point in the scan mode. The steps SS8 and SS13 of FIG. 37 correspond to the steps for calculating the rotation phase difference $\Delta\phi_i$ and $\Delta\phi_{ij}$ at the teaching point $P_i$ and interpolated point $P_{ij}$, respectively and, therefore, the initial phase command values $\phi_{1i}$, $\phi_{2i}$ and $\phi_{1ij}$, $\phi_{2ij}$. The remaining steps are similar to the corresponding steps in FIGS. 24 to 26. Since the description of FIGS. 36 to 38 almost overlaps that of FIGS. 24 to 26, the details thereof will be omitted.

(G) Modifications

In the present invention, the number of inclined mirrors is not limited. The periodical deflection of the laser beam can be achieved generally by the combination of a plurality of inclined mirrors which are arranged in series in the optical path. An optical system such as a fixed mirror may be disposed in the optical path between the plurality of inclined mirrors. A rotation power source may be common to the respective inclined mirrors to rotate them through transmissions. When the individual direct drive motors are provided is in the preferred embodiment, errors due to backlash and so on can be prevented.

When the numbers of rotations $N_1$ and $N_2$ of the first and second inclined mirrors 41a and 41b are different from each other, a deflection locus similar to what is called Lissajous's figure can be obtained. In general, a periodical deflection locus can be obtained when the ratio of $N_1$ to $N_2$ is a rational number. Various deflection loci can be obtained by changing the relation between the angles $\theta_1$ and $\theta_2$ and the relation between the angles $\Delta\theta_1$ and $\Delta\theta_2$.

The light beam deflector (corresponding to the beam weaver) of the present invention is employable in laser welding robots, laser robots for reforming the surface of the workpiece, and equipments other than robots.

Control Signal Generator for Light Beam Deflector

The novel weaving method of the laser beam using the light beam deflector (beam weaver) is provided by the applicant of the present invention. For practical achievement of the light beam deflector, it is necessary to electrically control two rotation mechanisms at high accuracy. Requested is a control signal generator capable of simultaneously rotating the two rotation mechanisms at high speeds while constantly holding the predetermined numbers of rotations and a predetermined rotation phase difference in a series of continuous operations including start, acceleration, deceleration and stop. A system of such a device preferably controls the rotation speeds of the two rotation mechanisms (such as motors) and their positions in rotation by a pulse train signal as being used in a stepping motor and the like.

A motor controller as currently being put to practical us and being commercially available either controls the stop position of the motor or controls the motor so that the rotation speed of the motor is held constantly, and cannot be used as a device for simultaneously controlling the positions and rotation speeds of the two motors rotating at high speeds with high exactness. Therefore a novel controller which can achieve such control has been strongly required.

The control signal generator for the light beam deflector of the present invention has been made to meet the requirements, and can control the two rotation mechanisms which make high speed continuous rotations including a series of operations such as start, acceleration, deceleration and stop so that they constantly hold the predetermined numbers of rotations and the predetermined rotation phase difference for each predetermined time in the rotations. In long, continuous drives of the two rotation mechanisms, the control signal generator enables highly exact control in which an error of a single pulse is not generated.

(I) Electrical Structure of Control Signal Generator

Figure 39:
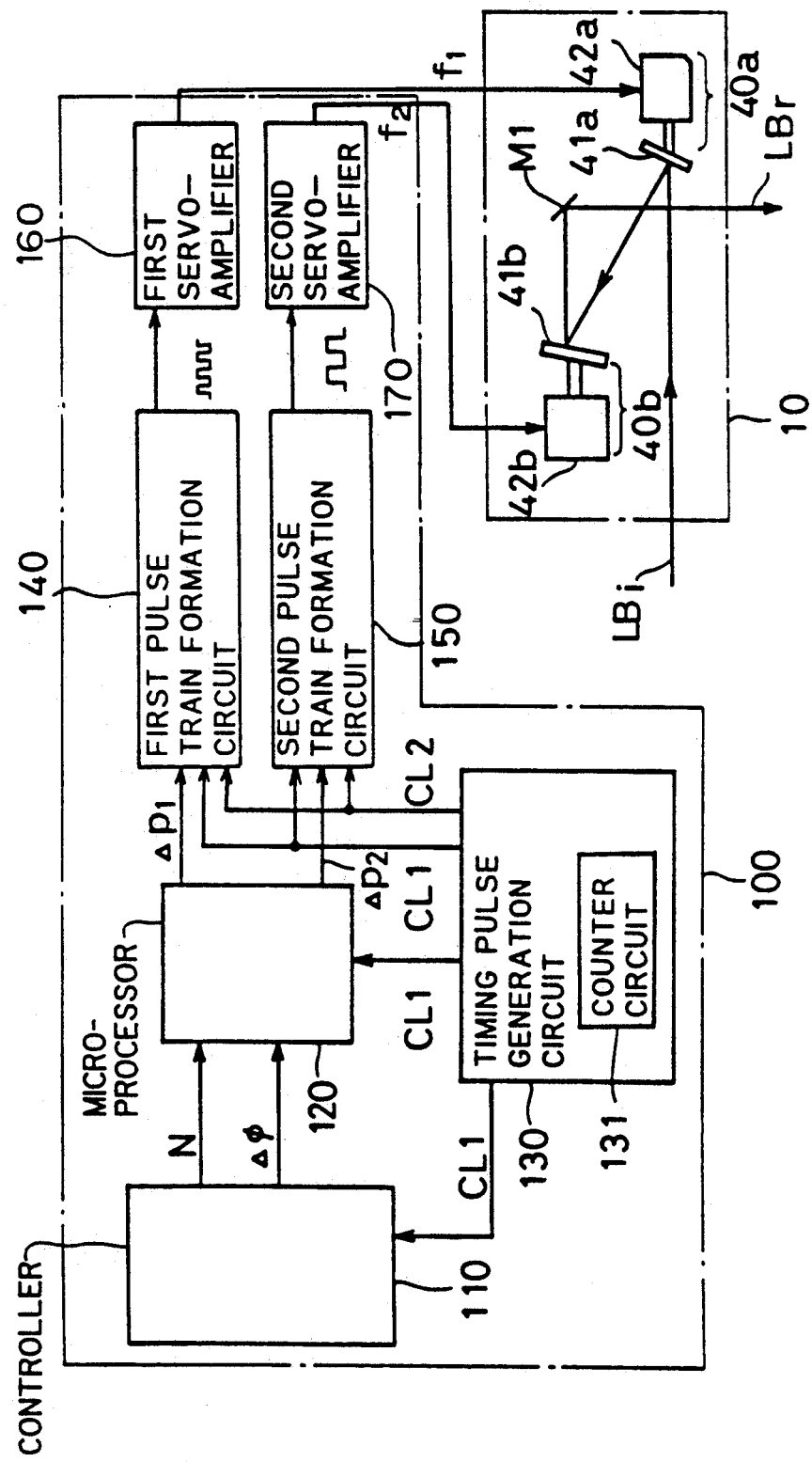
FIG. 39 is a block diagram showing an electrical structure of a control signal generator for a light beam deflector according to a preferred embodiment of the present invention.

FIG. 39 is a block diagram showing an electrical structure of a control signal generator 100 for the light beam deflector according to a preferred embodiment of the present invention. To clarify connection between the control signal generator 100 and the beam weaver 10, the cross section of the beam weaver 10 is also schematically shown in FIG. 39. It can be said that the light beam deflector is composed of the control signal generator 100 for the light beam deflector and the beam weaver 10.

In FIG. 39, the laser beam incident on the beam weaver 10 is designated by LBi, and the laser beam after the serial reflections by the rotating first inclined mirror 41a, rotating second inclined mirror 41b and the fixed reflecting mirror M1 is designated by LBr. There is shown also in FIG. 39 an optical path of the laser beam LBi where both of the first and second inclined mirrors 41a and 41b do not rotate but stay still.

The first motor 42a in the first rotation mechanism 40a and the second motor 42b in the second rotation mechanism are servomotors. In the following description, the first and second motors 42a and 42b are referred to as first and second servomotors 42a and 42b.

In FIG. 39, a timing pulse generation circuit 130 generates a second timing pulse signal CL2 having $2^N$-number of pulses during a predetermined time interval $\Delta t$ (hereinafter referred to as a unit time $\Delta t$). The timing pulse generation circuit 130 includes a counter circuit 13 having the data length of N bits. The counter circuit 131 counts the number of pulses of the second timing pulse signal CL2 to generates a single pulse each time the counted number becomes $2^N$, that is, for each unit time $\Delta t$. The signal composed of the pulses is transmitted as a first timing pulse signal CL1 from the timing pulse generation circuit 130 to a controller 110 and a microprocessor 120 described later.

The output portion of the controller 110 is connected to the input portion of the microprocessor 120. The controller 110 executes a predetermined calculation by the first timing pulse signal CL1 generated in the timing pulse generation circuit 130. One of the output portions of he microprocessor 120 is connected to the input portion of a first pulse train formation circuit 140, and the other output portion thereof is connected to the input portion of a second pulse train formation circuit 150. The operation of the microprocessor 120 is controlled by the first timing pulse signal CL. The operations of the first and second pulse train formation circuits 140 and 150 are controlled by the first and second timing pulse signals CL1 and CL2 generated in the timing pulse generation circuit 130.

The output portion of the first pulse train formation circuit 140 is connected to the input portion of the first servomotor 42a in the beam weaver 10 through a first servo-amplifier 160. The output portion of the second pulse train formation circuit 150 is connected to the input portion of the second servomotor 42b in the beam weaver 10 through a second servo-amplifier 170. The pulse train signals can be inputted to the first and second servo-amplifiers 160 and 170, which include deviation counters.

Figure 40:
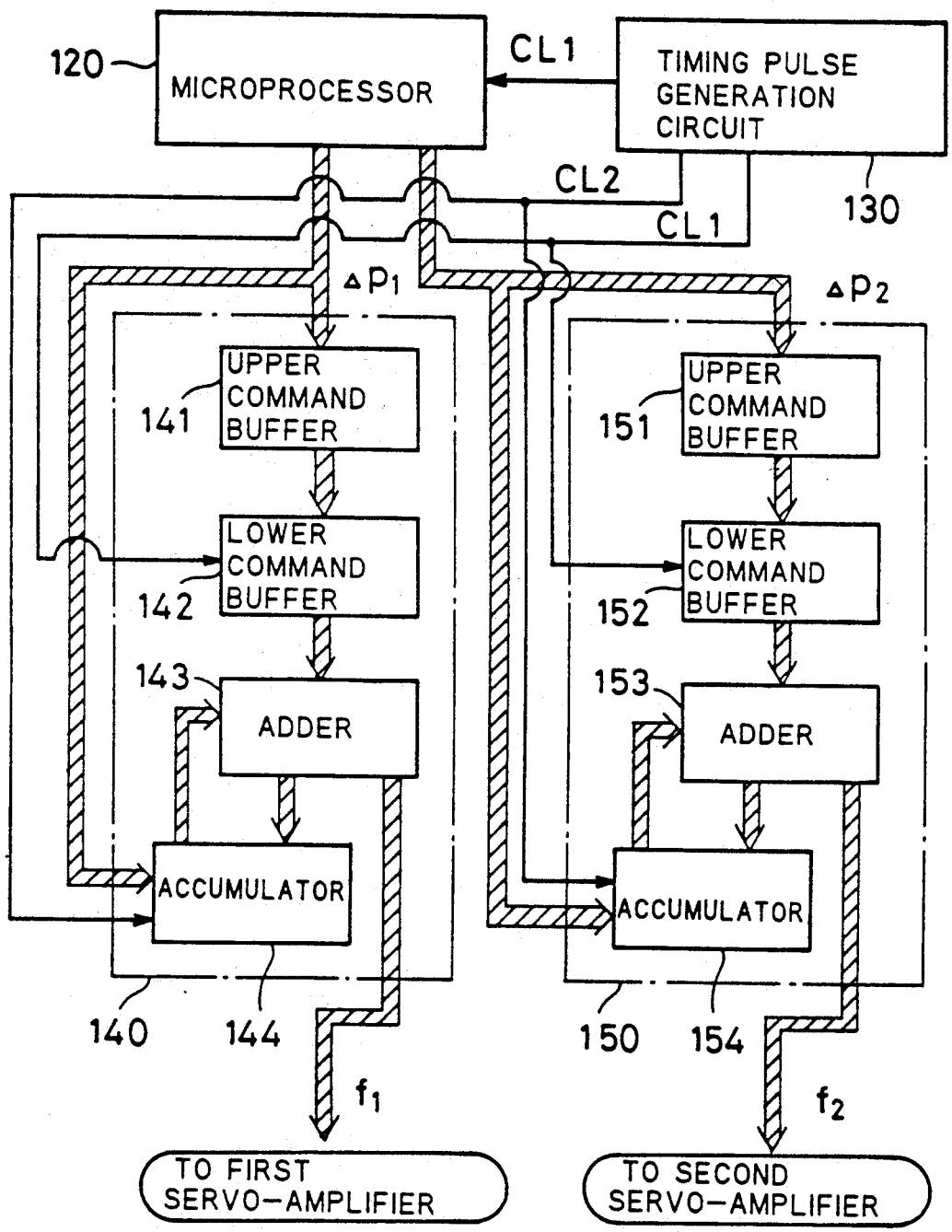
FIG. 40 is a block diagram showing an electrical structure of first and second pulse train formation circuits.

FIG. 40 is a block diagram showing a detailed electrical structure of the first and second pulse train formation circuits 140 and 150 and flows of various signals, with the microprocessor 120 and the timing pulse generation circuit 130.

With reference to FIG. 40, the first pulse train formation circuit 140 includes upper and lower command buffers 141, 142, an adder 143 and an accumulator 144. One of the output portions of the microprocessor 120 is connected to the input portion of the upper command buffer 141. The input portion of the lower command buffer 142 is connected to the output portion of the upper command buffer 141. The operation of the lower command buffer 142 is controlled by the first timing pulse signal CL1. One of the input portions of the adder 143 is connected to the output portion of the lower command buffer 142. The command buffers have the two-stage structure, the upper command buffer 141 and the lower command buffer 142, so that the upper command buffer 141 may receive a command signal outputted from the microprocessor 120 while calculations of addition are executed by the adder 143, accumulator 144 and lower command buffer 142 during the unit time $\Delta t$.

One of the output portions of the adder 143 is connected to the input portion of the accumulator 144. The output portion of the accumulator 144 is connected to the other input portion of the adder 143. The adder 143 and accumulator 144 form a loop for calculations of addition. The accumulator 144 outputs the holding data to the adder 143 as one of the input signals of the adder 143 in synchronism with the second timing pulse signal CL2. To the other input portion of the accumulator 144 is directly connected the output portion of the microprocessor 120 which is also connected to the input portion of the upper command buffer 141, in order to set the accumulation results of the accumulator 144 to zero in the initial state of the calculations of addition. The number of digits of the adder 143 is N bits. Each time its addition results become integer multiples of $2^N$, the adder 143 outputs one pulse for (a signal $f_1$) from one of its output portions.

The second pulse train formation circuit 150 has the same structure as the first pulse train formation circuit 140, and includes upper and lower command buffers 51, 152, an adder 153 and an accumulator 154. The operations of the first and second pulse train formation circuits 140 and 150 are controlled by common timing signals that is, the first and second timing pulse signals CL1 and CL2, in order to accurately control the rotation phase difference between the servomotors 42a and 42b.

(II) Operation of Control Signal Generator

Figure 41:
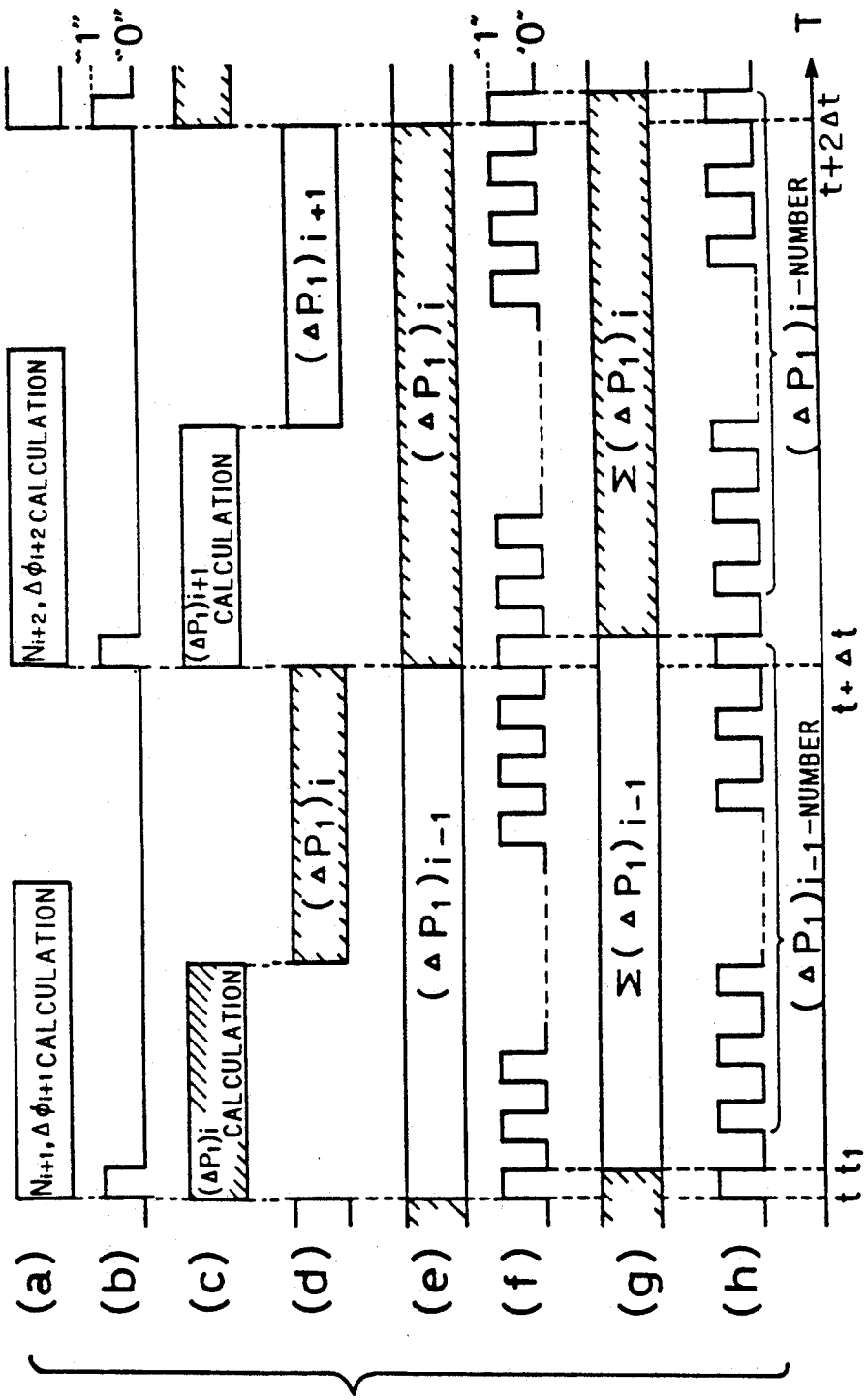
FIG. 41 is a timing chart of operations of respective components until a first pulse train signal is produced.

FIG. 41 is a timing chart chronologically showing the operations of signal processings in the respective components until the pulse train signal $f_1$ is produced by the first pulse train formation circuit 140. In FIG. 41, (a) shows the start and end of the calculation processing executed in the controller 110 with respect to a time axis T; (b) and (f) show the waveforms of the first and second timing pulse signals CL1 and CL2, respectively, (c) shows the start and end of the first calculation processing which the microprocessor 120, on receiving the calculation results (N, $\Delta\phi$) in the controller 110, gives as a first calculation result $\Delta P_1$ to the first pulse train formation circuit 140; (d) shows the start at which the upper command buffer 141 reads the first calculation result $\Delta P_1$ from the microprocessor 120 and a period of time during which the upper command buffer 141 stores the result $\Delta P_1$; (e) shows the start at which the lower command buffer 142 reads the first calculation result $\Delta P_1$ from the upper command buffer 141 and a period of time during which the lower command buffer 142 stores the result $\Delta P_1$; (g) shows the start of the calculation of addition in the adder 143 and accumulator 144 and the calculation time thereof; and (h) shows the production of the first pulse train signal $f_1$ in accordance with the addition results. For each unit time $\Delta t$ corresponding to the cycle of the first timing pulse signal CL1, the microprocessor 120 executes the first calculation to output a new first calculation result $(\Delta P_1)_i$, and, in parallel therewith, the adder 143 and accumulator 144 execute the calculations of addition as a function of the previous first calculation result $(\Delta P_1)_{i-1}$ to output pulses the number of which is equal to the first calculation result $(\Delta P_1)_{i-1}$.

Figure 42:
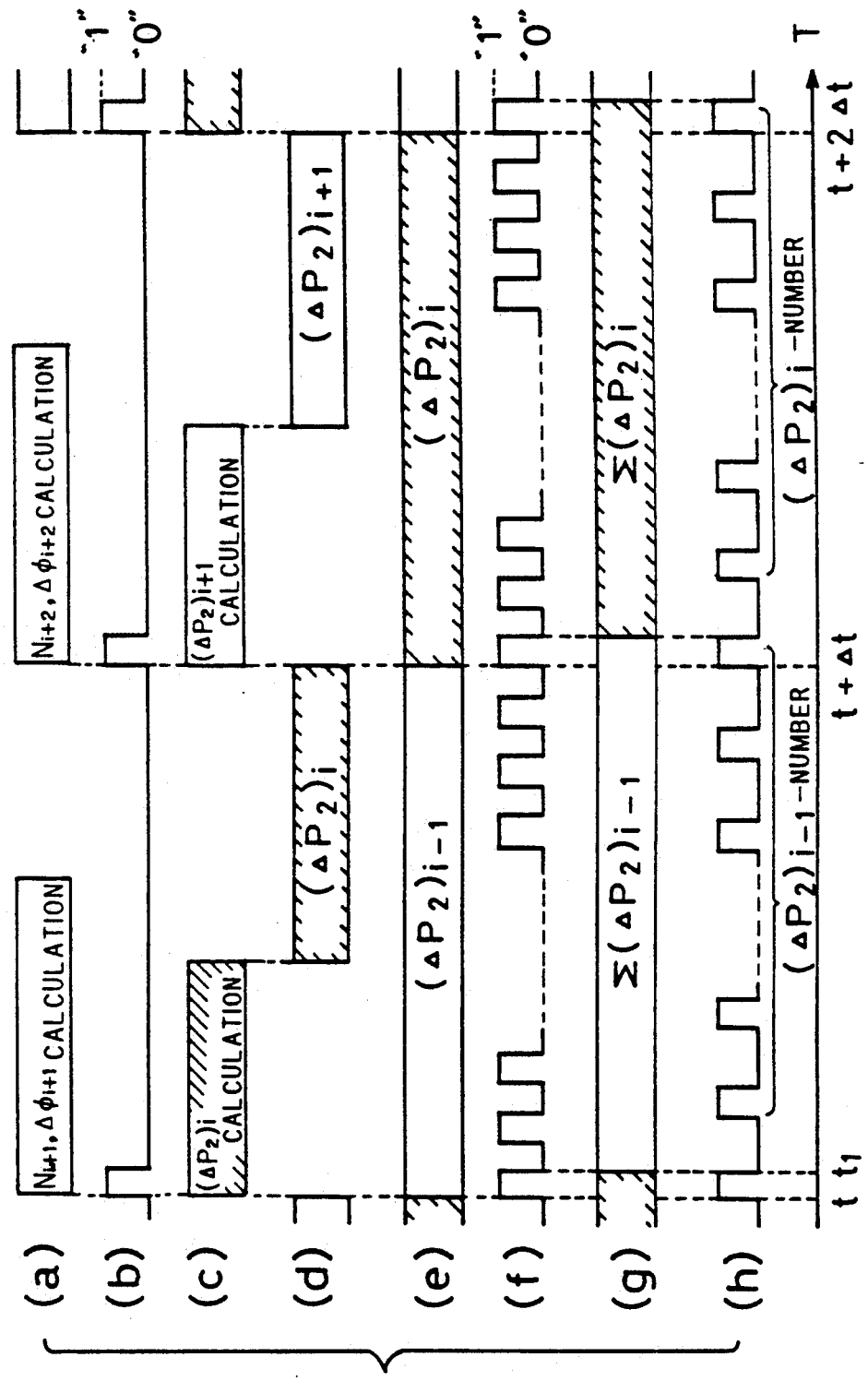
FIG. 42 is a timing chart of operations of the respective components until a second pulse train signal is produced.
Figure 43A:
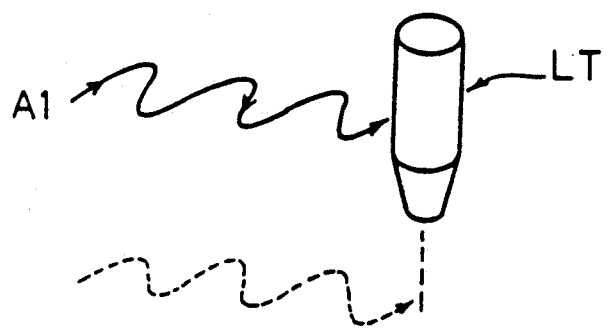
Figure 43B:
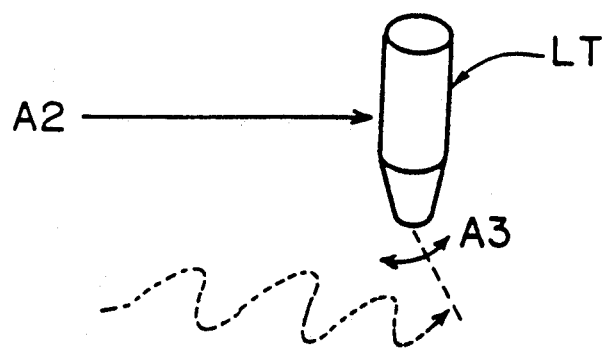

FIG. 42 is a timing chart similar to FIG. 41 in relation to the production of a second pulse train signal $f_2$. In FIG. 42, (c) shows the start and end of the calculation of a second calculation result $\Delta P_2$ which the microprocessor 120 gives to the second pulse train formation circuit 150: (d) shows the start at which the upper command buffer 151 reads the second calculation result $\Delta P_2$ and a period of time during which the upper command buffer 15 stores the result $\Delta P_2$; (e) shows the start at which the lower command buffer 152 reads the second calculation result $\Delta P_2$ from the upper command buffer 151 and a period of time during which the lower command buffer 152 stores the result $\Delta P_2$; shows the start and end of the calculations of addition in the adder 153 and accumulator 154; and (h) shows the waveform of the second pulse train signal $f_2$ produced in accordance with the calculations of addition. In FIG. 42, (a), (b) and (f) are the same as those in FIG. 41, respectively. The details of the operation of the control signal generator will be hereinafter described in the descending order of components with reference to FIGS. 4 and 42.

(a) Operation in Controller

The controller 110 calculates the numbers of rotations $N_1$, $N_2$ of the first and second servomotors 42a, 42b and the rotation phase difference $\Delta\phi$ between the servomotors 42a and 42b in accordance with a predetermined algorithm. The predetermined algorithm is a calculation rule that determines the numbers of rotations $N_1$, $N_2$ and the rotation phase difference $\Delta\phi$ such that the laser beam $LB_r$ outputted from the beam weaver 10 is periodically deflected in the desired mode.

In the application of the beam weaver to the laser robot RB, RB1 or RB2, for example, the controller 110 calculates the numbers of rotations $N_1$. $N_2$ and the rotation phase difference $\Delta\phi$ from the formulas (10) and (11) for the weaving of the laser beam LB in the spin mode. In this case, the numbers of rotations $N_1$, $N_2$ are calculated from the formula (1) for each processing point $P_i$ (teaching point and interpolated point) on the weld line, and the rotation phase difference $\Delta\phi$ is uniquely determined by the designation of the spin diameter d and need not be calculated for each processing point $P_i$.

For the weaving of the laser beam LB in the scan mode, however, the numbers of rotations $N_1$, $N_2$ and the rotation phase difference must be determined for each processing point $P_i$. Thus the controller 110, in general, calculates the numbers of rotations $N_1$, $N_2$ and the rotation phase difference $\Delta\phi$ for each time $\Delta t_0$ during which the tip of the torch 7 travels from the processing point $P_i$ to the next processing point $P_{i+1}$. In the present invention, the unit time $\Delta t$ of the control signal generator 100 must be equal to or less than the travelling time $\Delta t_0$ (indicative of a command interval where the main controller of the laser robot RB itself sends a drive command signal to the respective arms).

In the preferred embodiment shown in FIG. 39, the controller 110 calculates the numbers of rotations $N_1$, $N_2$ of the first and second servomotors 42a, 42b and the rotation phase difference $\Delta\phi$ therebetween for each unit time $\Delta t$, i.e., in response to the rising of the first timing pulse signal CL1 from "0" level to "1" level as shown in FIGS. 41(a) and 42(a). In FIGS. 41(a) and 42(a), for generalization, the numbers of rotations $N_1$, $N_2$ ($N_1 = N_2 = N$) to be calculated by the controller 110 at an arbitrary time t are represented by the number of rotations $N_{i+i}$, and the rotation phase difference $\Delta\phi$ is represented by $\Delta\phi_{i+1}$. The number of rotations $N_i$ and the rotation phase difference $\Delta\phi_i$ are the results of the calculation by the controller 110 at the time $t-\Delta t$, not shown in FIGS. 41 and 42.

(b) Operation in Microprocessor

In response to the rising of the first timing pulse signal CL1 from "0" level to "1" level, the microprocessor 120 reads the number of rotations $N_i$ and rotation phase difference $\Delta\phi_i$ from the controller 110 to start the calculations of the number of pulses to be applied to the first and second servomotors 42a and 42b, that is, the first and second calculations (FIGS. 41(c) and 42(c)). The algorithm for determining the numbers of pulses $(\Delta P_1)_i$ (the first calculation result) and $(\Delta P_2)_i$ (the second calculation result) to be given per unit time $\Delta t$ from the number of rotations $N_i$ and rotation phase difference $\Delta\phi_i$ is derived in the following manner.

Assuming that both of the numbers of pulses required per one rotation of the first and second servomotors 42a and 42b are n (the number of pulses per rotation) and the rotation phase difference between the servomotors 42a and 42b is zero, the number of command pulses $(\Delta P_A)_i$ to be applied to the servomotors 42a and 42b per unit time $\Delta t$ is:

$$\Delta\phi = 2\sin^{-1}\left(\frac{d}{4(\Delta\phi_1 + \Delta\phi_2)f_0}\right) \quad (42)$$

The number of rotation phase difference command pulses $(\Delta P_B)_i$ required for generation of the rotation phase difference $\Delta\phi$ between the rotation phases of the servomotors 42 and 42b is:

$$(\Delta P_B)_i = \Delta\phi_i \cdot n/2\pi \quad (43)$$

Assuming that the initial value $(\Delta P_B)_0$ of the number of rotation phase difference command pulses $(\Delta P_B)_i$ is zero, the rotations of the servomotors 42a and 42b with the rotation phase difference $(\Delta\phi)_i$ at the time t corresponds to the acceleration or deceleration of the servomotors 42a and 42b, which have rotated with the rotation phase difference $(\Delta\phi)_{i-1}$ in the time interval between the previous time $t-\Delta t$ and the time t, such that they rotate with the rotation phase difference $(\Delta\phi)_i$ at the time t. The number of pulses $(d_p)_i$ required for the acceleration or deceleration at the time t is:

$$(d_p)_i = (\Delta P_B)_i - (\Delta P_B)_{i-1} \qquad (44)$$

When it is supposed that the servomotors 42a and 42b uniformly share torque for the acceleration or deceleration (although the torque may be applied to one of the servomotors), the numbers of pulses $(\Delta P_1)_i$ and $(\Delta P_2)_i$ to be applied to the first and second servomotors 42a and 42b at the time t within the unit time $\Delta t$ are:

$$(\Delta P_1)_i = (\Delta P_A)_i + (d_p)_i/2 \qquad (45)$$

$$(\Delta P_2)_i = (\Delta P_A)_i - (d_p)_i/2 \qquad (46)$$

The microprocessor 120 can convert the calculated values of the number of rotation $N_i$ and rotation phase difference $\Delta\phi_i$ into the numbers of pulses $(\Delta P_1)_i$ and $(\Delta P_2)_i$ to be applied to the servomotors 42a and 42b on the basis of the formulas (42) to (46) for each unit time $\Delta t$.

(c) Operation in First Pulse Train Formation Circuit

The operation of the first pulse train formation circuit 140 will be described in detail below. After the end of the first calculation, the microprocessor 120 loads the first calculation result $(\Delta P_1)_i$ to the upper command buffer 141. The upper command buffer 141 reads the first calculation result $(\Delta P_1)_i$, which is held in the upper command buffer 141 until the time $t+\Delta t$.

The lower command buffer 142 reads the first calculation result $(\Delta P_1)_{i-1}$ which has been held by the upper command buffer 141 in synchronism with the first timing pulse signal CL1 at the time t to store the new first calculation result $(\Delta P_1)_{i-1}$ in place of the first calculation result $(\Delta P_1)_{i-2}$ which has been held by the lower command buffer 142 and to load the first calculation result $(\Delta P_1)_{i-1}$ to one of the input portions of the adder 143.

In synchronism with the falling of the second timing pulse signal CL2 from "1" level to "0" level (at the time $t_1$), the accumulation result is loaded from the accumulator 144 to the other input portion of the adder 143. Since the second timing pulse signal CL2 has $2^N$-number of pulses per unit time $\Delta t$, the first calculation result $(\Delta P_1)_{i-1}$ is accumulated $2^N$ times in the lower command buffer 142, adder 143 and accumulator 144 during the time $\Delta t$. That is, the following calculation is performed.

$$\sum_{j=1}^{2^N} [(\Delta P_1)_i]_j = (\Delta P_1)_i \times 2^N \qquad (47)$$

Since the number of digits of the adder 143 is N bits as described above, the formula (47) means that the carry is performed $(\Delta P_1)_{i-1}$ times in the adder 143. Accordingly, $(\Delta P_1)_{i-1}$-number of pulses are outputted from the adder 143 during the time $\Delta t$.

On completion of the aforesaid calculations, the same series of calculations start at the time $t+\Delta t$ again, and $(\Delta P_1)_{i-1}$-number of pulses are outputted during the time $\Delta t$. Subsequently, $(\Delta P_1)_{i+1}$-number of pulses, $(\Delta P_1)_{i+2}$-number of pulses, . . . are similarly outputted per unit time $\Delta t$. The first pulse train signals $f_1$ which are different in the number of pulses are formed for each unit time $\Delta t$.

(d) Operation in Second Pulse Train Formation Circuit

The operation of the second pulse train formation circuit 150 is substantially similar to that Of the first pulse train formation circuit 140. Thus the second pulse train signals $f_2$ which are different in the number of pulses are formed for each unit time $\Delta t$ as shown in FIG. 42(h).

(e) Operation of Servomotors

The first and second pulse train signals $f_1$ and $f_2$ are applied to the first and second servomotors 42a and 42b through the first and second servo-amplifiers 160 and 170, respectively. As a result, the first and second servomotors 42a and 42b accelerate or decelerate synchronously for each unit time $\Delta t$ and rotate during each unit time $\Delta t$, with the predetermined number of rotations held constantly and the predetermined rotation phase difference held relatively. Since the control signal generator 100 of the present invention has the aforesaid simple electrical structure, little errors are generated in the microprocessor 120 and first and second pulse train formation circuits 140, 150, as far as the timing pulse generation circuit 130 correctly produces the first and second timing pulse signals CL1 and CL2. The two different pulse train signals $f_1$ and $f_2$ emitted from the control signal generator 100 permit the continuous drive of the servomotors 42a and 42b to be controlled with high exactness.

(f) Modifications

Although the number of rotations $N_i$ and rotation phase difference $\Delta\phi_1$ are calculated by the controller 110 in synchronism with the first timing pulse signal CL1 in the preferred embodiment, the present invention is not limited to this. The calculation may start at any time within the unit time $\Delta t$, and the controller 110 may be synchronized so that the calculation is completed within the unit time $\Delta t$. It is unnecessary to use the first timing pulse signal CL1 as the synchronization signal of the controller as in the preferred embodiment. Another timing signal whose phase is delayed by a predetermined time from the phase of the first timing pulse signal CL1 may be used as the synchronization signal.

When the calculation results $N_i$, $\Delta\phi_i$ of the controller 110 are constantly approximately equal (for example, when the linear interpolation is carried out between the teaching points in the laser robot RB), fixed calculation results are constantly loaded from the controller 110 to the microprocessor 120, so that the timing pulse signal for synchronization itself of the controller 110 is not required between the teaching points.

When rough approximation is permitted such as the linear interpolation between all of the teaching points, there is no need to divide the command buffers in the first and second pulse train formation circuits 140 and 150 into two types, upper and lower, as shown in FIG. 40, and one type of command buffers is sufficient. Hence it is not necessary to apply the first timing pulse signal CL1 to the first and second pulse train formation circuits 140 and 150. In this case, the first timing pulse signal CL1 for controlling the microprocessor 120 and the second timing pulse signal CL2 for controlling the first and second pulse train formation circuits 140 and 150 are significant as synchronization signals.

In the preferred embodiment, the beam weaver includes the two servomotors 42a and 42b. The present invention is applicable to the beam weaver 10 which includes several (three or more) servomotors. In such a case, the number of pulse train formation circuits must be equal to the number of servomotors.

While the present invention has been described in detail with reference to the preferred embodiments shown in the drawings, the present invention can be carried out in various forms without affecting the concept or major characteristics thereof. The aforesaid preferred embodiments are in all aspects illustrative and not restrictive.

The scope of the present invention is represented by the claims and is not restricted by the description in the specification. All modifications and variations in the uniform scope of the claims are within the range of the present invention.

We claim:

1. A laser robot (RB) which propagates a laser beam (LB) along an arm (4) and performs a predetermined processing while directing said laser beam (LB) from a torch (7) mounted on a leading edge of said arm (4) to workpieces (21, 22) and travelling said torch (7) along a processing line (l) on said workpieces (21, 22), comprising:

laser beam generation mans (8) for generating said laser beam (LB) to introduce said laser beam (LB) into said arm (4), at least one pair of inclined mirrors (41a, 41b) having reflecting surfaces inclined from planes perpendicular to directions of predetermined rotation axes respectively and arranged in series along an optical path of said laser beam (LB) for serially reflecting said laser beam (LB) by said respective reflecting surfaces to introduce said laser beam (LB) to said torch (7), at least one pair of inclined mirror rotation mechanisms (40a, 40b) for rotating said at least one pair of inclined mirrors (41a, 41b) on said rotation axes, respectively, and control means (1090) for controlling a number of rotations and a rotation direction of each pair of inclined mirror rotation mechanisms (40a, 40b) so that the laser beam (LB) oscillates in a predetermined oscillation mode.

2. The laser robot of claim 1, wherein
said control means (100) includes
means for producing a control signal which operates so that said at least one pair of inclined mirrors (41a, 42b) are equal in the number of rotations ($N_1$, $N_2$) and in rotation direction, to apply said control signal to said at least one pair of inclined mirror rotation mechanisms (40a, 40b).

3. The laser robot of claim 1, wherein
said control means (100) includes
means for producing a control signal which operates so that said at least one pair of inclined mirrors (41a, 41b) are equal in the number of rotations ($N_1$, $N_2$) and adjacent ones of said at least one pair of inclined mirrors (41a, 41b) are opposite in rotation direction, to apply said control signal to said at least one pair of inclined mirror rotation mechanisms (40a, 40b).

4. A method of controlling a laser robot (RB) which propagates a laser beam (LB) along an arm (4) and performs a predetermined processing while directing said laser beam (LB) from a torch (7) mounted on a leading edge of said arm (4) to workpieces (21, 22) and travelling said torch (7) along a processing line (l) on said workpiece (21, 22), said method comprising:

a first step of arranging a plurality of inclined mirrors (41a, 41b) and a plurality of inclined mirror rotation mechanisms (40a, 40b) in series along an optical path of said laser beam (LB), said plurality of inclined mirrors (41a, 41b) having reflecting surfaces inclined from planes perpendicular to directions o: predetermined rotation axes respectively and serially reflecting said laser beam (LB) by their reflecting surfaces to introduce said laser beam (LB) to said torch (7), said plurality of inclined mirror rotation mechanisms (40a, 40b) rotating said plurality of inclined mirrors (41a, 41b) on said rotation axes, respectively, a second step of specifying speeds ($V_i$, $V_{ij}$) at which said torch (7) travels along said processing line (l) while performing said predetermined processing and a distance ($p_1$) said torch (7) travels along said processing line (l) within a cycle of deflection of said laser beam (LB), a third step of specifying a spin diameter ($W_1$) of said laser beam (LB) emitted from said torch (7), a fourth step of determining the numbers of rotations ($N_1$, $N_2$) of said plurality of inclined mirrors as a function of said speeds and said distance, a fifth step of determining a rotation phase difference ($\Delta\phi$) between two of said inclined mirrors (41a, 41b) which are adjacent to each other as a function of said spin diameter ($W_1$), and a sixth step of producing drive outputs ($D_1$, $D_2$) as a function of said numbers of rotations ($N_1$, $N_2$) and rotation phase difference ($\Delta\phi$) which are determined in said fourth and fifth steps and applying said drive outputs ($D_1$, $D_2$) to said plurality of inclined mirror rotation mechanisms (40a, 40b) to rotate said plurality of inclined mirrors (41a, 41b) in the same direction with the same number of rotations ($N_1$, $N_2$) held.

5. The method of claim 4, wherein
said second step includes the step of
determining the speeds ($V_i$, $V_{ij}$) of said torch (7) for each processing point ($P_i$, $P_{ij}$) on which said predetermined processing is to be performed in said processing line (l) as a function of Cartesian position coordinates ($X_i$, $X_{ij}$) of a tip of said torch (7) at said processing points ($P_i$, $P_{ij}$)

6. A method of controlling a laser robot (RB) which propagates a laser beam (LB) along an arm (4) and performs a predetermined processing while directing said laser beam (LB) from a torch (7) mounted on a leading edge of said arm (4) to workpieces (21, 22) and travelling said torch (7) along a processing line (l) on said workpieces (21, 22), said method comprising:

a first step of arranging a plurality of inclined mirrors (41a, 41b) and a plurality of inclined mirror rotation mechanisms (40a, 40b) in series along an optical path of said laser beam (LB), said plurality of inclined mirrors (41a, 41b) having reflecting surfaces inclined from planes perpendicular to directions of predetermined rotation axes respectively and serially reflecting said laser beam (LB) by their reflecting surfaces to introduce said laser beam (LB) to said torch (7), said plurality of inclined mirror rotation mechanisms (40a, 40b) rotating said plurality of inclined mirrors (41a, 41b) on said rotation axes, respectively.

a second step of specifying speeds ($V_i$, $V_{ij}$) at which said torch (7) travels along said processing line (l) while performing said predetermined processing and a distance ($p_2$) said torch (7) travels along said processing line (l) within a cycle of deflection of said laser beam (LB), a third step of specifying Cartesian position coordinates ($X_i$, $X_{ij}$) of a tip of said torch (7) at processing points ($P_i$, $P_{ij}$) on which said predetermined processing is to be performed in said processing line (l) and drive amounts ($\Theta$, $\alpha$, $\beta$, Y, Z) of said arm (4) for travelling said torch (7) onto said processing points ($P_i$, $P_{ij}$), a fourth step of determining the numbers of rotations ($N_1$, $N_2$) of said plurality of inclined mirrors as a function of said speeds ($V_i$, $V_{ij}$) and said distance ($p_2$), a fifth step of determining a rotation phase difference ($\Delta\phi$) between two of said inclined mirrors (41a, 41b) which are adjacent to each other for each of said processing points ($P_i$, $P_{ij}$) as a function of said position coordinates ($X_i$, $X_{ij}$) and said drive amounts ($\Theta$, $\alpha$, $\beta$, Y, Z), and a sixth step of producing drive outputs ($D_1$, $D_2$) as a function of said numbers of rotations ($N_1$, $N_2$) and rotation phase difference ($\Delta\phi$) which are determined in said fourth and fifth steps and applying said drive outputs ($D_1$, $D_2$) to said plurality of inclined mirror rotation mechanisms (40a, 40b) to rotate adjacent ones of said plurality of inclined mirrors (41a, 41b) in opposite directions with the same number of rotations ($N_1$, $N_2$) held.

7. The method of claim 6, wherein
said second step includes the step of
determining the speeds ($V_i$, $V_{ij}$) of said torch (7) for each of said processing points ($P_i$, $P_{ij}$) as a function of said Cartesian position coordinates ($X_i$, $X_{ij}$) of the tip of said torch (7) at said processing points ($P_i$, $P_{ij}$)

8. A light beam deflector for periodically deflecting a light beam (LB), comprising:
first and second inclined mirrors (40a, 40b) having reflecting surfaces inclined from planes ($PL_1$, $PL_2$) perpendicular to directions of predetermined rotation axes $RA_1$, $RA_2$) respectively and arranged in series along an optical path of said light beam (LB) for serially reflecting said light beam (LB) by said respective reflecting surfaces to introduce said light beam (LB) to a predetermined space,
first and second inclined mirror rotation mechanisms (40a, 40b) for rotating said first and second inclined mirrors (41a, 41b) on said rotation axes, respectively, and
control means (100) for controlling rotations of said first and second inclined mirror rotation mechanisms (40a, 40b),
wherein said light beam (LB) is reflected in series by said first and second inclined mirrors (41a, 41b) while said first and second inclined mirrors (41a, 41b) rotate in response to a control signal applied to said inclined mirror rotation mechanisms (40a, 40b) by said control means (100), to thereby periodically deflect said light beam (LB) in said predetermined space.

9. The light beam deflector of claim 8, wherein
said control means (100) includes
means for producing the control signal which operates so that said first and second inclined mirrors (41a, 41b) are equal in the number of rotations ($N_1$, $N_2$) and in rotation direction.

10. The light beam deflector of claim 8, wherein
said control means (100) includes
means for producing the control signal which operates so that said first and second inclined mirrors (41a, 41b) are equal in the number of rotations ($N_1$, $N_2$) and are opposite in rotation direction.

11. For use in a light beam deflector (10) which includes first and second inclined mirrors (41a, 41b) having reflecting surfaces inclined from planes ($PL_1$, $PL_2$) perpendicular to directions of predetermined rotation axes ($RA_1$, $RA_2$) respectively and arranged in series along an optical path of a light beam (LB) for serially reflecting said light beam (LB) by said respective reflecting surfaces to introduce said light beam (LB) to a predetermined space, first and second inclined mirror rotation mechanisms (40a, 40b) for rotating said first and second inclined mirrors (41a, 41b) on said rotation axes, respectively, and control means (100) for controlling rotations of said first and second inclined mirror rotation mechanisms (40a, 40b), wherein said light beam (LB) is reflected in series by said first and second inclined mirrors (41a, 41b) while said first and second inclined mirrors (41a, 41b) rotate in response to a control signal applied to said inclined mirror rotation mechanisms (40a, 40b) by said control means (100), to thereby periodically deflect said light beam (LB) in said predetermined space, as said control means (100).

a control signal generator (100) for generating control signals ($f_1$, $f_2$) to be applied to said first and second rotation mechanisms (40a, 40b), comprising;

a controller (10) for calculating the numbers of rotations ($N_1$, $N_2$) of said first and second rotation mechanisms (40a, 40b) and a rotation phase difference ($\Delta\phi$) between said first and second rotation mechanisms (40a, 40b) as a function of a predetermined algorithm, a processor (120) connected to an output portion of said controller (110) for calculating the numbers of pulses to be applied to said first and second rotation mechanisms (40a, 40b) respectively per predetermined time from a calculation result of said controller (110) in response to a first timing pulse signal (CL1) to output calculation results with respect to the numbers of pulses as first and second calculation results ($\Delta P_1$, $\Delta P_2$) respectively, a first pulse train formation circuit (140) connected to one output portion of said processor (120) for converting said first calculation result ($\Delta P_1$) into a pulse train to form a first pulse train signal ($f_1$) in response to a second timing pulse signal (CL2), to apply said first pulse train signal ($f_1$) to said first rotation mechanism (40a), a second pulse train formation circuit (150) connected to the other output portion of said processor (120) for converting said second calculation result ($\Delta P_2$) into a pulse train to form a second pulse train signal ($f_2$) in response to the second timing pulse signal (CL2), to apply said second pulse train signal ($f_2$) to said second rotation mechanism (40b), and a timing pulse generation circuit (130) for generating said first and second timing pulse signals (CL1, CL2).

12. The control signal generator of claim 11,
wherein said first pulse train formation circuit (140) includes
a first buffer connected to one of the output portions of said processor (120) for holding said first calculation result ($\Delta P_1$),
an accumulator (144) for outputting a holding addition result in response to said second timing pulse signal (CL2), and an adder (143) for adding said first calculation result ($\Delta P_1$) held by said first buffer to an output result of said accumulator (144) to output the addition result as a new addition result to said accumulator (144) and to output a single pulse each time the addition result becomes a predetermined value, and wherein said second pulse train formation circuit (150) includes a second buffer connected to the other output portion of said processor (120) for holding said second calculation result ($\Delta P_2$), an accumulator (154) for outputting a holding addition result in response to said second timing pulse signal (CL2), and an adder (153) for adding said second calculation result ($\Delta P_2$) held by said second buffer to an output result of said accumulator (154) to output the addition result as a new addition result to said accumulator (154) and to output a single pulse each time the addition result becomes a predetermined value.

13. The control signal generator of claim 12, wherein said first buffer includes a first upper buffer (141) for holding said first calculation result ($\Delta P_1$) during a time interval between end of a predetermined calculation by said processor (120) and start of a new predetermined calculation by said processor (120), and a first lower buffer (142) for receiving and holding said first calculation result ($\Delta P_1$) held by said first upper buffer (141) in response to said first timing pulse signal (CL1), and wherein said second buffer includes a second upper buffer (151) for holding said second calculation result ($\Delta P_2$) during a time interval between end of a predetermined calculation by said processor (120) and start of a new predetermined calculation by said processor (120), and a second lower buffer (152) for receiving and holding said second calculation result ($\Delta P_2$) held by said second upper buffer (151) in response to said first timing pulse signal (CL1).

14. The control signal generator of claim 13, wherein said first and second rotation mechanism (40a, 40b) include first and second servomotors (42a, 42b), respectively.

15. The control signal generator of claim 14, wherein said timing pulse generation circuit (130) includes a counter circuit (131) for counting said second timing pulse signal (CL2) to produce said first timing pulse signal (CL1) as a function of the counted result.

16. A laser robot (RB) which propagates a laser beam (LB) along an arm (4) and performs a predetermined processing while directing said laser beam (LB) from a torch (7) mounted on a leading edge of said arm (4) to workpieces (21, 22) and travelling said torch (7) along a processing line (l) on said workpieces (21, 22), comprising:

laser beam generation means (8) for generating said laser beam (LB) to introduce said laser beam (LB) into said arm (4), a plurality of inclined mirrors (41a, 41b) having reflecting surfaces inclined from planes perpendicular to directions of predetermined rotation axes respectively and arranged in series along an optical path of said laser beam (LB) for serially reflecting said laser beam (LB) by said respective reflecting surfaces to introduce said laser beam (LB) to said torch (7), a plurality of inclined mirror rotation mechanisms (40a, 40b) for rotating said plurality of inclined mirrors (41a, 41b) on said rotation axes, respectively, and control means (100) for controlling rotations of said plurality of inclined mirror rotation mechanisms (40a, 40b) wherein said control means (100) includes means for producing a control signal which operates so that said plurality of inclined mirrors (41a, 41b) are equal in number of rotations ($N_1$, $N_2$) and adjacent ones of said plurality of inclined mirrors (41a, 41b) are opposite in rotation direction, to apply said control signal to said plurality of inclined mirror rotation mechanisms (40a, 40b).

* * * * *